（12）United States Patent
Hagan et al.

(10) Patent No.: US 10,414,311 B2
(45) Date of Patent: *Sep. 17, 2019

(54) BEARING FOR USE IN SLIDING HEAD RESTRAINT

(71) Applicant: SAINT-GOBAIN PERFORMANCE PLASTICS CORPORATION, Solon, OH (US)

(72) Inventors: Timothy J. Hagan, Succasunna, NJ (US); Abe Sanchez, Dover, NJ (US); Paul Haines, Bristol (GB); Heiko Jessler, Krefeld (DE); Brandon S. Murphy, West Milford, NJ (US); Vincent DiMartino, Clifton, NJ (US); Chloe Echikson, Northfield, NJ (US); Mirko Hundertmark, Coburg (DE)

(73) Assignee: SAINT-GOBAIN PERFORMANCE PLASTICS CORPORATION, Solon, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/231,636

(22) Filed: Dec. 24, 2018

(65) Prior Publication Data

US 2019/0143865 A1 May 16, 2019

Related U.S. Application Data

(60) Division of application No. 15/626,451, filed on Jun. 19, 2017, now Pat. No. 10,220,751, which is a
(Continued)

(51) Int. Cl.
*B60N 2/809* (2018.01)
*F16C 29/00* (2006.01)
(Continued)

(52) U.S. Cl.
CPC ............. *B60N 2/809* (2018.02); *B60N 2/815* (2018.02); *B60N 2/818* (2018.02); *B60N 2/897* (2018.02);
(Continued)

(58) Field of Classification Search
CPC ....................... B60N 2002/4897; Y10T 16/05
(Continued)

(56) References Cited

U.S. PATENT DOCUMENTS 3,197,243 A 7/1965 Brenneke
3,484,143 A 12/1969 Tallian et al.
(Continued)

FOREIGN PATENT DOCUMENTS

CN 201633580 U 11/2010
CN 102076521 A 5/2011
(Continued)

OTHER PUBLICATIONS

International Search Report and Written Opinion for PCT/US2014/044273, dated Oct. 23, 2014, 15 pages.
(Continued)

*Primary Examiner* — Joshua A Michener
*Assistant Examiner* — Matthew J Gitlin
(74) *Attorney, Agent, or Firm* — Abel Schillinger, LLP; Chi Suk Kim

(57) ABSTRACT

The present disclosure relates to bearings, guide sleeves and head restraint assemblies for automobiles.

18 Claims, 39 Drawing Sheets

Related U.S. Application Data division of application No. 14/515,385, filed on Oct. 15, 2014, now Pat. No. 9,707,872, which is a continuation-in-part of application No. 14/315,679, filed on Jun. 26, 2014, now Pat. No. 9,446,692, and a continuation-in-part of application No. 14/315,789, filed on Jun. 26, 2014, now Pat. No. 9,649,959.

(60) Provisional application No. 61/921,806, filed on Dec. 30, 2013, provisional application No. 61/884,767, filed on Sep. 30, 2013, provisional application No. 61/841,315, filed on Jun. 29, 2013, provisional application No. 61/841,317, filed on Jun. 29, 2013.

(51) Int. Cl.

| | | |
|---|---|---|
| *F16C 29/02* | (2006.01) | |
| *B60N 2/897* | (2018.01) | |
| *F16C 33/20* | (2006.01) | |
| *F16C 33/10* | (2006.01) | |
| *B60N 2/818* | (2018.01) | |
| *B60N 2/815* | (2018.01) | |
| *F16C 31/02* | (2006.01) | |
| *F16D 1/08* | (2006.01) | |

(52) U.S. Cl.
CPC .......... *F16C 29/002* (2013.01); *F16C 29/005* (2013.01); *F16C 29/02* (2013.01); *F16C 31/02* (2013.01); *F16C 33/1095* (2013.01); *F16C 33/201* (2013.01); *F16C 2326/08* (2013.01); *F16D 1/0835* (2013.01); *Y10T 16/05* (2015.01)

(58) Field of Classification Search
USPC .................. 297/391, 410; 403/367, 371, 372
See application file for complete search history.

(56) References Cited

U.S. PATENT DOCUMENTS

| | | | |
|---|---|---|---|
| 3,563,603 A * | 2/1971 | D'Aprile | B60N 2/818 297/410 |
| 3,700,271 A | 10/1972 | Blaurock et al. | |
| 3,838,928 A | 10/1974 | Blaurock et al. | |
| 4,277,990 A | 7/1981 | Hall | |
| 4,411,470 A * | 10/1983 | Nishimura | B60N 2/815 297/410 |
| 4,568,123 A * | 2/1986 | Yasui | B60N 2/824 297/410 |
| 4,711,494 A | 12/1987 | Duvenkamp | |
| 4,790,683 A | 12/1988 | Cramer, Jr. et al. | |
| 4,828,423 A | 5/1989 | Cramer, Jr. et al. | |
| 4,854,642 A * | 8/1989 | Vidwans | B60N 2/818 297/410 |
| 4,976,493 A | 12/1990 | Frankila | |
| 4,981,390 A | 1/1991 | Cramer, Jr. et al. | |
| 5,156,440 A | 10/1992 | Vidwans | |
| 5,231,901 A | 8/1993 | Putney et al. | |
| 5,445,434 A | 8/1995 | Kohut | |
| 5,738,413 A * | 4/1998 | De Filippo | B60N 2/818 297/410 |
| 5,779,177 A | 7/1998 | Kielwein | |
| 5,788,250 A * | 8/1998 | Masters | B60N 2/826 297/410 |
| 5,927,813 A | 7/1999 | Nemoto | |
| 5,945,952 A * | 8/1999 | Davidson | H01Q 1/088 343/702 |
| 5,992,939 A | 11/1999 | Gass et al. | |
| 6,099,077 A * | 8/2000 | Isaacson | B60N 2/818 297/410 |
| 6,109,150 A | 8/2000 | Saccomanno, III | |
| 6,296,316 B1 | 10/2001 | Hann | |
| 6,338,403 B1 | 1/2002 | Costin et al. | |
| 6,400,052 B1 | 6/2002 | Suzuki et al. | |
| 6,454,356 B1 * | 9/2002 | Yamada | B60N 2/815 297/410 |
| 6,670,553 B1 * | 12/2003 | Gretz | H02G 3/0691 16/2.1 |
| 6,742,846 B1 * | 6/2004 | Isaacson | B60N 2/815 297/410 |
| 6,761,409 B2 * | 7/2004 | Ford | B60N 2/818 297/410 |
| 6,792,650 B2 * | 9/2004 | Stagg | B60P 3/36 16/2.1 |
| 6,802,565 B2 | 10/2004 | Isaacson | |
| 6,969,118 B2 * | 11/2005 | Yamada | B60N 2/815 297/410 |
| 7,390,980 B1 * | 6/2008 | Gretz | H02G 3/06 16/2.1 |
| 7,434,886 B2 * | 10/2008 | Yamada | B60N 2/818 297/410 |
| 7,610,671 B2 | 11/2009 | Watkins et al. | |
| 7,669,933 B2 * | 3/2010 | Watanabe | B60N 2/818 297/410 |
| 7,758,115 B2 * | 7/2010 | Yamaguchi | B60N 2/888 297/216.12 |
| 8,313,148 B2 * | 11/2012 | Lardies | B60N 2/815 297/410 |
| 8,398,309 B2 | 3/2013 | Ferreira | |
| 8,424,184 B2 | 4/2013 | Hughes | |
| 8,485,752 B2 | 7/2013 | Slayne | |
| 8,991,927 B2 * | 3/2015 | Wisniewski | B60N 2/809 297/410 |
| 8,998,495 B2 | 4/2015 | Hirose et al. | |
| 9,446,692 B2 | 9/2016 | Hagan et al. | |
| 9,649,959 B2 | 5/2017 | Hagan et al. | |
| 9,707,872 B2 | 7/2017 | Hagan et al. | |
| 9,821,693 B2 | 11/2017 | Hagan et al. | |
| 10,144,328 B2 | 12/2018 | Hagan et al. | |
| 10,220,751 B2 | 3/2019 | Hagan et al. | |
| 2001/0000419 A1 | 4/2001 | Heilig | |
| 2001/0006202 A1 | 7/2001 | Inana et al. | |
| 2002/0134636 A1 | 9/2002 | Ando | |
| 2002/0157235 A1 | 10/2002 | Napolitano, Jr. et al. | |
| 2003/0169951 A1 | 9/2003 | Nishijima et al. | |
| 2003/0205925 A1 | 11/2003 | Ford | |
| 2005/0012374 A1 * | 1/2005 | Isaacson | B60N 2/815 297/410 |
| 2005/0225903 A1 | 10/2005 | Sprankle et al. | |
| 2006/0061188 A1 | 3/2006 | Locke et al. | |
| 2006/0214492 A1 | 9/2006 | Hassler et al. | |
| 2006/0276246 A1 | 12/2006 | Needes et al. | |
| 2007/0246318 A1 | 10/2007 | Shirataki et al. | |
| 2007/0267908 A1 | 11/2007 | Watanabe | |
| 2008/0043375 A1 | 2/2008 | Hanrahan et al. | |
| 2008/0199254 A1 | 8/2008 | Baker et al. | |
| 2010/0021263 A1 * | 1/2010 | Holt | F16B 5/02 411/107 |
| 2010/0046867 A1 | 2/2010 | Hosmer et al. | |
| 2010/0258121 A1 | 10/2010 | Kirniak | |
| 2011/0076096 A1 * | 3/2011 | Slayne | F16O 27/02 403/372 |
| 2011/0171020 A1 | 7/2011 | Spathias et al. | |
| 2011/0210594 A1 | 9/2011 | Eisenbraun | |
| 2012/0086255 A1 | 4/2012 | Ishimoto et al. | |
| 2012/0200135 A1 | 8/2012 | Muto et al. | |
| 2014/0062159 A1 * | 3/2014 | Kim | A47C 7/38 297/410 |
| 2014/0166423 A1 | 6/2014 | Nias et al. | |
| 2014/0361595 A1 | 12/2014 | Weiland | |
| 2015/0001025 A1 | 1/2015 | Slayne et al. | |
| 2015/0001907 A1 | 1/2015 | Hagan et al. | |
| 2015/0001908 A1 | 1/2015 | Hagan et al. | |
| 2015/0028644 A1 | 1/2015 | Hagan et al. | |
| 2015/0329022 A1 | 11/2015 | Miyaguchi et al. | |
| 2016/0032971 A1 | 2/2016 | Giroud et al. | |
| 2016/0045665 A1 | 2/2016 | Bayer et al. | |
| 2016/0332546 A1 | 11/2016 | Hagan et al. | |
| 2017/0282763 A1 | 10/2017 | Hagan et al. | |
| 2018/0283457 A1 | 10/2018 | Plioska et al. | |

(56) References Cited

U.S. PATENT DOCUMENTS

FOREIGN PATENT DOCUMENTS

| | | | | |
|---|---|---|---|---|
| CN | 102630281 | A | 8/2012 | |
| CN | 102745111 | A | 10/2012 | |
| CN | 203142447 | U | 8/2013 | |
| DE | 3605774 | A1 | 9/1987 | |
| DE | 19841648 | A1 | 4/1999 | |
| DE | 69928345 | T2 | 8/2006 | |
| EP | 0798158 | A2 | 10/1997 | |
| EP | 0990555 | A2 | 4/2000 | |
| EP | 1690732 | A2 | 8/2006 | |
| EP | 3091243 | A1 | 11/2016 | |
| FR | 2877287 | A1 | 5/2006 | |
| FR | 2989645 | A1 * | 10/2013 | ............ B60N 2/815 |
| JP | S60175152 | U | 9/1985 | |
| JP | H1189665 | A | 4/1993 | |
| JP | H05329033 | A | 12/1993 | |
| JP | H074436 | A | 1/1995 | |
| JP | H11198703 | A | 7/1999 | |
| JP | 2010069036 | A | 4/2010 | |
| JP | 2010268970 | A | 12/2010 | |
| JP | 2013505411 | A | 2/2013 | |
| KR | 1998052308 | U | 10/1998 | |
| KR | 200186497 | Y1 | 6/2000 | |
| KR | 20090124180 | A | 12/2009 | |
| KR | 20110006101 | A | 1/2011 | |
| KR | 101108273 | B1 | 1/2012 | |
| KR | 20130070027 | A | 6/2013 | |
| KR | 20130089125 | A | 8/2013 | |
| KR | 20130089125 | A * | 8/2013 | |
| KR | 101485620 | B1 | 1/2015 | |
| WO | 2014210271 | A1 | 12/2014 | |
| WO | 2014210302 | A1 | 12/2014 | |
| WO | 2015073118 | A2 | 5/2015 | |
| WO | 2016060660 | A1 | 4/2016 | |
| WO | 2018178245 | A1 | 10/2018 | |

OTHER PUBLICATIONS

International Search Report and Written Opinion for PCT/US2014/044328, dated Oct. 23, 2014, 15 pages.
International Search Report and Written Opinion for PCT/US2014/060747, dated Jul. 12, 2015, 12 pages.
International Search Report and Written Opinion for PCT/EP2018/058098, dated Jul. 27, 2018, 16 pages.

* cited by examiner

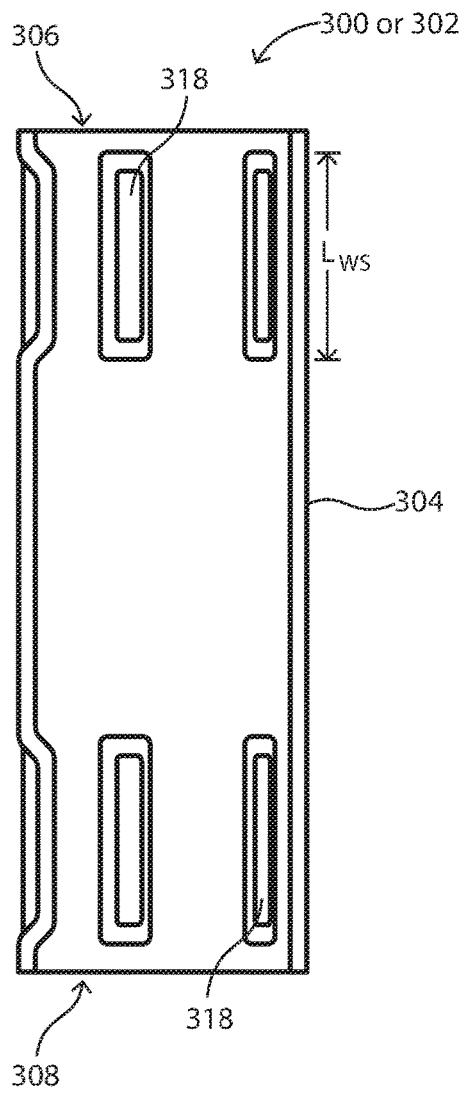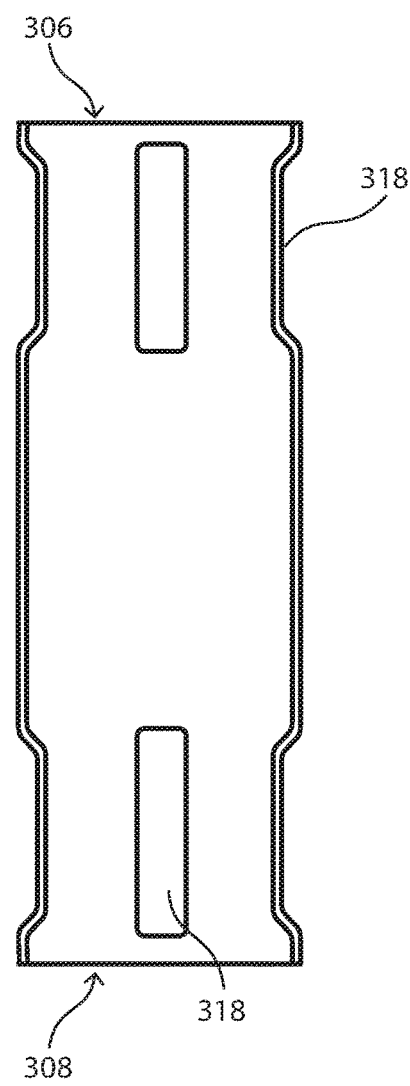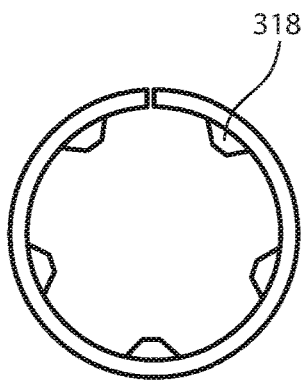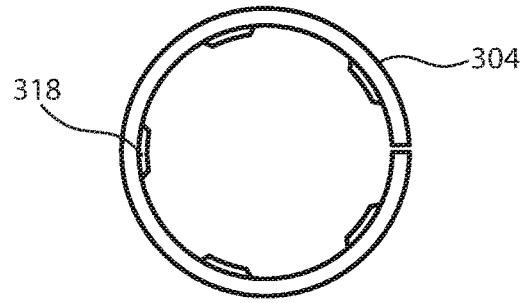
FIG. 7A
FIG. 7B
FIG. 7C
FIG. 7D

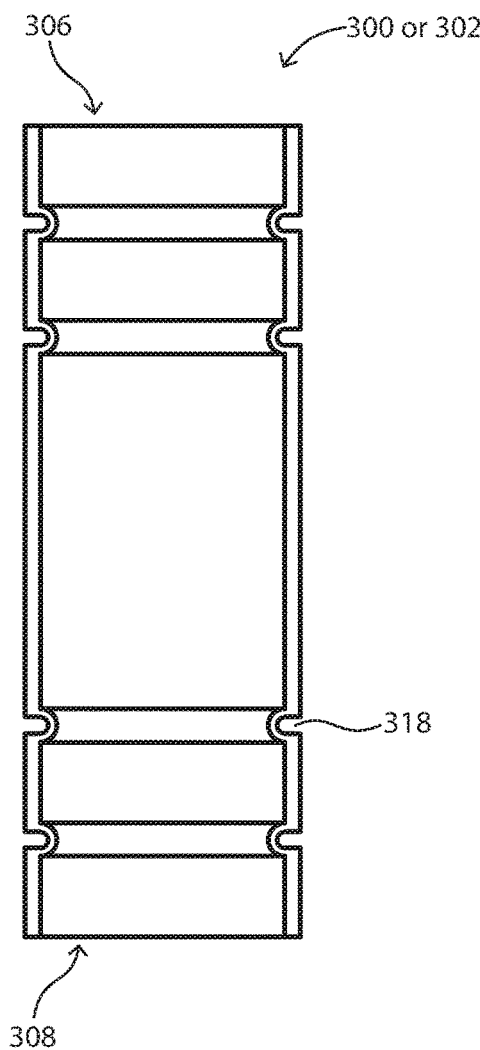
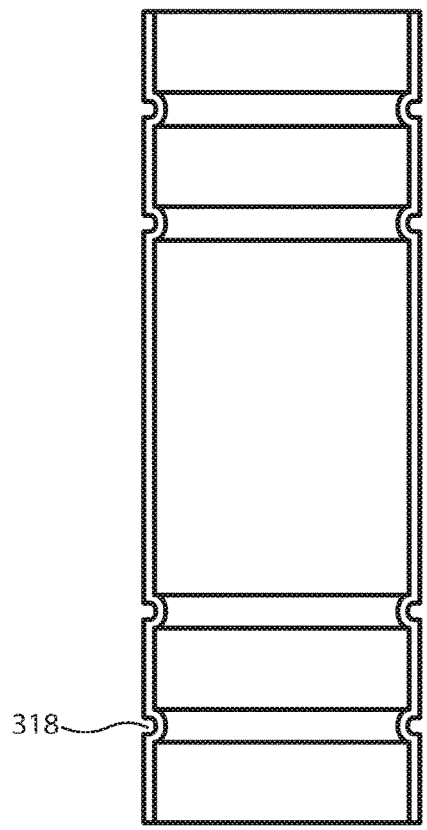
FIG. 8A　　　　　FIG. 8C
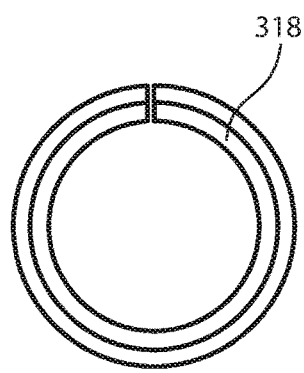
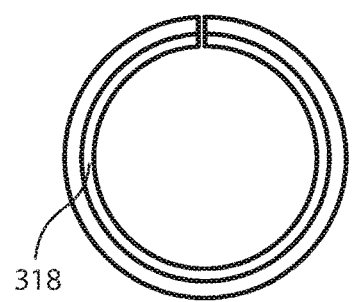
FIG. 8B　　　　　FIG. 8D

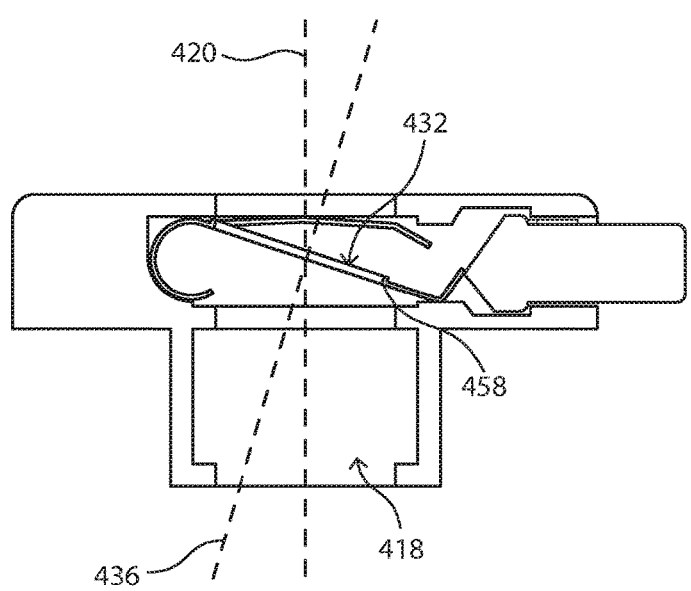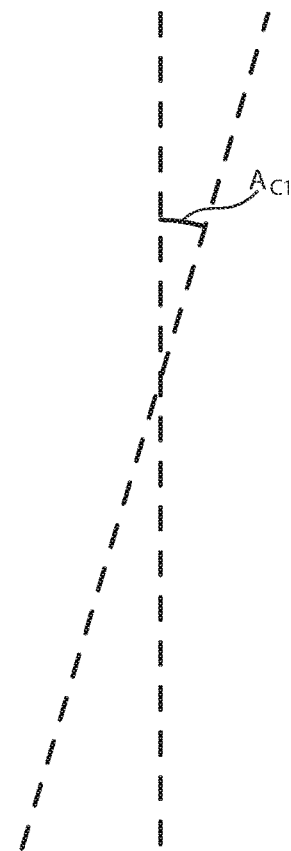
FIG. 28
FIG. 29

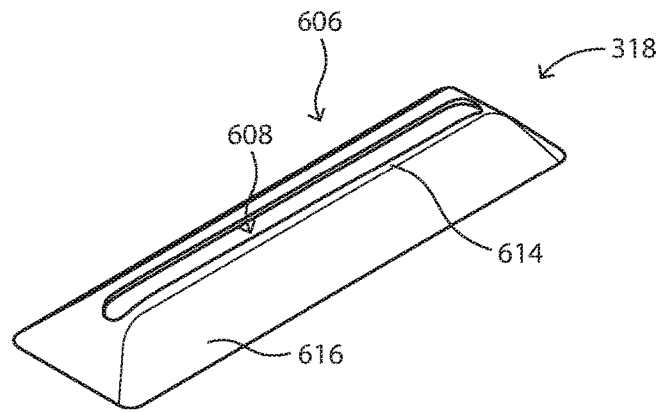
FIG. 36A
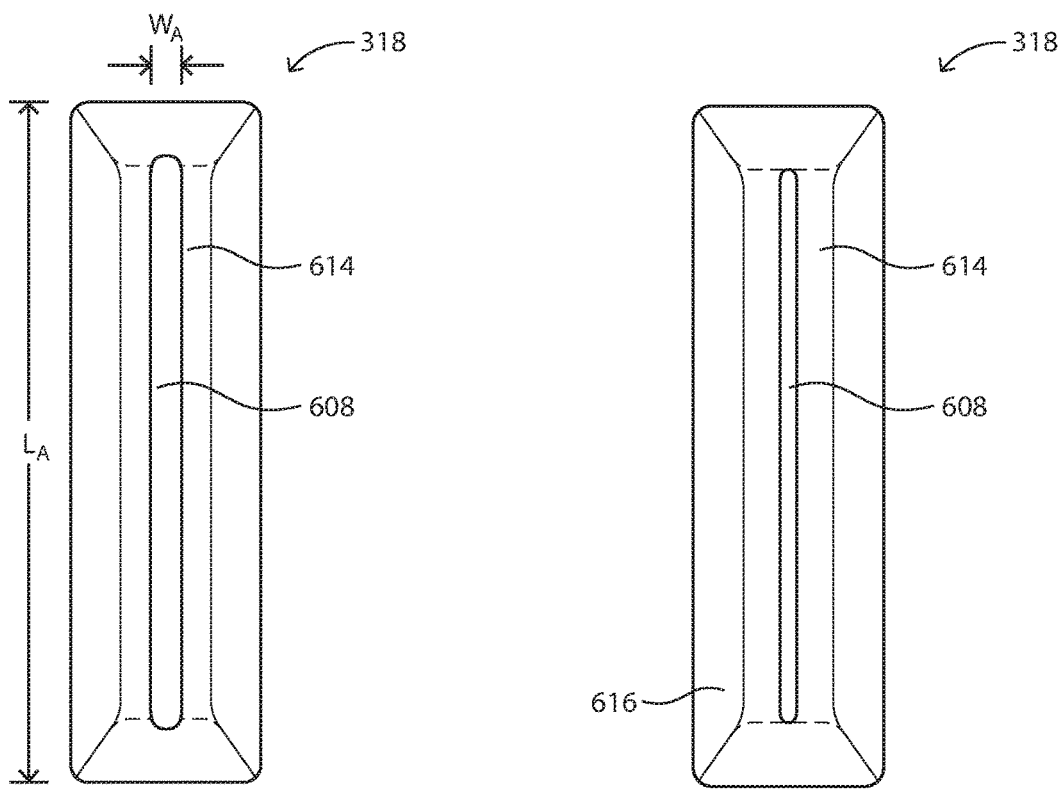
FIG. 36B  FIG. 36C

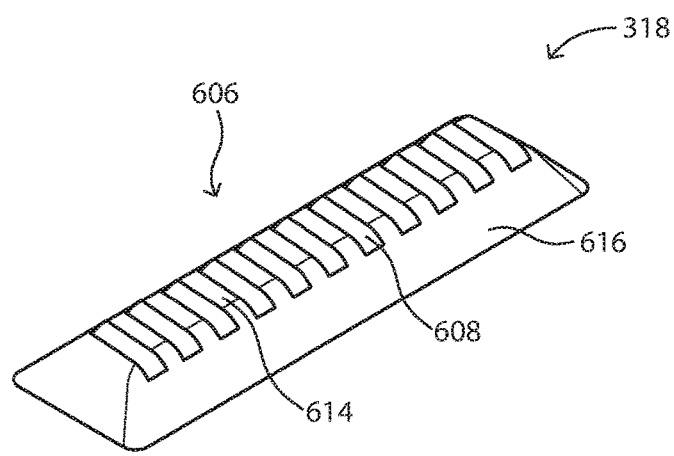
FIG. 37A
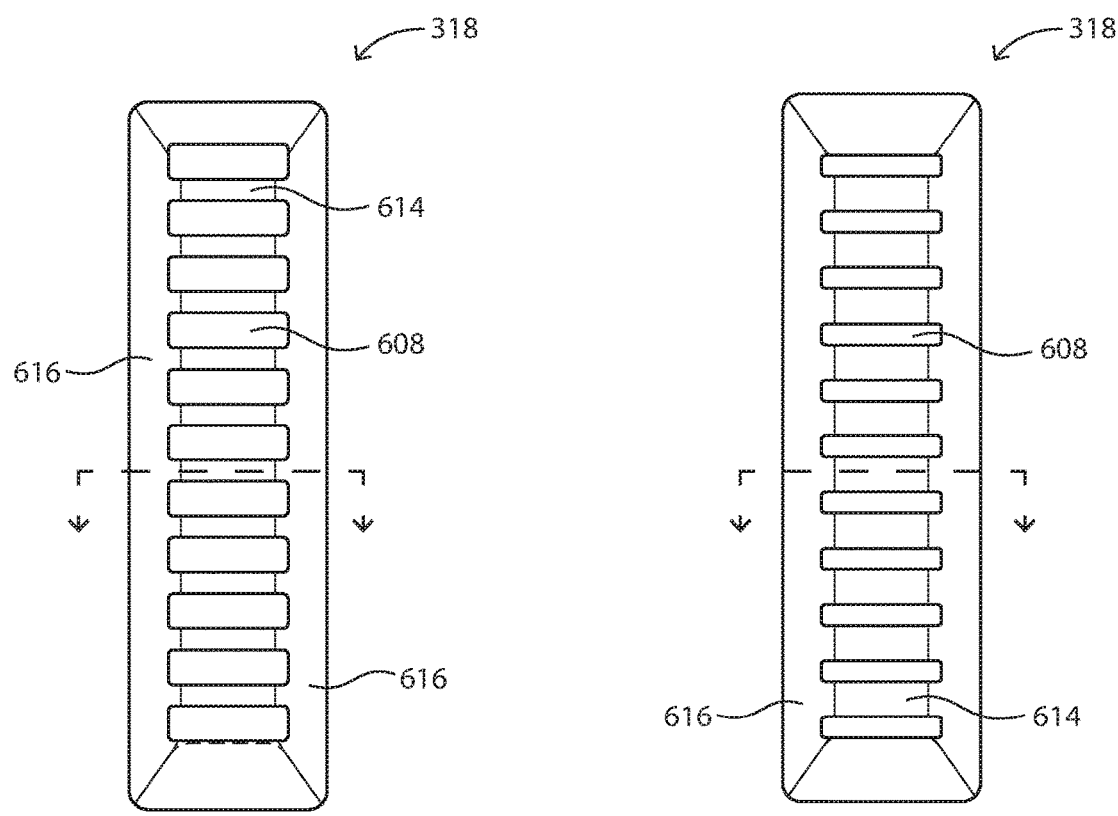
FIG. 37B          FIG. 37C

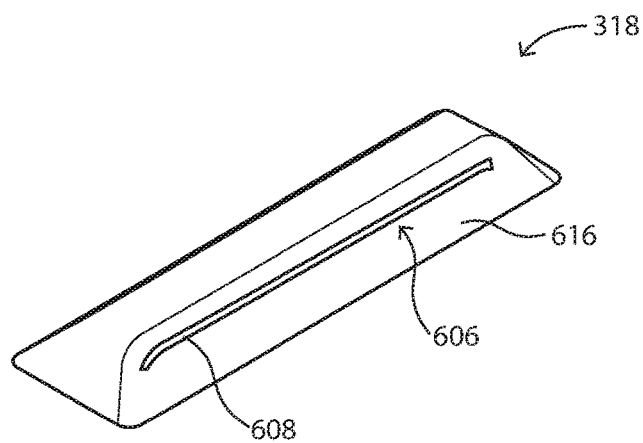
FIG. 39A
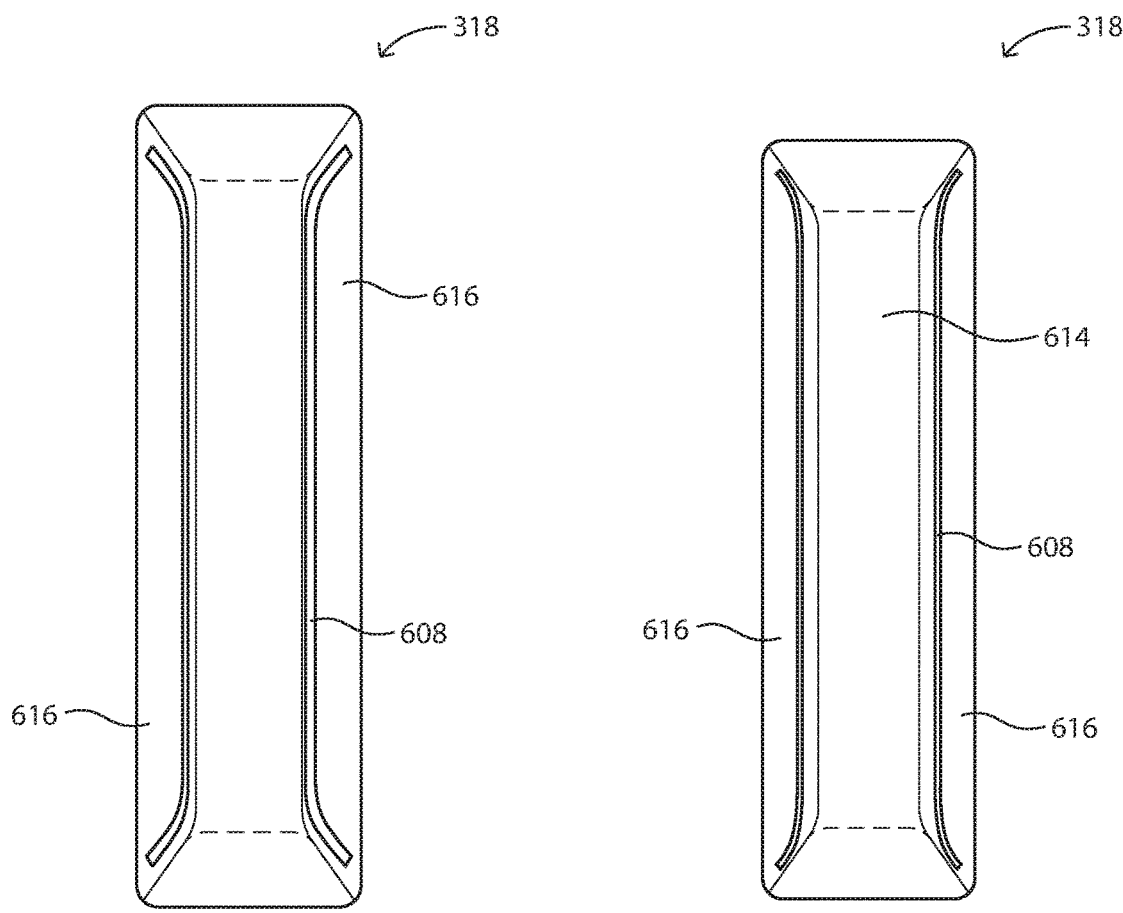
FIG. 39B  FIG. 39C

BEARING FOR USE IN SLIDING HEAD RESTRAINT

CROSS-REFERENCE TO RELATED APPLICATION(S)

This application is a divisional and claims priority under 35 U.S.C. § 120 to U.S. patent application Ser. No. 15/626,451 entitled "BEARING FOR USE IN SLIDING HEAD RESTRAINT," by Timothy J. Hagan et al., filed Jun. 19, 2017, which claims priority under 35 U.S.C. § 120 to U.S. patent application Ser. No. 14/515,385 entitled "BEARING FOR USE IN SLIDING HEAD RESTRAINT," by Timothy J. Hagan et al., filed Oct. 15, 2014, which is a continuation-in-part application of U.S. patent application Ser. No. 14/315,679 entitled "BEARING FOR USE IN SLIDING HEAD RESTRAINT," by Timothy J. Hagan et al., filed Jun. 26, 2014 and this is a continuation-in-part application of U.S. patent application Ser. No. 14/315,789 entitled "BEARING FOR USE IN SLIDING HEAD RESTRAINT," by Timothy J. Hagan et al., filed Jun. 26, 2014 which in turn both claim priority under 35 U.S.C. § 119(e) to U.S. Patent Application No. 61/841,315 entitled "BEARING FOR USE IN SLIDING HEAD RESTRAINT," by Timothy J. Hagan et al., filed Jun. 29, 2013, which in turn claims priority under 35 U.S.C. § 119(e) to U.S. Patent Application No. 61/841,316 entitled "BEARING FOR USE IN SLIDING HEAD RESTRAINT," by Timothy J. Hagan et al., filed Jun. 29, 2013, which in turn claims priority under 35 U.S.C. § 119(e) to U.S. Patent Application No. 61/841,317 entitled "BEARING FOR USE IN SLIDING HEAD RESTRAINT," by Timothy J. Hagan et al., filed Jun. 29, 2013, which in turn claims priority under 35 U.S.C. § 119(e) to U.S. Patent Application No. 61/884,767 entitled "BEARING FOR USE IN SLIDING HEAD RESTRAINT," by Timothy J. Hagan et al., filed Sep. 30, 2013, which in turn claims priority under 35 U.S.C. § 119(e) to U.S. Patent Application No. 61/921,806, entitled "BEARING FOR USE IN SLIDING HEAD RESTRAINT," by Timothy J. Hagan et al., filed Dec. 30, 2013, of which all are assigned to the current assignee hereof and incorporated herein by reference in their entireties.

FIELD OF THE DISCLOSURE

The present disclosure relates to bearings, guide sleeves and head restraint assemblies for automobiles.

RELATED ART

Automotive vehicles include vehicle seat assemblies for supporting vehicle occupants. The seat assemblies typically include a substantially horizontal seat cushion and a generally upright seat back pivotally connected to the seat cushion by a rotatable mechanism. Seat assemblies also typically include a head restraint extending from a top face of the seat back. The head restraint is typically movable between a plurality of head restraint positions relative to the seat back to accommodate a wide range of occupant heights.

It is widely practiced in automotive seat assemblies to support the head restraint at the top of the seat back with a spaced apart pair of posts. Each of the posts can extend outward from the head restraint and can be inserted into a corresponding mounting fixture in the seat back.

Either one or both of the posts typically contain a plurality of external notches arranged longitudinally thereon, representing the corresponding plurality of head restraint selectable positions. A plunger or depressor can be engaged with any one of the plurality of notches to maintain the head restraint in the corresponding head support position. The plunger is typically spring biased such that in the biased position, the plunger engages with one of the notches, thus preventing axial translation of the head restraint relative the seat back.

To adjust the height of the head restraint, a vehicle occupant can depress the plunger, causing the plunger to disengage from a notch on the post. After the plunger disengages from the notch, the occupant can apply a force to the head restraint, causing the entire head restraint assembly to translate in the desired vertical direction. For example, to lower the height of the head restraint, the occupant can urge the assembly towards the seat back. Conversely, to increase the height of the head restraint, the occupant can urge the assembly away from the seat back.

After the occupant has positioned the head restraint at the desired height, the occupant can release the plunger, allowing the plunger to once again bias against the post. If at this time the plunger is aligned with one of the notches, the plunger can engage therewith, causing the head restraint to securely lock in that position. However, if the plunger is not aligned with a notch, the occupant must then urge the head restraint in either vertical direction until the plunger engages with the nearest notch, at which point the head restraint is securely locked.

Previous adjustable head restraint assemblies have relied on intentional misalignment of the posts relative to the engagement fixture in the seat back. This misalignment can allow the posts to form an interference fit with the mounting fixture of the seat back. This misalignment has several undesirable consequences. Particularly, the misalignment can cause the assembly to exhibit a high seat assembly to seat assembly variability, such as in terms of ease of headrest adjustment and/or tolerances. Moreover, the misalignment can cause undesirable noise, vibration, and harshness characteristics.

BRIEF DESCRIPTION OF THE DRAWINGS

Embodiments are illustrated by way of example and are not limited in the accompanying figures.

FIG. 7A includes a cross-sectional side view of a bearing in accordance with an embodiment prior to engagement with a post.

FIG. 7B includes a top view of a bearing in accordance with an embodiment prior to engagement with a post.

FIG. 7C includes a cross-sectional side view of a bearing in accordance with an embodiment after engagement with a post.

FIG. 7D includes a top view of a bearing in accordance with an embodiment after engagement with a post.

FIG. 8A includes a cross-sectional side view of a bearing in accordance with an embodiment prior to engagement with a post.

FIG. 8B includes a top view of a bearing in accordance with an embodiment prior to engagement with a post.

FIG. 8C includes a cross-sectional side view of a bearing in accordance with an embodiment after engagement with a post.

FIG. 8D includes a top view of a bearing in accordance with an embodiment after engagement with a post.

FIG. 28 includes a cross-sectional side view of a locking mechanism in accordance with an embodiment, taken along Line 27-27 in FIG. 20, including a central axis for the locking member and a central axis for the locking mechanism.

FIG. 29 includes a side plan view of the central axes of FIG. 28 according to an embodiment.

FIG. 36A includes a perspective view of a wave structure in accordance with an embodiment.

FIG. 36B includes a side plan view of a wave structure in accordance with an embodiment.

FIG. 36C includes a side plan view of a wave structure in accordance with an embodiment.

FIG. 37A includes a perspective view of a wave structure in accordance with an embodiment.

FIG. 37B includes a side plan view of a wave structure in accordance with an embodiment.

FIG. 37C includes a side plan view of a wave structure in accordance with an embodiment.

FIG. 39A includes a perspective view of a wave structure in accordance with an embodiment.

FIG. 39B includes a side plan view of a wave structure in accordance with an embodiment.

FIG. 39C includes a side plan view of a wave structure in accordance with an embodiment.

Figure 1:
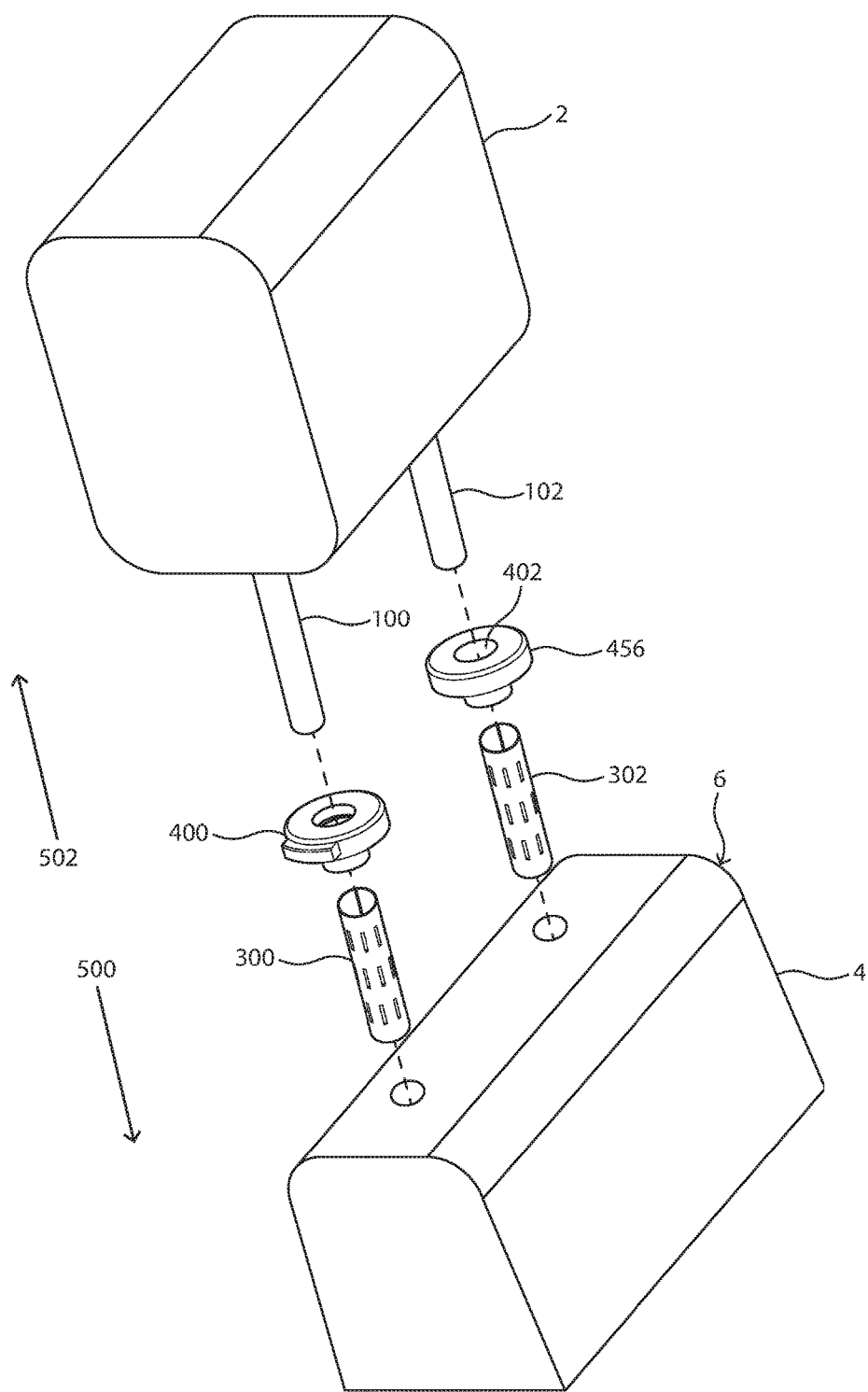
FIG. 1 includes an exploded perspective view of a head restraint assembly in accordance with an embodiment.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

DETAILED DESCRIPTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other embodiments can be used based on the teachings as disclosed in this application.

As used herein to describe range of movement of the posts, the term "adjustment length" describes the maximum distance the posts can translate into and away from a seat back while maintaining lockable engagement therewith. In a particular aspect, the "adjustment length" can be defined as the length of the segment of the head restraint post that is exposed from the seat back when the head restraint assembly is at its maximum height. In this sense, the "adjustment length" of the posts can be less than the entire axial length of the posts. Further, as described herein, the posts can be locked at any position along their adjustment length.

The terms "comprises," "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one, at least one, or the singular as also including the plural, or vice versa, unless it is clear that it is meant otherwise. For example, when a single item is described herein, more than one item may be used in place of a single item. Similarly, where more than one item is described herein, a single item may be substituted for that more than one item.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the head restraint arts.

Figure 2:
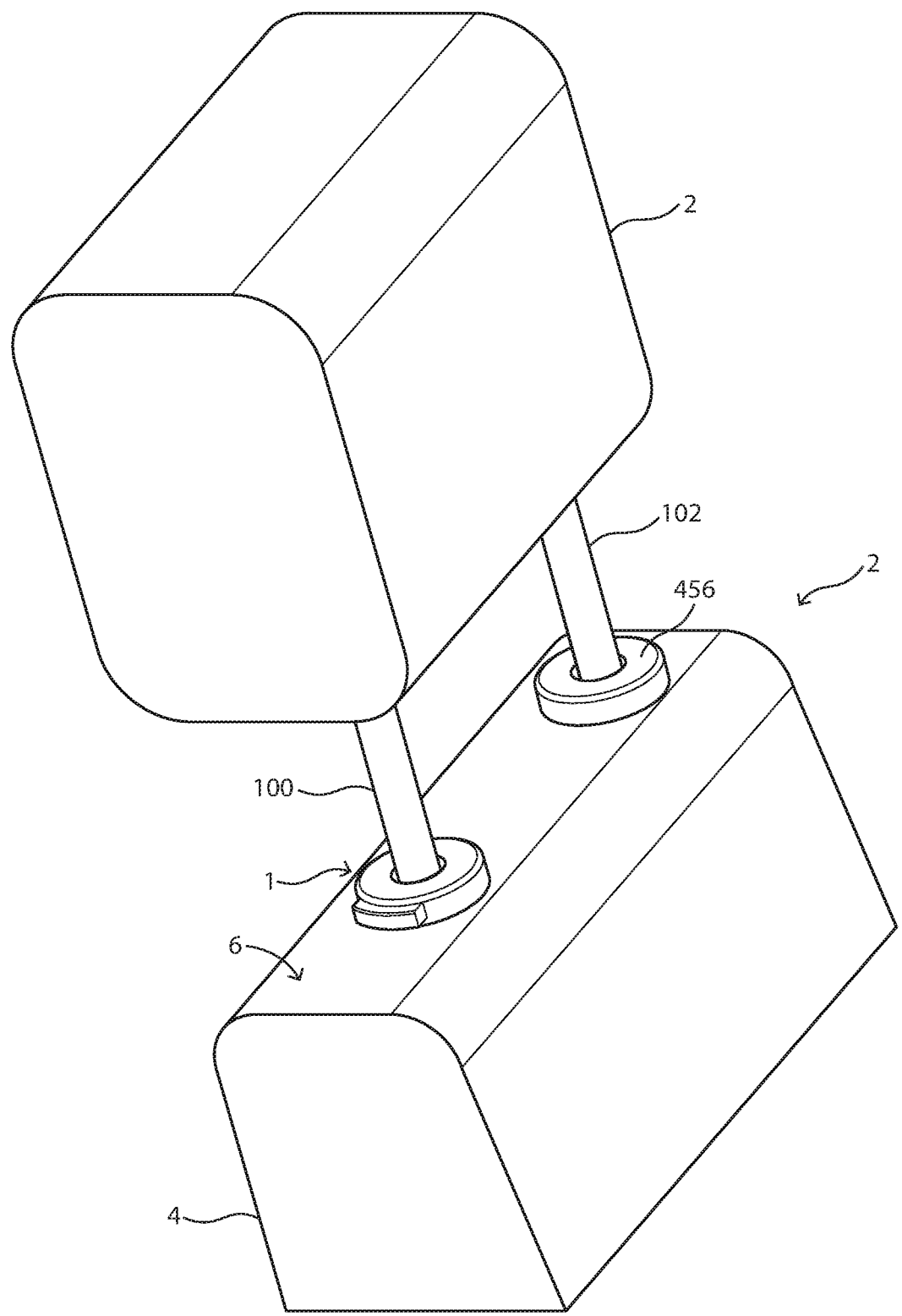
FIG. 2 includes a perspective view of a head restraint assembly in accordance with an embodiment.
Figure 3A:
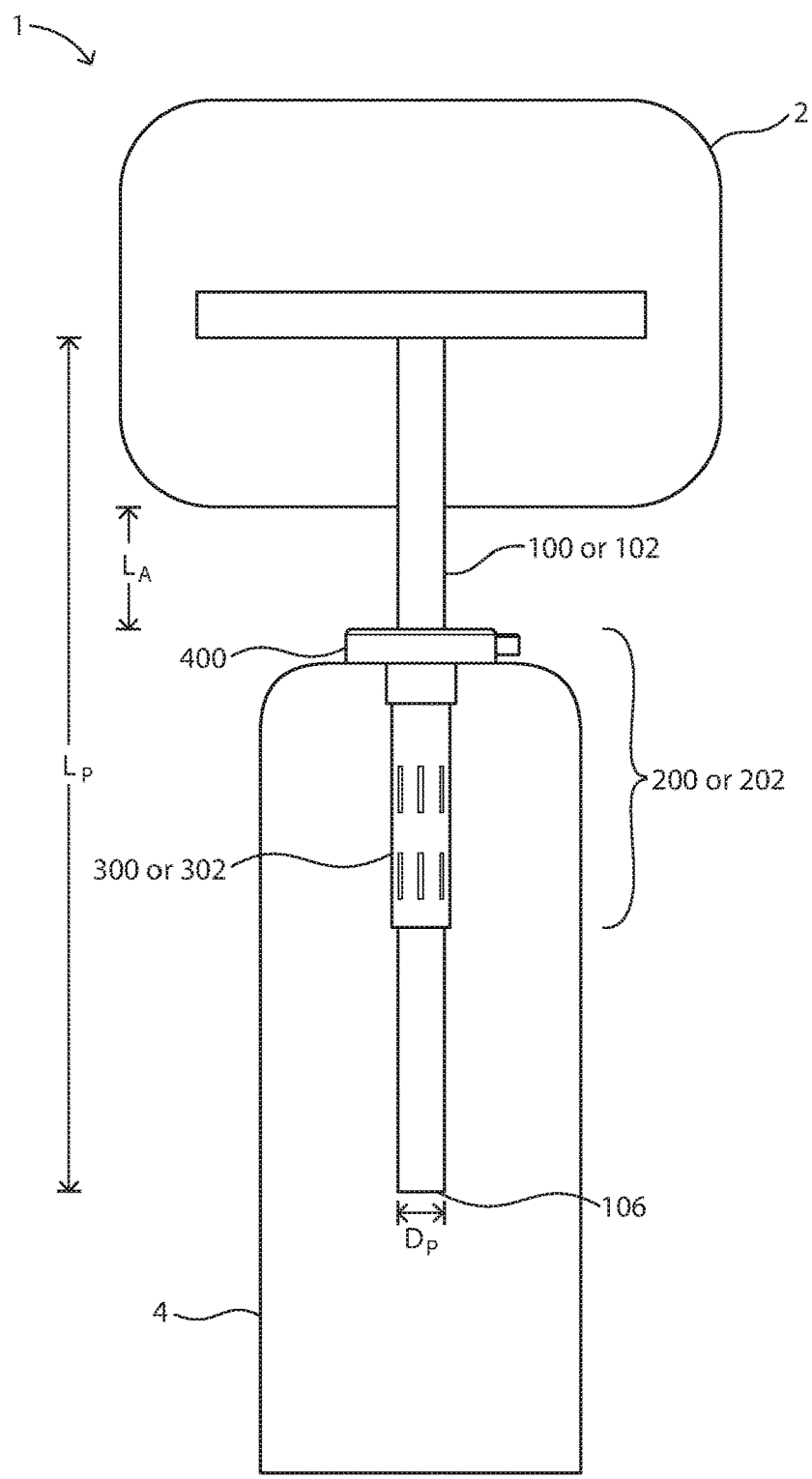
FIG. 3A includes a cross-sectional side plan view of a head restraint assembly in accordance with an embodiment.
Figure 3B:
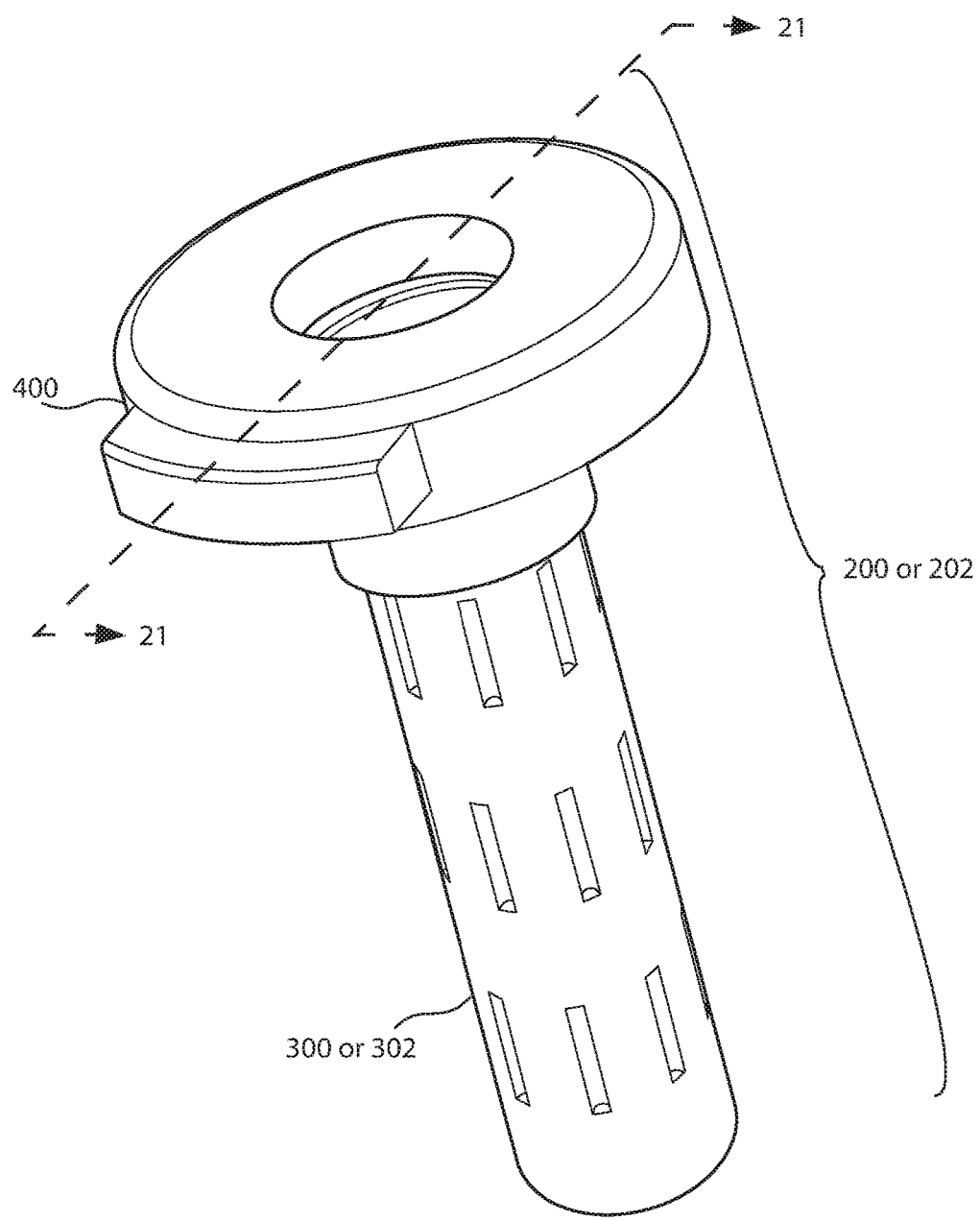
FIG. 3B includes a perspective view of a guide sleeve in accordance with an embodiment.

The present head restraint assembly is adapted to provide consistent sliding resistance and adjustability. The concepts are better understood in view of the embodiments described below that illustrate and do not limit the scope of the present invention Referring initially to FIG. 2, a vehicle seat 2 is partially illustrated. The seat 2 can include a seat bottom (not shown) that is mounted within a vehicle. The seat 2 can also include a seat back 4 that is mounted to one of the seat bottom or the vehicle. The seat back 4 can further include a head restraint assembly 1. The head restraint assembly 1 can be engaged with a top surface 6 of the seat back 4. The head restraint assembly 1 can be adapted to translate relative to the seat back 4. In this regard, the head restraint assembly 1 can be adjusted to accommodate passengers of various heights.

Referring to FIG. 1 through FIG. 3B, the head restraint assembly 1 can generally include a body (e.g., a head cushion) 2, a first post 100 and a second post 102 extending from the head cushion 2, a first guide sleeve 200 engaged with the first post 100, and a second guide sleeve 202 engaged with the second post 102. The first guide sleeve 200 can further include a first bearing 300 having a first and second distal end, and a locking mechanism 400. Similarly, the second guide sleeve 202 can further include a second bearing 300 having a first and second distal end. The first and second bearings 300, 302 can each have a first end 306 and a second end 308, the second end 308 having substantially the same shape as the first end 306. The locking mechanism 400 can be engaged to the first end 306.

In a particular embodiment, the head cushion 2 can be made of a foamed polymer material and can have an internal framework. The head cushion 2 can further include an outer material selected to cover the foamed plastic, such as, for example, a vinyl, a fabric, a leather, or a combination thereof. The internal framework can comprise any rigid material sufficient to support the head cushion 8. The internal framework can be formed from several axial members affixed together or from a single piece. Extending from the internal framework can be the first and second posts 100 and 102. The posts 100, 102 can be integral with the framework or can be attached to the framework in any manner recognizable to one having ordinary skill in the art.

For example, the posts 100, 102 can be welded to the framework. Alternatively, the posts 100, 102 can be mechanically deformed to engage the framework (e.g., the posts 100, 102 being crimped or bent around the framework). Alternatively, the posts 100, 102 can be affixed to the framework by a threadable engagement, or other similar type fastener.

In a particular embodiment, the first and second posts 100, 102 can extend in a substantially parallel orientation from the head cushion 2. In a further embodiment, the first and second posts 100, 102 can extend from the head cushion 2 in a parallel fashion. As used herein, "substantially parallel" refers to a relative angle as formed between two lines or planes of no greater than 10°, such as no greater than 5°, or even no greater than 1°. As used herein, "parallel" refers to a relative angle as formed between two lines or planes of no greater than 0.1°.

The posts 100, 102 can have a diameter, $D_P$, a circumference, $C_P$, and a length, $L_P$. In a particular embodiment, the posts 100, 102 can be sized such that they are of equal or variable lengths. The posts 100, 102 can be made from a material selected from metal, composite, polymer, ceramic, or any other material having sufficient rigidity and strength to withstand both lateral and axial forces exhibited during vehicular operation.

In a particular embodiment, at least a portion of the posts 100, 102 can be formed of straight, cylindrical rods. In a more particular embodiment, the posts 100, 102 can have one or more radial bends 104 therein. The radial bends 104 can offset the head cushion 2 from the seat back 4. In yet another embodiment, the posts 100, 102 can each include an articulated joint to enable rotational adjustment of the head cushion 2 relative to the seat back 4. In this regard, the head cushion 2 can be rotatably articulated around the top of the posts 100, 102. The articulated joint can be located within the head cushion 2.

Figure 4:
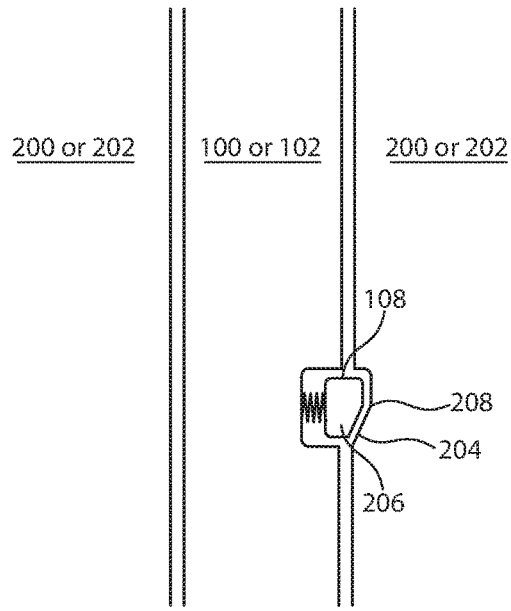
FIG. 4 includes a cross-sectional side view of a stop feature adapted to engage a post within a guide sleeve in accordance with an embodiment.

In a particular aspect, at least one of the posts 100, 102 can have a stop feature 108 (FIG. 4). The stop feature 108 can be adapted to engage with a complementary locking mechanism (described below) affixed to the seat back 4. In a particular aspect, the stop feature 108 can be a radial groove or channel extending at least partially around the circumference, $C_P$.

In an embodiment, the posts 100, 102 can have a smooth outer surface free of external indentations, external notches, grooves, and/or channels. The posts 100, 102 can have an adjustment length, $L_A$, as measured by the length of the segment of the posts 100, 102 that is exposed from the seat back 4 when the head restraint assembly 1 is at its maximum height.

In this regard, the adjustment length, $L_A$, can be increased by correspondingly increasing the length of $L_P$. In another aspect, $L_A$ can be increased by repositioning the stop feature 108 closer to the leading end 106 of the posts 100, 102.

In a particular embodiment, a ratio of $L_P:L_A$ can be no greater than 4.0, such as no greater than 3.5, no greater than 3.0, no greater than 2.5, no greater than 2.0, no greater than 1.5 no greater than 1.25, or even no greater than 1.1. The ratio of $L_P:L_A$ can be greater than 1.0, such as greater than 1.1, greater than 1.2, greater than 1.3, greater than 1.4, greater than 1.5, greater than 1.6, greater than 1.7, greater than 1.8, greater than 1.9, or even greater than 2.0. Additionally, the value for the ratio of $L_P:L_A$ can be selected from a value as within the range defined above.

The stop feature 108 can be separated from the leading end 106 of the posts 100, 102 a length, $L_{SF}$, as measured between the leading end 106 and the nearest surface of the stop feature 108. In a particular aspect, a ratio of $L_P:L_{SF}$ can be no greater than 100, such as no greater than 75, no greater than 50, no greater than 25, or even no greater than 10. The ratio of $L_P:L_{SF}$ can be no less than 0.5, such as no less than 1, no less than 5, no less than 10, no less than 20, no less than 30, no less than 40, or even no less than 50. Additionally, the value for the ratio of $L_P:L_{SF}$ can be selected from a value as within the range defined above.

In a particular embodiment the guide sleeves 200, 202 can additionally include a stop feature 204, which is adapted to engage with the stop feature 108 of the posts 100, 102. The stop features 108, 204 can be adapted to prevent the posts 100, 102 from disengaging from the guide sleeve guides 200, 202. The stop features 108, 204 can comprise any feature as would be recognizable to one having ordinary skill in the art for preventing axial disengagement of two substantially concentric components.

For example, as illustrated in FIG. 4, one of the stop features 108, 204 can comprise a radial projection 206 adapted to engage with a corresponding recess 208 in the other stop feature 108, 204. In a particular aspect, the radial projection 206 can be spring biased towards the corresponding recess 208. In this regard, the radial projection 206 can engage with the corresponding recess 208 and can prevent the posts 100, 102 from disengaging from the guide sleeves 200, 202.

Alternatively, the stop features 108, 204 can comprise a molly adapted to be engageable onto one of the posts 100, 102. The molly can be spring biased such that after insertion of the posts 100, 102 through the guide sleeves 200, 202, the molly expands or extends radially outward beyond the guide sleeves 200, 202. This expansion or extension can anchor the stop features 108, 204 and prevent the posts 100, 102 from disengaging from the guide sleeves 200, 202.

Referring again to FIG. 1 through FIG. 3, the first and second bearings 300, 302 can be adapted to engage around each of the first and second posts 100, 102. In particular embodiments, the posts 100, 102 and the bearings 300, 302 can have a poka yoke or other mechanism to assist in aligning the posts 100, 102 within the bearings 300, 302. As used herein, "poka yoke" refers to a complementary shaping feature located on each of the posts 100, 102 and the bearings 300, 302 to assist in preventing unintended movement between the parts and to facilitate easier assembly. For example, the poka yoke may comprise a tongue and groove extending along an axial length of the posts 100, 102 and the bearings 300, 302. In particular embodiments, the poka yoke can include interlocking ribs formed on one of the posts 100, 102 and bearings 300, 302 and channels on the other of the posts 100, 102 and bearings 300, 302, pins and grooves, or any other complementary engagement structure allowing for a more precise and defect-free assembling of components.

Figure 5:
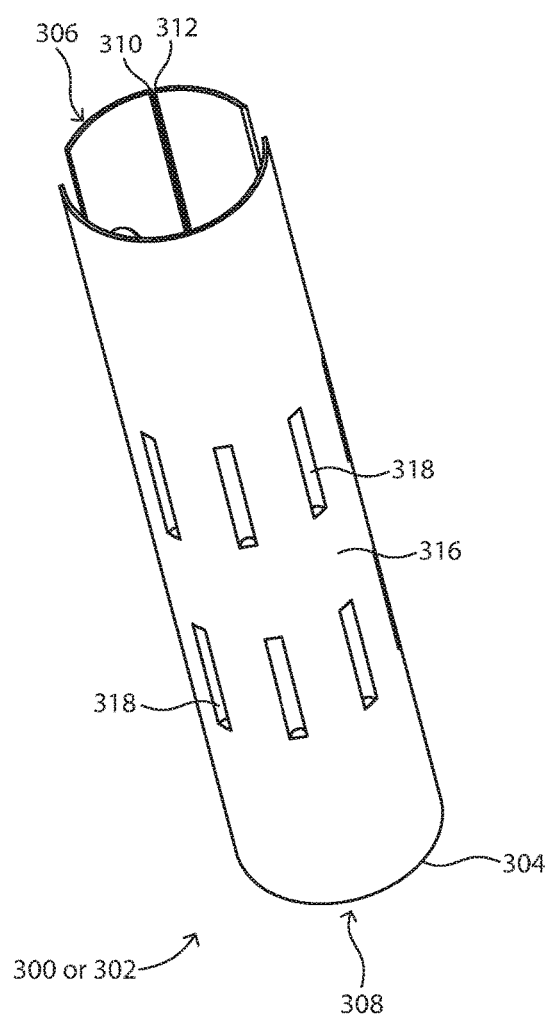
FIG. 5 includes a perspective view of a bearing in accordance with an embodiment.
Figure 6:
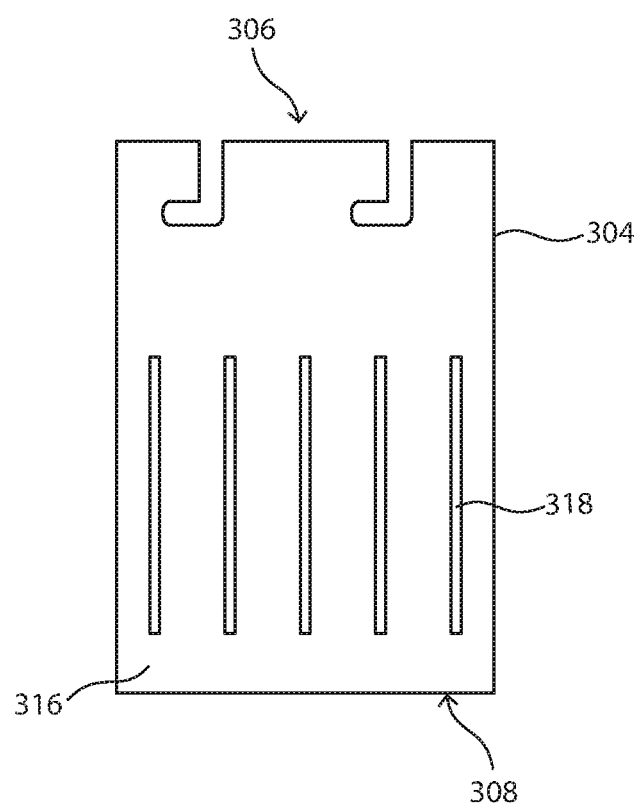
FIG. 6 includes a side plan view of a bearing in accordance with an embodiment.
Figures 9A, 9C:
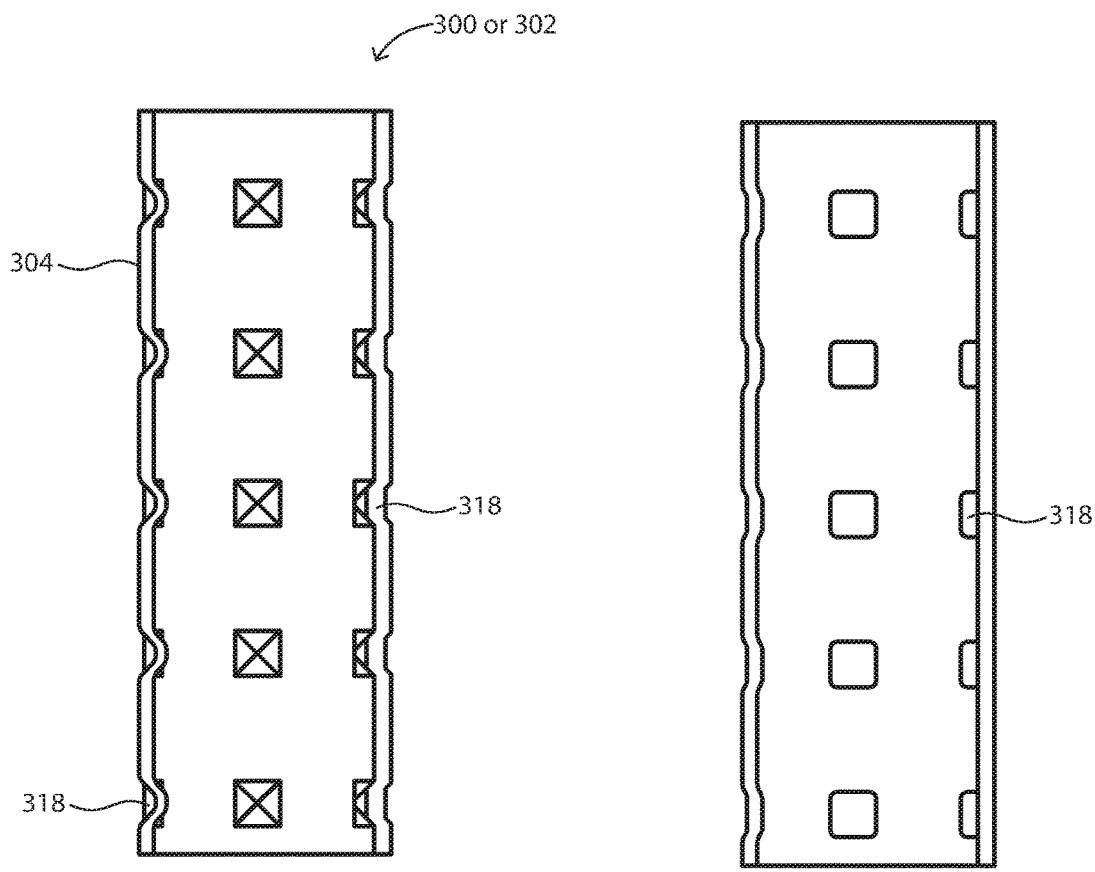
FIG. 9A includes a cross-sectional side view of a bearing in accordance with an embodiment prior to engagement with a post.
FIG. 9C includes a cross-sectional side view of a bearing in accordance with an embodiment after engagement with a post.
Figures 9B, 9D:
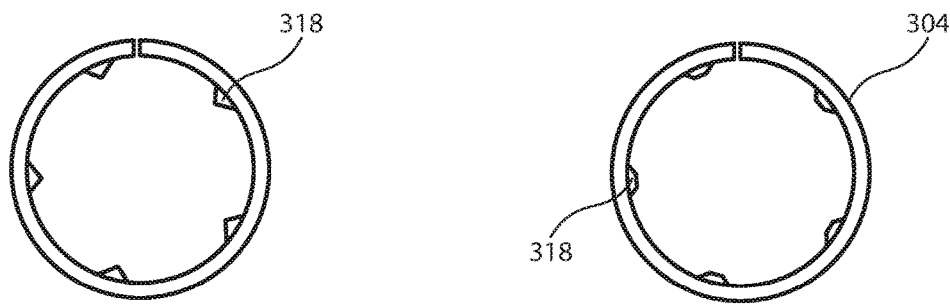
FIG. 9B includes a top view of a bearing in accordance with an embodiment prior to engagement with a post.
FIG. 9D includes a top view of a bearing in accordance with an embodiment after engagement with a post.
Figures 10A, 10C:
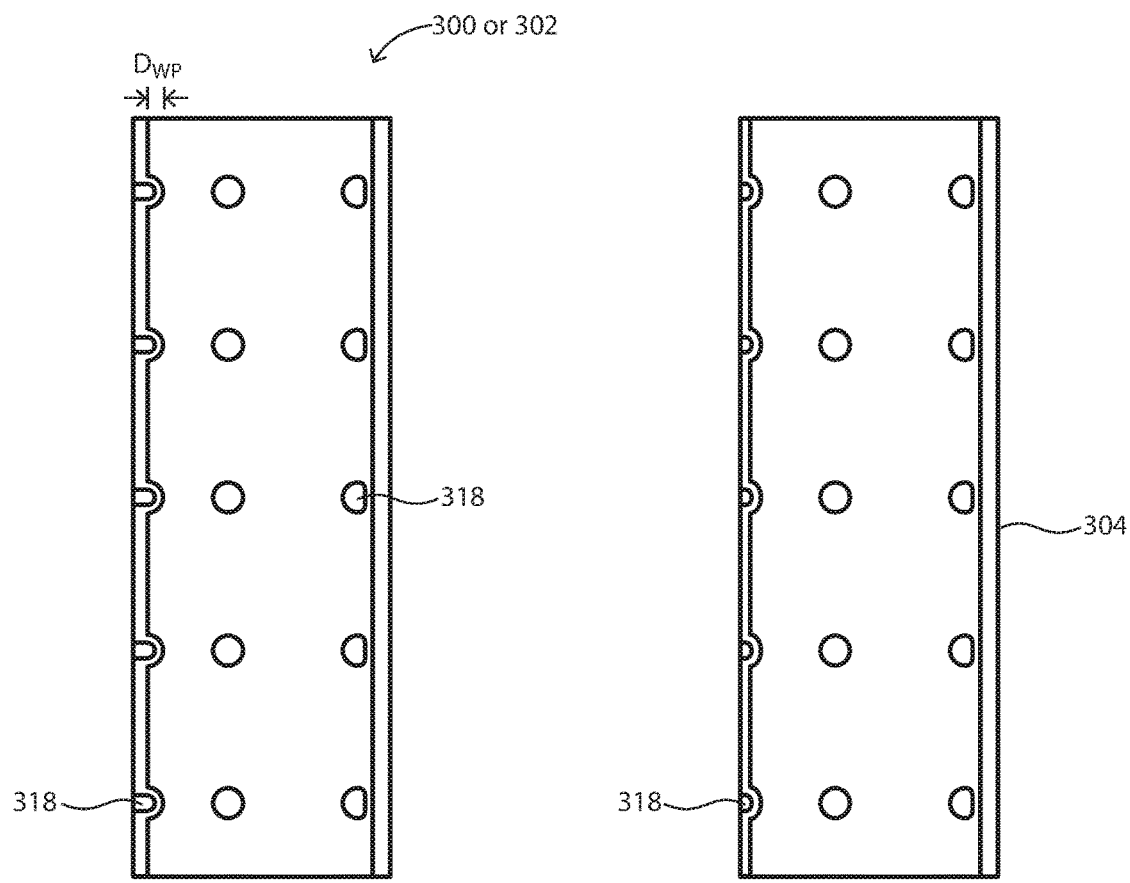
FIG. 10A includes a cross-sectional side view of a bearing in accordance with an embodiment prior to engagement with a post.
FIG. 10C includes a cross-sectional side view of a bearing in accordance with an embodiment after engagement with a post.
Figures 10B, 10D:
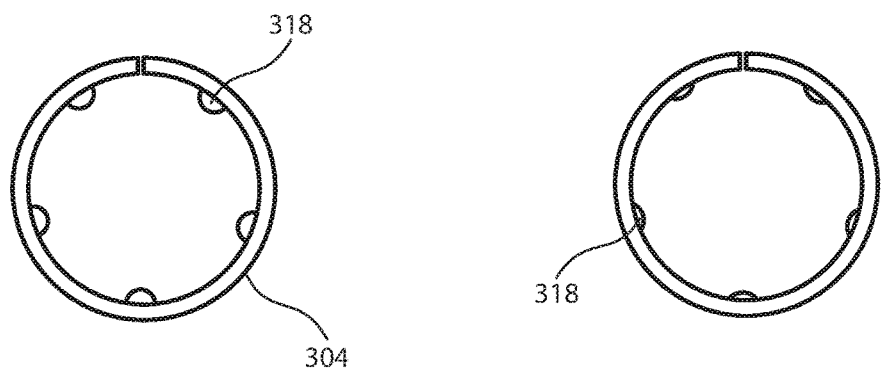
FIG. 10B includes a top view of a bearing in accordance with an embodiment prior to engagement with a post.
FIG. 10D includes a top view of a bearing in accordance with an embodiment after engagement with a post.

Referring now to FIG. 5 and FIG. 6, in a particular embodiment, the bearings 300, 302 can be formed from a strip 304 of resilient material, e.g. spring steel, having opposite axial ends 306, 308 and circumferential ends 310, 312. The strip 304 can include an undeformed portion 316 and at least one row of wave structures 318. The wave structures 318 can be press-formed, e.g. stamped, into the strip 304. As used herein, "undeformed portion" can refer to an annular sidewall of the bearing(s) from which wave structure(s) protrude. More particularly, the "undeformed portion" can include a portion of the strip 304 that is not deformed other than during forming of an annular, or cylindrical, shape, e.g., the undeformed portion is devoid of wave structure(s). As used herein, the "undeformed portion"

can include an annular sidewall of the bearing(s) defining at least one of an inner diameter or an outer diameter of the bearing(s).

In a particular embodiment, illustrated in FIG. 7A through 7D, each wave structure 318 can be substantially identical in size and shape to permit a more even radial compression around the circumference of the bearings 300, 302. In a particular embodiment, the wave structures 318 can have a length, $L_{WS}$, extending at least partially between the axial ends 306, 308. In another embodiment, the wave structures 318 can extend parallel with the axial ends 306, 308. In a further embodiment, the wave structures 318 can extend in any angular orientation relative the axial ends 306, 308.

For example, as illustrated in FIG. 8A through 8D, the wave structures 318 can be formed parallel to the ends 306, 308. In a further embodiment, each wave structure 318 can have unique or dissimilar characteristics. In a particular aspect, the wave structures 318 can be substantially rectangular cuboids. In another aspect, as illustrated in FIG. 9A through 9D, the wave structures 318 can be substantially pyramidal. In a further aspect, as illustrated in FIG. 10A through FIG. 10D, the wave structures 318 can be hemispherical dimples. In yet another aspect, the wave structures 318 can be conical. Additionally, the wave structures 318 can be formed to have any other projecting surface capable of engaging an inner post 100, 102.

In a particular embodiment, the wave structures 318 can have a uniform projecting distance, $D_{WP}$. In an alternative embodiment, the wave structures 318 can have varying projecting distances, $D_{WP}$.

In a particular aspect, there can be a number of wave structures, $N_{WS}$, located peripherally around the bearings 300, 302. $N_{WS}$ can be at least 3, such as $N_{WS}$ is at least 4, at least 5, at least 6, at least 7, at least 8, at least 9, at least 10, at least 11, at least 12, at least 13, at least 14, at least 15, or even at least 16. $N_{WS}$ can be no greater than 40, such as no greater than 35, not greater than 30, no greater than 25, no greater than 20, no greater than 15, or even not greater than 10. $N_{WS}$ can also be within a range between and including any of the above described values.

Further, each wave structure 318 can include a number of rows (extending circumferentially), $N_{SWS}$, of smaller wave structures 318. $N_{SWS}$ can be at least 2, such as at least 3, or even at least 4. $N_{SWS}$ can be no greater than 6, such as not greater than 5, not greater than 4, or even not greater than 3. $N_{SWS}$ can also be within a range between and including any of the above described values.

In this aspect, it should be understood that all reference to wave structures 318 herein can include either a single wave structure 318 or any number of wave structures, $N_{SWS}$, within the range defined above. It should be further understood that each wave structure 318 can have identical or varying dimensional and physical characteristics. In a particular aspect, the wave structures 318 can vary in shape and dimensional size around the circumference of the bearings 300, 302. In another aspect, all of the wave structures 318 can be substantially identical.

Figure 11:
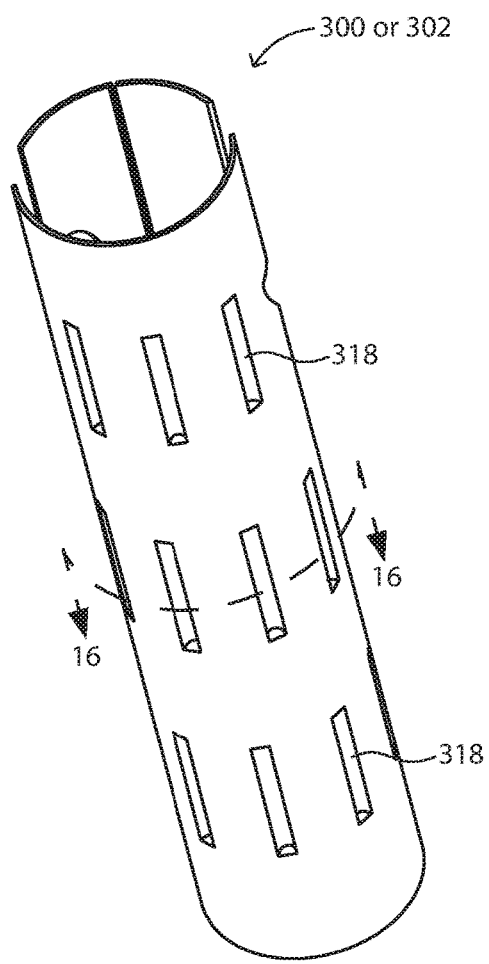
FIG. 11 includes a perspective view of a bearing in accordance with an embodiment.

Moreover, the wave structures 318 can be disposed of along the strip 304 rectilinearly, as illustrated in FIG. 5, or non-rectilinearly, as illustrated in FIG. 11. In the latter embodiment, the wave structures 318 can be staggered around the strip 304 such that the wave structures 318 do not align axially. In this regard, the wave structures 318 can be adapted to provide a substantially even radially inward compressive force against the posts 100, 102 disposed of within the bearings 300, 302. When viewed along the length of the bearings 300, 302, each bearing 300, 302 can have at least 3 wave structures, such as at least 4 wave structures, at least 5 wave structures, or even at least 6 wave structures circumferentially disposed around the bearing 300, 302.

Figure 12B:
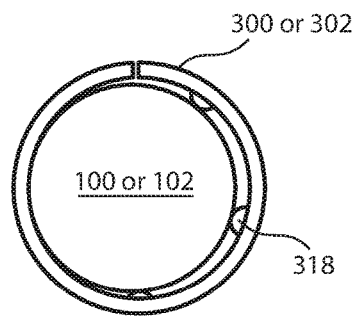
FIG. 12B includes a top view of a bearing engaged with a post in accordance with an embodiment.
Figure 12A:
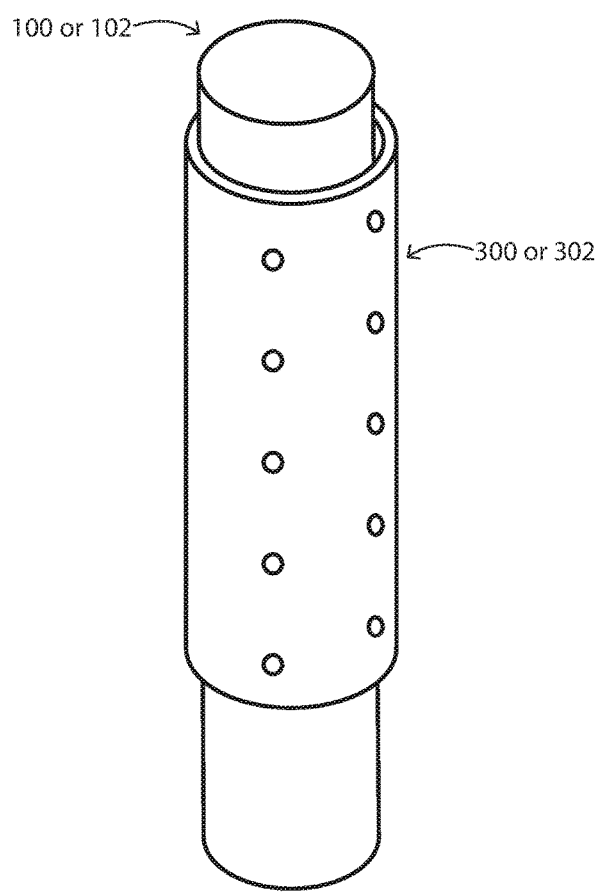
FIG. 12A includes a perspective view of a bearing engaged with a post in accordance with an embodiment.
Figure 12C:
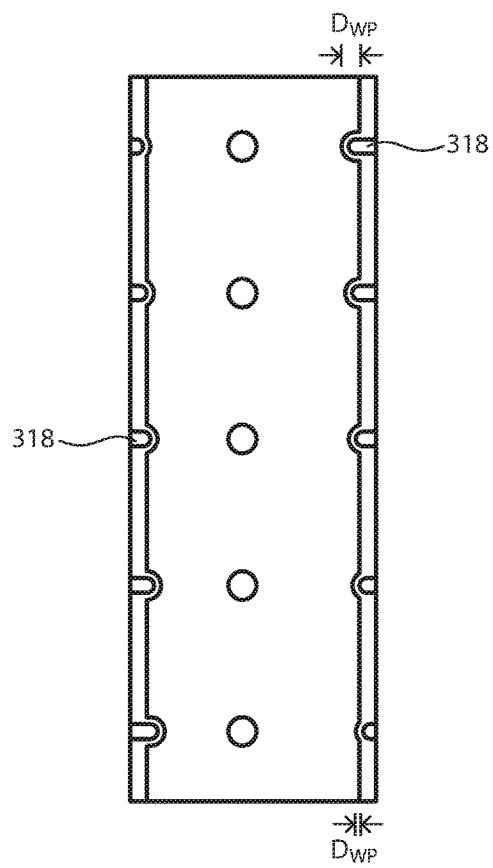
FIG. 12C includes a cross-sectional side view of a bearing in accordance with an embodiment.
Figure 13B:
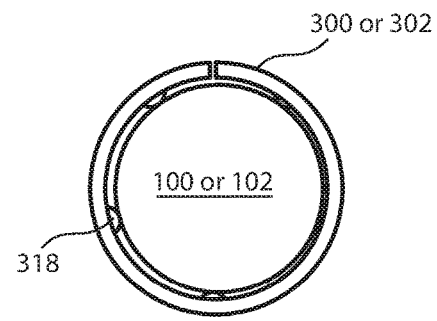
FIG. 13B includes a top view of a bearing engaged with a post in accordance with an embodiment.
Figure 13A:
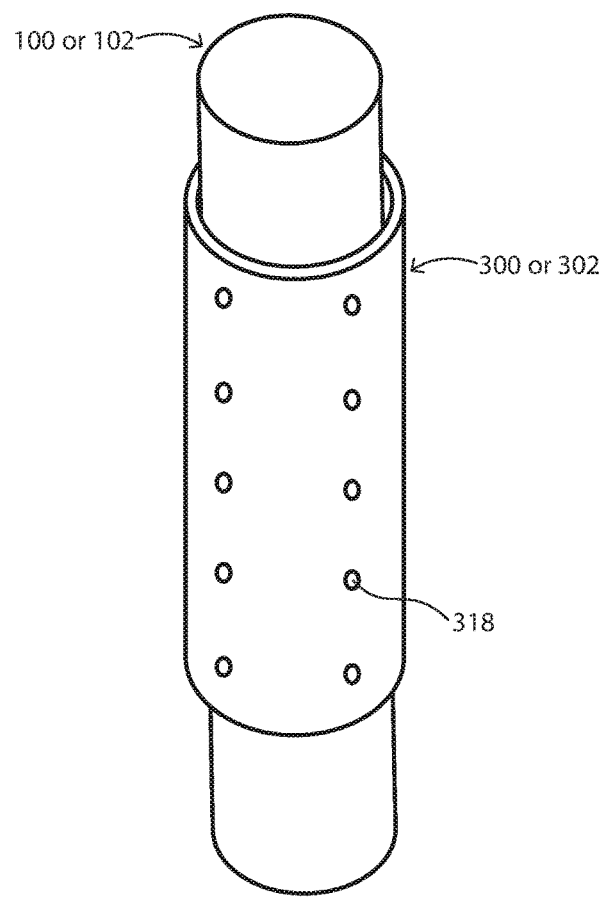
FIG. 13A includes a perspective view of a bearing engaged with a post in accordance with an embodiment.
Figure 13C:
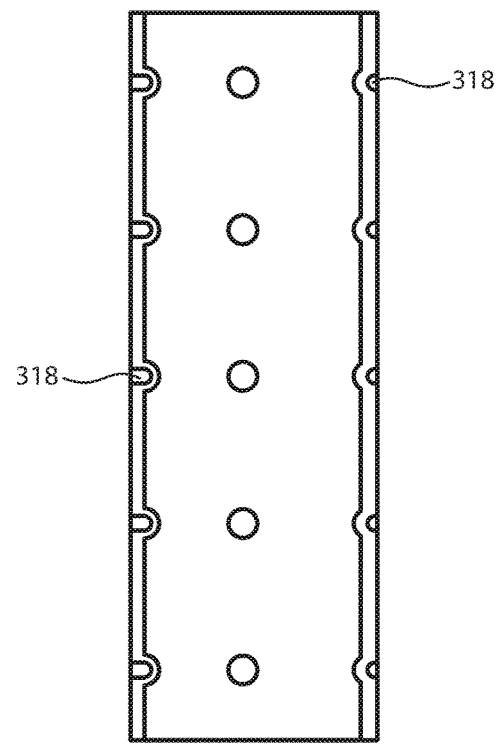
FIG. 13C includes a cross-sectional side view of a bearing in accordance with an embodiment.

As illustrated in FIG. 12A through FIG. 12C, in a particular embodiment, the bearings 300, 302 can be adapted to receive an angled post 100, 102 therein. The wave structures 318 can have variable projecting distances, $D_{WP}$, to accommodate for this angular engagement. In a further embodiment, illustrated in FIG. 13A through FIG. 13C, the bearings 300, 302 can be adapted to receive off-centered posts 100, 102 that are not concentrically aligned with the bearings 300, 302. In this regard, the wave structures 318 can be formed such that the wave structures 318 are substantially identical in the axial direction but increase or decrease circumferentially.

In a particular embodiment, to form the bearings 300, 302, the strip 304 can be curved to form an annular ring by bringing circumferential ends 310, 312 towards one another. The resulting bearings 300, 302 can each have a central axis 322, and a functional circumference, $C_F$, as measured circumferentially by a best fit circle tangent to an innermost portion 320 of the wave structures. In a particular embodiment, the strip 304 can be curved to form an overlap between ends 310, 312 to increase the dimensional range that the bearings 300, 302 can accommodate.

Figure 14A:
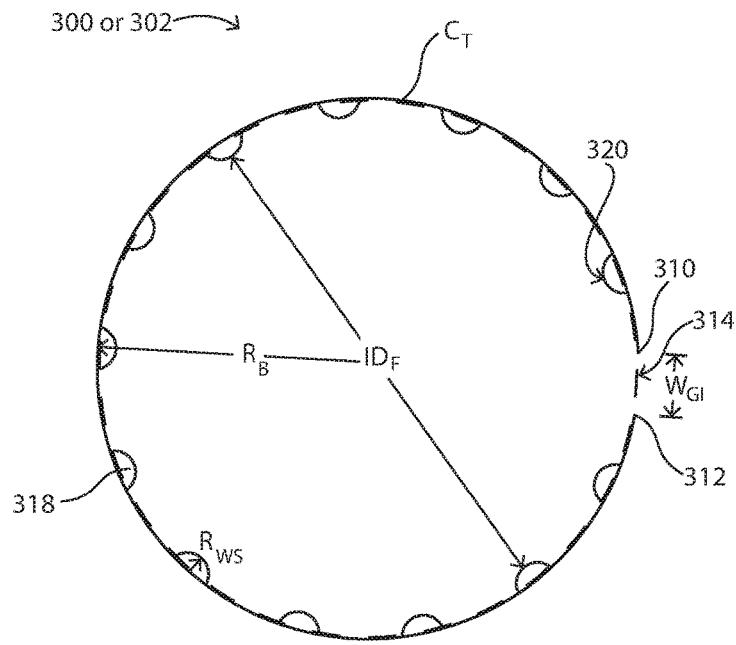
FIG. 14A includes a top view of a bearing in accordance with an embodiment prior to engagement with a post.

As illustrated in FIG. 14A, in a particular aspect, the bearings 300, 302 can have a functional inner diameter, $ID_F$, as measured between the inner surface 320 of two opposite wave structures 318, 318 prior to engagement with the posts 100, 102. The posts 100, 102 can comprise an outer diameter, $D_P$. In a particular aspect, a ratio of $D_P:ID_F$ can be no greater than 1.5, such as no greater than 1.45, no greater than 1.4, no greater than 1.35, no greater than 1.3, no greater than 1.25, no greater than 1.2, no greater than 1.15, no greater than 1.1, no greater than 1.05, or even no greater than 1.025. The ratio of $D_P:ID_F$ can be no less than 1.005, such as no less than 1.01, no less than 1.02, no less than 1.03, no less than 1.04, no less than 1.05, no less than 1.06, no less than 1.07, no less than 1.08, no less than 1.09, or even no less than 1.1. Additionally, the ratio of $D_P:ID_F$ can also be within a range between and including any of the ratio values described above. In a particular aspect, as the ratio of $D_P:ID_F$ increases, the wave structures 318 can provide a greater radial force against the posts 100, 102.

The bearings 300, 302 can further comprise a total circumference, $C_T$, which can be measured by a best fit circle along the inner surface 336 of the undeformed portion 316 of the bearings 300, 302 prior to insertion of the posts 100, 102 therein.

In a particular embodiment, the bearings 300, 302 can have an initial gap 314 between ends 310, 312. The initial gap 314 can be defined as the gap between the ends 310, 312 prior to insertion of the posts 100, 102 into the bearings 200, 203. The initial gap 314 can have an initial width, $W_{GI}$, as measured perpendicular between ends 310, 312. A ratio of $W_{GI}:C_T$ can be no greater than than 0.30, such as no greater than 0.25, no greater than 0.20, no greater than 0.15, no greater than 0.10, less than 0.05, or even less than 0.04. The ratio of $W_{GI}:C_T$ can be no less than 0.01, such as no less than 0.02, no less than 0.03, no less than 0.04, no less than 0.05, no less than 0.06, no less than 0.07, no less than 0.08, no less than 0.09, or even no less than 0.10. The ratio of $W_{GI}:C_T$ can also be within a range between and including any of the ratio values described above. As used herein, $C_T$ can be understood to include both the circumferential length of the inner surface 336 of the bearing 300, 302 and the length, $W_{GI}$, of the gap 314.

Figure 14B:
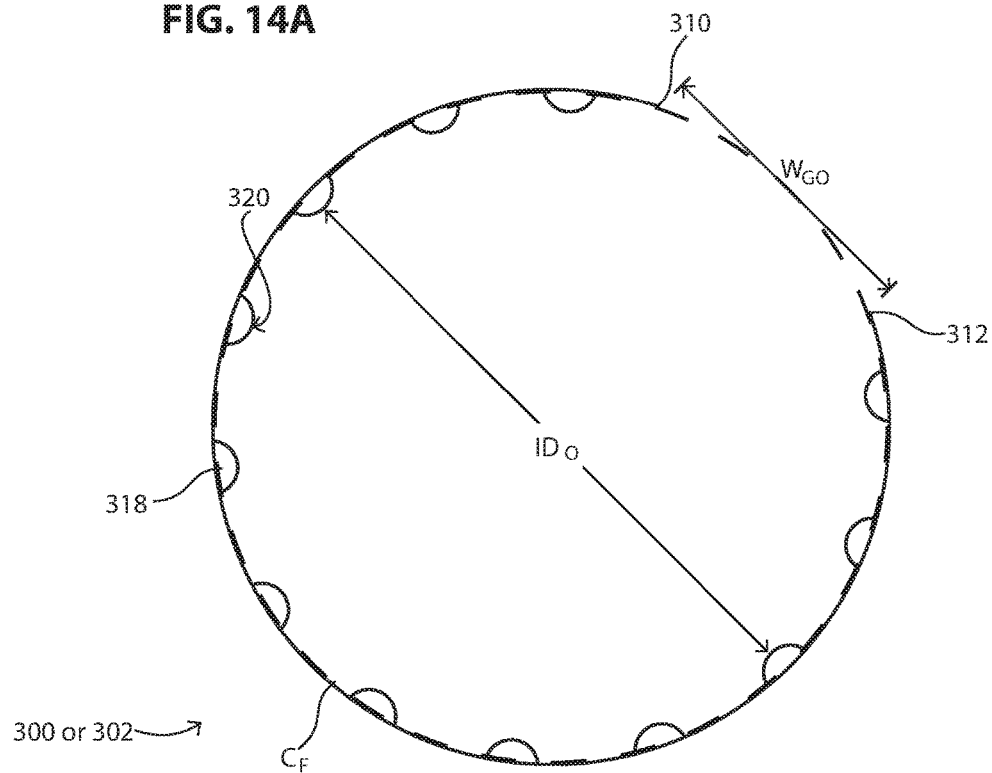
FIG. 14B includes a top view of a bearing in accordance with an embodiment after engagement with a post.

Further, in a particular embodiment, as illustrated in FIG. 14B, upon insertion of the posts 100, 102 into the bearings 300, 302, the width between the ends 310, 312 can increase to form an operational gap 338 having a width, $W_{GO}$. A ratio of $W_{GO}:W_{GI}$ can be no less than 0.01, such as no less than 0.02, no less than 0.03, no less than 0.04, no less than 0.05, no less than 0.10, no less than 0.15, no less than 0.20, no less than 0.25, no less than 0.30, no less than 0.35, or even no less than 0.40. The ratio of $W_{GO}:W_{GI}$ is no greater than 0.75, such as no greater than 0.70, no greater than 0.65, no greater than 0.60, no greater than 0.55, no greater than 0.50, no greater than 0.45, no greater than 0.40, no greater than 0.35, no greater than 0.30, no greater than 0.25, no greater than 0.20, no greater than 0.15, no greater than 0.10, or even no greater than 0.05. The ratio of $W_{GO}:W_{GI}$ can also be within a range between and including any of the ratio values described above.

In a further embodiment, the bearings 300, 302 can have an operational inner diameter, $ID_O$, which can be measured between the inner surface 320 of two opposite wave structures 318, 318 after engagement of the bearings 300, 302 with the posts 100, 102. In a particular aspect, a ratio of $ID_O:ID_F$ can be no less than 1.05, such as no less than 1.10, no less than 1.15, no less than 1.20, no less than 1.25, no less than 1.30, no less than 1.35, no less than 1.40, no less than 1.45, no less than 1.50, no less than 1.55, or even no less than 1.60. The ratio of $ID_O:ID_F$ can be no greater than 2.00, such as no greater than 1.75, no greater than 1.50, no greater than 1.25, or even no greater than 1.10. The ratio of $ID_O:ID_F$ can also be within a range between and including any of the ratio values described above.

In a particular aspect, the bearings 300, 302 can have a functional circumference, as measured by a best fit circle along the undeformed portion 316 of the bearings 300, 302 after insertion of the posts 100, 102 therein. A ratio of $C_T:C_F$ can be at least 1.025, at least 1.05, at least 1.1, at least 1.2, at least 1.3, at least 1.4, at least 1.5, at least 1.75, or even at least 2.0. The ratio of $C_T:C_F$ can be less than 5, less than 4, less than 3, less than 2, or even less than 1.5. The ratio of $C_T:C_F$ can also be within a range between and including any of the ratio values described above.

In a particular aspect each wave structure 318 can have an arcuate cross-section with a radius of curvature, $R_{WS}$, measured perpendicularly from the undeformed portion 316 of the strip 304 to the inner surface 320 of the wave structure 318. In cases where the wave structures 318 have varying curvatures (e.g., parabolic shaped) the $R_{WS}$ is measured according to the best fit circle within the wave structure 318. The bearings 300, 302 can also have a body radius, $R_B$, which can be measured perpendicular from the central axis 322 of the bearings 300, 302 to the undeformed portion 316.

Further, in a particular aspect $R_{WS}$ can be no greater than 0.50 $R_B$, such as no greater than 0.45 $R_B$, no greater than 0.40 $R_B$, no greater than 0.35 $R_B$, no greater than 0.30 $R_B$, no greater than 0.25 $R_B$, no greater than 0.20 $R_B$, no greater than 0.15 $R_B$, no greater than 0.10 $R_B$, or even no greater than 0.05 $R_B$. Furthermore, $R_{WS}$ can be at least 0.01 $R_B$, such as at least 0.02 $R_B$, at least 0.03 $R_B$, at least 0.04 $R_B$, at least 0.05 $R_B$, at least 0.10 $R_B$, at least 0.15 $R_B$, or even at least 0.20 $R_B$. The relationship of $R_B$ and $R_{WS}$ can also be within a range between and including any of the ratio values described above.

Figure 15:
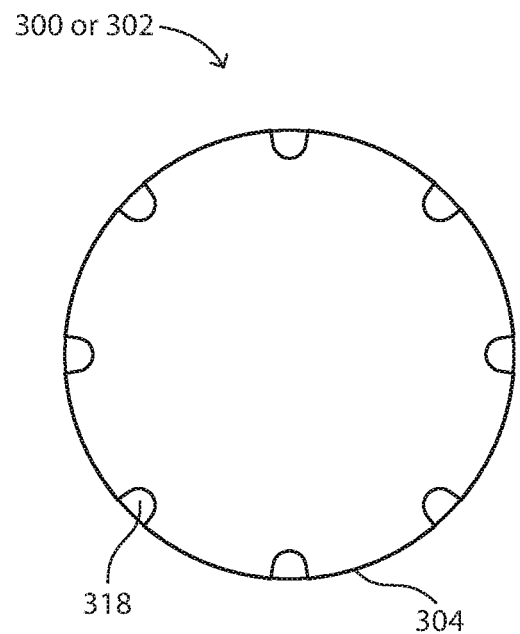
FIG. 15 includes a top view of a bearing in accordance with an alternative embodiment.
Figure 16:
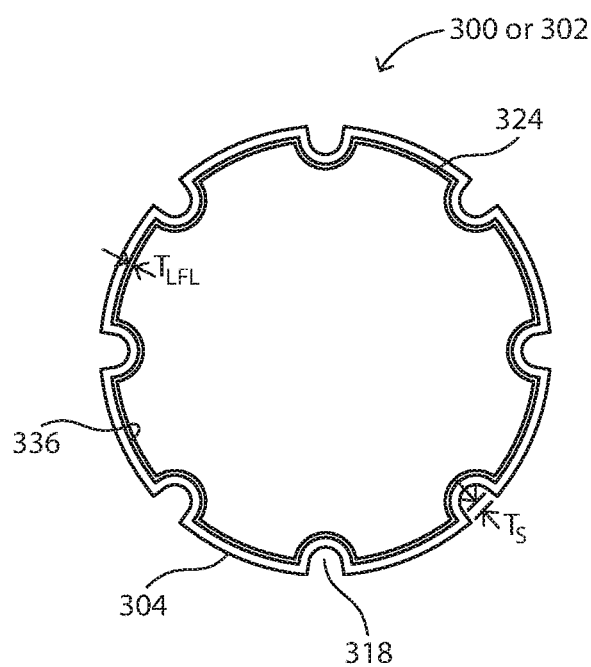
FIG. 16 includes a cross-sectional top view of a bearing including a low friction layer in accordance with an embodiment, taken along Line 16-16 in FIG. 11.

In a particular embodiment, illustrated in FIG. 15, the bearings 300, 302 can include only the strip of material 304. In another embodiment, as illustrated in FIG. 16, the bearings 300, 302 can further include a low friction layer 324 which can provide enhanced sliding characteristics with the posts 100, 102. The low friction layer 324 can comprise materials including, for example, a polymer, such as a plyketone, polyaramid, a polyimide, a polytherimide, a polyphenylene sulfide, a polyetherslfone, a polysulfone, a polyheylene sulfone, a polyamideimide, ultra high molecular weight polyethylene, a fluoropolymer, a polyamide, a polybenzimidazole, or any combination thereof.

In an example, the polymer material includes a polyketone, a polyaramid, a polyimide, a polyetherimide, a polyamideimide, a polyphenylene sulfide, a polyphenylene sulfone, a fluoropolymer, a polybenzimidazole, a derivation thereof, or a combination thereof. In a particular example, the thermoplastic material includes a polymer, such as a polyketone, a thermoplastic polyimide, a polyetherimide, a polyphenylene sulfide, a polyether sulfone, a polysulfone, a polyamideimide, a derivative thereof, or a combination thereof. In a further example, the material includes polyketone, such as polyether ether ketone (PEEK), polyether ketone, polyether ketone ketone, polyether ketone ether ketone, a derivative thereof, or a combination thereof. In an additional example, the thermoplastic polymer may be ultra high molecular weight polyethylene.

An example fluoropolymer includes fluorinated ethylene propylene (FEP), PTFE, polyvinylidene fluoride (PVDF), perfluoroalkoxy (PFA), a terpolymer of tetrafluoroethylene, hexafluoropropylene, and vinylidene fluoride (THV), polychlorotrifluoroethylene (PCTFE), ethylene tetrafluoroethylene copolymer (ETFE), ethylene chlorotrifluoroethylene copolymer (ECTFE), or any combination thereof. Fluoropolymers are used according to particular embodiments.

Additionally, the bearings 300, 302 can include lubrication to further enhance sliding characteristics between the bearing 300, 202 and the posts 100, 102. Exemplary lubricants can include molybdenum disulfide, tungsten disulfide, graphite, grapheme, expanded graphite, boron nitrade, talc, calcium fluoride, or any combination thereof. Additionally, the lubricant can comprise alumina, silica, titanium dioxide, calcium fluoride, boron nitride, mica, Wollastonite, silicon carbide, silicon nitride, zirconia, carbon black, pigments, or any combination thereof.

A combination of the spring characteristics of the bearing 300, 302 with the low friction/lubrication characteristics of the low friction layer 324 can provide a low friction sliding surface.

In a particular embodiment, the strip 304 can have a thickness, $T_S$, and the low friction layer 324 can have a thickness, $T_{LFL}$. A ratio of $T_S:T_{LFL}$ can be at least 1, such as at least 1.5, at least 2, at least 2.5, at least 3, at least 3.5, at least 4, at least 4.5, or even at least 5. The ratio of $T_S:T_{LFL}$ can be no greater than 50, such as no greater than 40, no greater than 30, no greater than 20, or even no greater than 10. Additionally, the ratio of $T_S:T_{LFL}$ can be within a range between and including any of the ratio values described above.

In a particular embodiment, the low friction layer 324 can have a thickness of no less than 0.01 mm, such as no less than 0.05 mm, no less than 0.1 mm, no less than 0.2 mm, no less than 0.3 mm, no less than 0.4 mm, no less than 0.5 mm, no less than 0.6 mm, no less than 0.7 mm, no less than 0.8 mm, no less than 0.9 mm, or even no less than 1 mm. The thickness of the low friction layer 324 can be no greater than 10 mm, such as no greater than 9 mm, no greater than 8 mm, no greater than 7 mm, no greater than 6 mm, no greater than 5 mm, no greater than 4 mm, no greater than 3 mm, no greater than 2 mm, or even no greater than 1 mm. Additionally, the thickness of the low friction layer 324 can also be within a range between and including any of the ratio values described above.

In some embodiments, the low friction layer 324 can be laminated onto an inner surface 336 of the bearings 300, 302. In other embodiments, the low friction layer 224 can be affixed to the inner surface 336 of the bearings 300, 302 by chemical process. In yet another embodiment, the low friction layer 224 can be affixed to the inner surface 336 of the bearings 300, 302 by mechanical deformation. In still other embodiments, the low friction layer 324 can be attached to the bearing 300, 302 by any method known in the art. After the low friction layer 324 is attached to the strip 304 of the bearing 300, 302 the resulting structure can be stamped, e.g. pressed using a suitably shaped mold, rotary wave forming, etc., to form the wave structures 318. Thus, the wave structures 318 can be formed from both the strip of resilient material 304 and from the low friction layer 324.

In a particular embodiment, the bearings 300, 302 can reduce frictional resistance of the posts 100, 102 within the guide sleeves 200, 202, allowing for easier translation of the head restraint assembly 1 relative the seat back 4. In another embodiment, the bearings 300, 302 can provide a zero-clearance fit between the guide sleeves 200, 202 and the posts 100, 102. In yet a further embodiment, the bearings 300, 302 can eliminate or substantially reduce squeaking of the assembly 1 when the posts 100, 102 are translated relative the guide sleeves 200, 202.

In a particular embodiment, the bearings 300, 302 can be adapted to apply a radially inward force against the posts 100, 102 so as to form a "zero-clearance" fit therebetween. In this regard, a zero-clearance fit can be formed between the bearings 300, 302 and the posts 100, 102. As used herein, the term "zero-clearance" is defined by an engagement between a bearing and a post substantially devoid of perceptible radial play or movement upon application of a force against the bearing perpendicular to the central axis of the bearing, while holding the post installed therein stationary at 0 degrees, 45 degrees, 90 degrees, 135 degrees, 180 degrees, 225 degrees, and 270 degrees positions.

In a particular aspect, it is desirable for the bearings 300, 302 to provide a high degree of radial stiffness to the posts 100, 102 while simultaneously permitting low axial sliding forces of the posts 100, 102 within the bearings 300, 302. In this regard, the head restraint assembly 1 can support high normal loads while simultaneously permitting translation of the posts 100, 102 within the bearings 300, 302 upon application of a minimal axial load.

In a particular embodiment, the bearings 300, 302 can form an interference fit with the posts 100, 102 such that the bearings 300, 302 can provide the posts 100, 102 with a radial stiffness of no less than about 2,000 N/mm while simultaneously allowing the posts to translate upon an axial sliding force of no greater than about 30 N. In further embodiments, the bearings 300, 302 can provide the posts with a radial stiffness of no less than about 2,250 N/mm, no less than about 2,500 N/mm, no less than about 2,750 N/mm, no less than about 3,000 N/mm, no less than about 3,500 N/mm, or no less than about 4,000 N/mm. Radial stiffness of the bearings 300, 302 can be determined at anytime after insertion of the posts 100, 102 in the bearings 300, 302. For example, after one of the posts 100, 102 has been inserted into one of the bearings 300, 302 as previously described, the radial stiffness of the post 100, 102 and bearing 300, 302 preassembly can be determined by fixing one of the post 100, 102 or bearings 300, 302 and applying a perpendicular normal force to the other one of the post 100, 102 or bearings 300, 302. The force necessary to affect radial movement of one of the posts 100, 102 or bearings 300, 302 can be determinative of the radial stiffness of the bearings 300, 302.

In particular embodiments, the bearings 300, 302 can provide a desired radial stiffness while simultaneously permitting axial translation of the posts 100, 102 therein upon application of an axial sliding force of no greater than about 29 N, no greater than about 28 N, no greater than about 27 N, no greater than about 26 N, no greater than about 25 N, no greater than about 24 N, no greater than about 23 N, no greater than about 22 N, no greater than about 21 N, no greater than about 20 N, no greater than about 19 N, no greater than about 18 N, no greater than about 17 N, no greater than about 16 N, no greater than about 15 N, no greater than about 14 N, no greater than about 13 N. In this regard, the bearings 300, 302 can provide an affective resistance to radial movement while permitting axial translation of the posts 100, 102 upon application of a minimal longitudinal force.

In a particular aspect, the zero-clearance between the bearings 300, 302 and the posts 100, 102 can be generated by the wave structures 318 of the bearings 300, 302 extending radially inward from the bearing 300, 302 walls and compressing against the posts 100, 102 along a best fit circle tangent to the inner wave surface 320. In a particular embodiment, each of the wave surfaces 320 can define a point contact location adapted to contact with the posts 100, 102 along the best fit circle. In another embodiment, the wave surfaces 320 can define a planar portion adapted to provide an area contact location between the posts 100, 102 and the bearings 300, 302. In this regard, the contact between the posts 100, 102 and the bearings 300, 302 can be either point contact or area contact.

In particular embodiments, each of the wave structures 318 can have a best fit circle having an initial diameter, $D_I$, as measured by the diameter of the best fit circle prior to installation of the posts 100, 102, and an operational diameter, $D_O$, as measured by the diameter of the best fit circle after installation of the posts 100, 102 therein. As contemplated herein, a zero clearance fit between the bearings 300, 302 and the posts 100, 102 can require that $D_O$ be greater than $D_I$. In this regard, a ratio of $D_I:D_O$ can be no greater than 0.999, no greater than 0.995, no greater than 0.990, no greater than 0.985, no greater than 0.980, no greater than 0.975, no greater than 0.970, no greater than 0.950, no greater than 0.925, no greater than 0.900. The ratio of $D_I:D_O$ can be no less than 0.4, no less than 0.5, no less than 0.6, no less than 0.7, no less than 0.8, no less than 0.9, no less than 0.95, no less than 0.96, no less than 0.97, no less than 0.98, no less than 0.99. Moreover, the ratio of $D_O:D_I$ can be within a range between and including any of the ratio values described above, such as, for example, between 0.95 and 0.99.

In a particular aspect, the ratio between $D_I:D_O$ can be adjusted by selection of posts 100, 102 having a desirable outer diameter, $D_P$. As $D_P$ is increased relative to $D_O$, the resulting $D_I$ can increase to affect the relative zero clearance fit between the posts 100, 102 and the bearings 300, 302.

In further embodiments, at least one of the bearings 300, 302 of the guide sleeves 200, 202 can have a bi-modal radial stiffness profile, as will be described in greater detail below. In yet other embodiments, both of the bearings 300, 302 can have a bi-modal radial stiffness profile.

In such a manner, the bearings 300, 302 can have an initial unassembled radial stiffness as measured prior to insertion of the posts 100, 102 therein, and an assembled radial stiffness as measured after insertion of the posts 100, 102 therein. In particular embodiments, the bearings 300, 302 can be formed such that the assembled radial stiffness is different than the initial unassembled radial stiffness.

Figure 34:
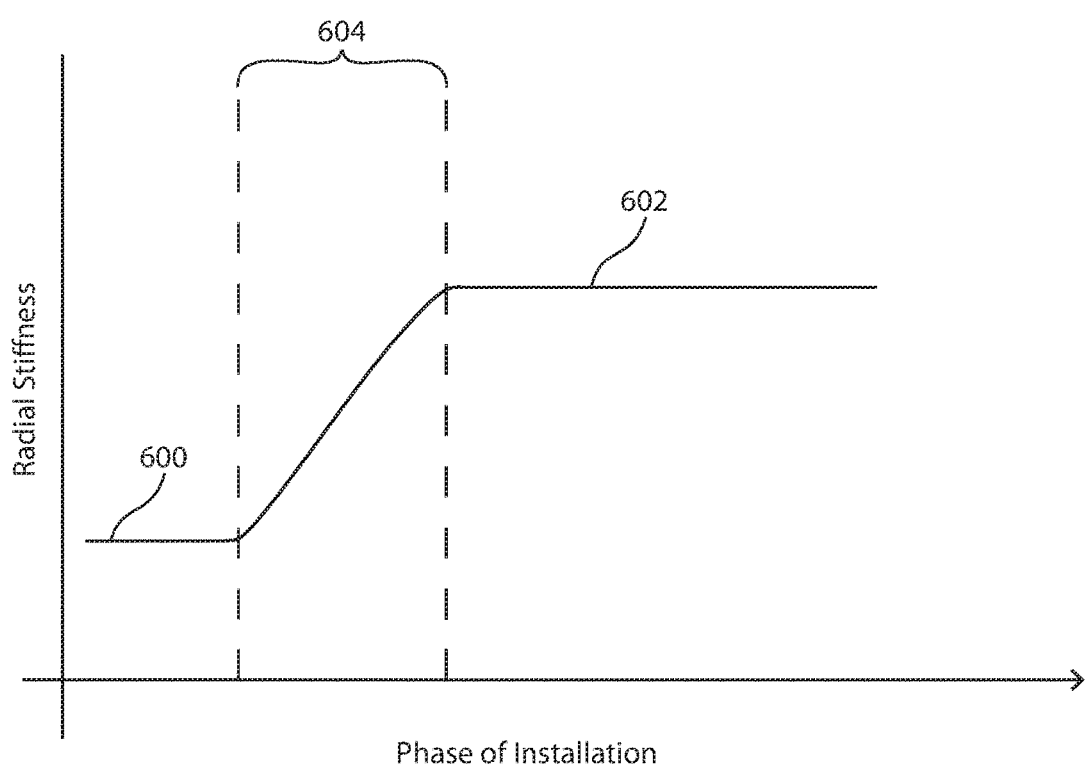
FIG. 34 includes a chart of radial stiffness in accordance with an embodiment.

For example, as shown in FIG. 34, the bearing(s) can have an initial unassembled radial stiffness (shown at line section 600) prior to the post(s) being inserted into the bearing(s). The bearing(s) can have an assembled radial stiffness (shown at line section 602) as measured after insertion of the post(s) into the bearing(s). During insertion of the post(s), the radial stiffness profile of the bearing(s) can increase, as seen at transition phase 604. It should be understood that the radial stiffness profile of the bearing(s) as seen at transition phase 604 is merely illustrative and can have any contour (e.g., arcuate, linear, etc.), duration, and/or slope. Accordingly, the transition phase 604 can be affected by any number of parameters, such as, for example, the material selection of the bearing(s), the geometric shape and orientation of the features herein described, and the forces used during assembly.

The bi-modal radial stiffness profile shown in FIG. 34 can permit insertion of the post(s) into the bearing(s) upon application of a low axial force (e.g., less than about 100N, such as less than about 90 N, less than about 80 N, or even less than about 75N), while simultaneously permitting the bearing(s) to exhibit a relatively high assembled radial stiffness (e.g., no less than about 1000 N/mm, such as no less than about 1500 N/mm, or even no less than about 2000 N/mm).

In this regard, in particular embodiments, the bearing(s) can have an assembled radial stiffness of no less than about 1,000 N/mm while requiring an initial assembly force of no greater than about 100 N. In further embodiments, the bearing(s) can have an assembled radial stiffness of no less than about 1100 N/mm, such as no less than about 1200 N/mm, no less than about 1300 N/mm, no less than about 1500 N/mm, no less than about 1700 N/mm, no less than about 2000 N/mm, no less than about 2100 N/mm, no less than about 2200 N/mm, no less than about 2300 N/mm, no less than about 2400 N/mm, no less than about 2500 N/mm, no less than about 3000 N/mm, no less than about 3500 N/mm, or even no less than about 4000 N/mm. In yet other embodiments, the bearing(s) can have an assembled radial stiffness of no greater than about 7500 N/mm, such as no greater than about 7000 N/mm, no greater than about 6500 N/mm, no greater than about 6000 N/mm, no greater than about 5500 N/mm, or even no greater than about 5000 N/mm. Moreover, the assembled radial stiffness of the bearing(s) can also be within a range between and including any of the values described above, such as, for example, between about 4500 N/mm and about 4800 N/mm.

In particular embodiments the bearing(s) can be adapted to have an assembled radial stiffness within the range described above while simultaneously having an assembly force of no greater than about 100 N, such as no greater than about 95 N, no greater than about 90 N, no greater than about 85 N, no greater than about 80 N, or even no greater than about 75 N.

In certain embodiments, the bearing(s) can have a bi-modal stiffness profile as a result of a bi-modal wave structure. In this regard, at least one of the wave structures of at least one of the bearings can have a bi-modal radial stiffness profile with an initial unassembled radial stiffness and an assembled radial stiffness.

In further embodiments, at least two of the wave structures can have a bi-modal radial stiffness profile, such as at least three wave structures, at least four wave structures, or even at least five wave structures. In another embodiment, every wave structure on the at least one bearing can have a bi-modal radial stiffness configuration. In yet further embodiments, the wave structures can have different bi-modal radial stiffness configurations, such as, for example, a unique bi-modal radial stiffness configuration for each wave structure, such that no two wave structures have the same bi-modal radial stiffness profile.

Bi-modal radial stiffness of at least one of the bearings or wave structures can provide at least three advantages. First, a tighter radial fit can be achieved between the bearings and the posts without damaging the bearings or posts. Second, the assembly forces can be reduced, permitting faster and easier assembly of the posts into the bearings. Third, particle generation caused by frictional sliding during insertion of the posts into the bearing can be minimized by reducing the necessary axial forces as compared to an assembly without a bi-modal radial stiffness configuration.

In particular embodiments (e.g., those seen in FIGS. 35A to 40B), at least one of the wave structures 318 of at least one of the bearings 300, 302 can comprise a sizing feature 606. The sizing feature 606 can comprise, for example, an aperture 608 extending through at least a portion of the at least one wave structure 318 (shown in FIGS. 35A to 37E and 39A to 39E), a portion of the wave structure 318 having a reduced thickness 610 (shown in FIGS. 38A and 38B), a dimpled section 612 (shown in FIGS. 40A and 40B), or any combination thereof.

In certain embodiments, the sizing feature of the at least one wave structure can cause the at least one bearing to have an initial inner diameter, $D_I$, as measured along a best fit circle tangent to the innermost portions of the wave structures before the posts are inserted therein. The sizing feature can further permit the bearing to have an operational diameter, $D_O$, as measured along a best fit circle tangent to the innermost portion of the wave structures after the post are inserted therein. A ratio of $D_O:D_I$ can be no less than 1.0, such as no less than about 1.01, no less than about 1.02, no less than about 1.03, no less than about 1.04, no less than about 1.05, or even no less than about 1.10. Moreover, in particular embodiments, the ratio of $D_O:D_I$ can be no greater than about 2.0, such as no greater than about 1.9, no greater than about 1.8, no greater than about 1.7, or even no greater than about 1.6. The ratio of $D_O:D_I$ can also be within a range of between and including any of the above described values, such as, for example, between about 1.05 and about 1.10.

Referring now to FIGS. 35A through 36C, in a particular embodiment, at least one of the wave structure 318 can include an aperture 608. In more particular embodiments, the aperture 608 can be positioned at least partially on an inner surface 614 of the at least one wave structure 318.

The aperture 608 can define any shape when viewed from the inner surface 614 of the wave structure 318, such as, for example, a generally polygonal opening, a generally ellipsoidal opening, or a combination thereof. In particular embodiments, the aperture 608 can be ovular (e.g., FIGS. 36A through 36C). In other embodiments, the aperture 608 can be pinched (e.g., FIGS. 35A through 35E) in that the ends 618 are tapered.

Figure 35A:
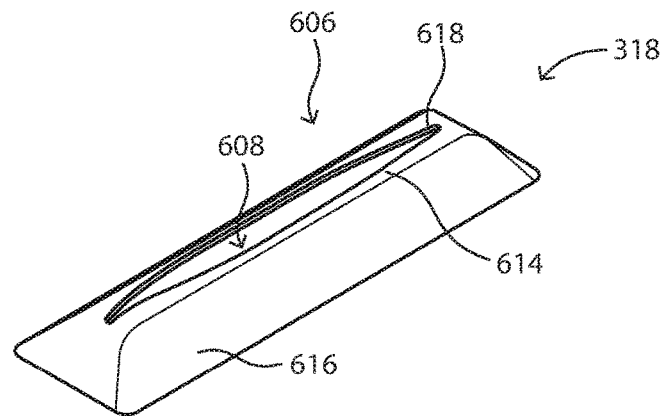
FIG. 35A includes a perspective view of a wave structure in accordance with an embodiment.
Figure 35B:
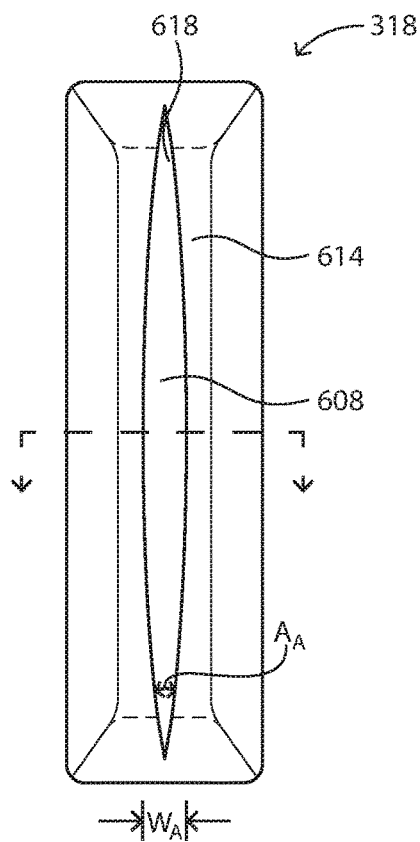
FIG. 35B includes a side plan view of a wave structure in accordance with an embodiment.
Figure 35C:
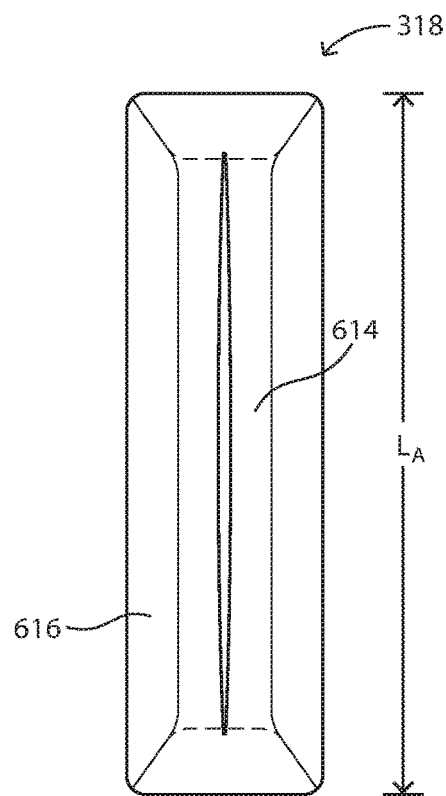
FIG. 35C includes a side plan view of a wave structure in accordance with an embodiment.
Figure 35D:
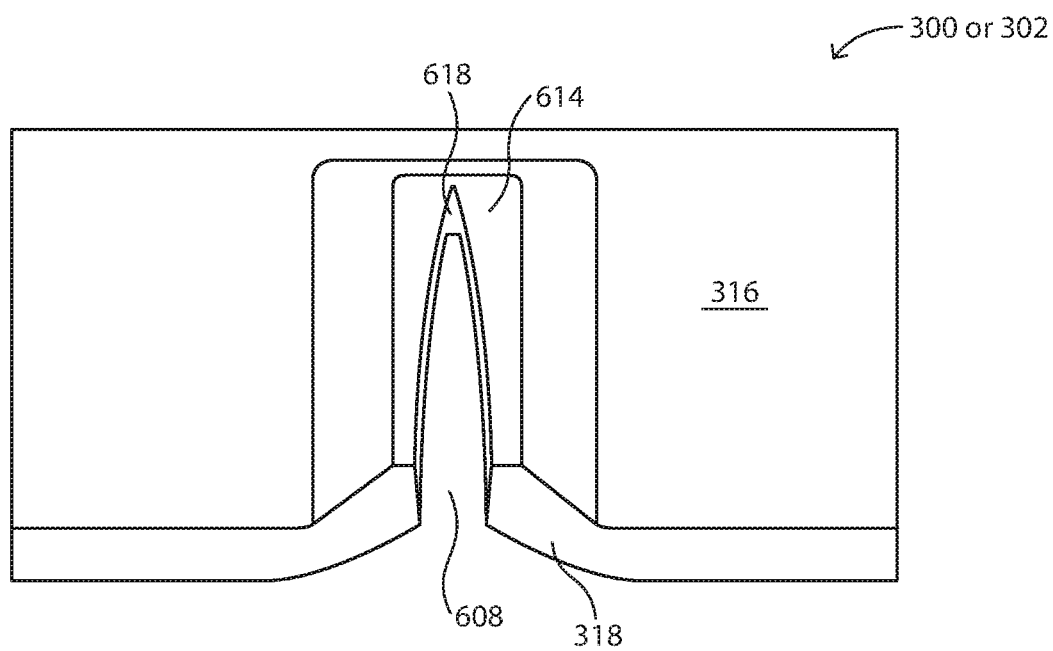
FIG. 35D includes a cross sectional view of a wave structure as seen along Line 34-34 in FIG. 34B, according to an embodiment.

FIGS. 35A, 35B, and 35D, show one embodiment of the wave structure 318 in the initially unassembled state (i.e., prior to insertion of the posts into the bearings). In this regard, the aperture 608 is in the open position. In the open position the radial stiffness of the wave structure 318 is reduced (i.e., less than the assembled radial stiffness of the wave structure 318) to allow for easier insertion of the posts into the bearings 318). In the preassembled state, as shown, (i.e., prior to post insertion) the aperture 608 can extend at least partially along the width of the wave structure 318. The aperture 608 can have a maximum width, $W_A$, as measured by the greatest distance the aperture 608 extends perpendicular to the length of the wave structure 318.

During insertion of the post into the bearing, the aperture 608 can at least partially close, thereby, enhancing the radial stiffness of the wave structure 318.

Figure 35E:
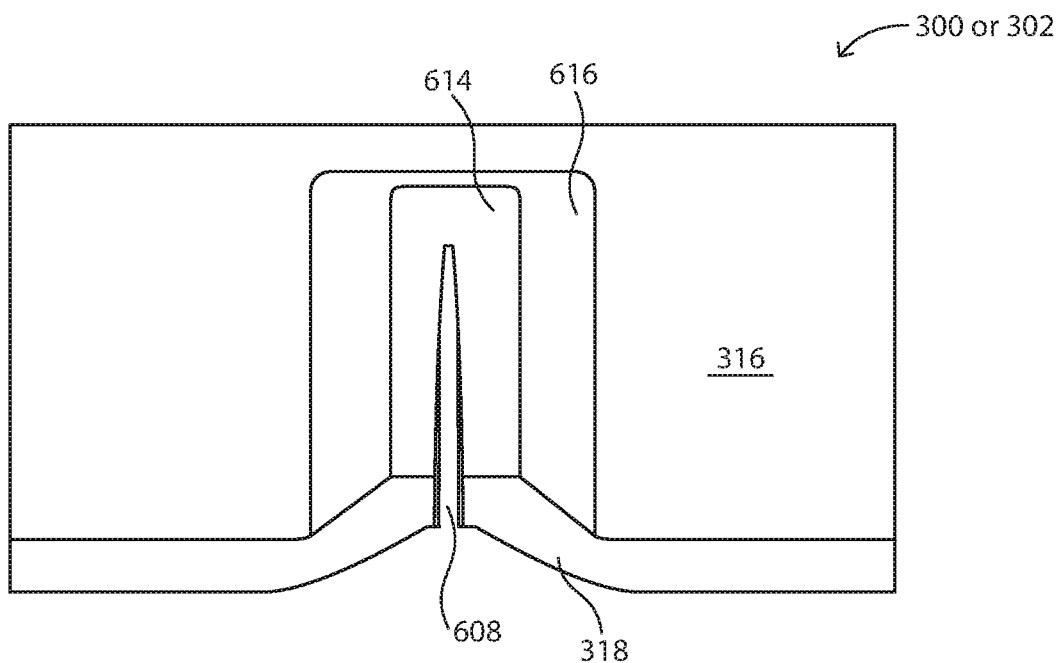
FIG. 35E includes a cross sectional view of a wave structure as seen along Line 34-34 in FIG. 34C, according to an embodiment.

FIGS. 35C and 35E show the wave structure 318 in the assembled state (i.e., after insertion of the posts). It should be understood that in FIGS. 35C and 35E, the apertures 608 are shown exaggerated (i.e., slightly open) in the assembled state and are not drawn to scale. In practice, the apertures 608 may fully close in the assembled state so as to reveal a seemingly continuous inner surface 614 devoid of openings therein.

In other embodiments, the apertures 608 may substantially close in the assembled state such that a small opening remains along the inner surface 614 of the wave structure 318.

In the assembled state (e.g., FIGS. 35C and 35E), a radially innermost surface 614 of the wave structure 318 can act as a parabolic arch, transferring the radial force provided by the posts along a side surface 616 of the wave structure 318 to the undeformed section 316 of the bearing. Conversely, in the preassembled state, the wave structure 318 is devoid of a continuous parabolic arch, subjecting the wave structure 318 to deflect to the closed, or partially closed, assembled state without transferring significant forces to the undeformed section 316. In such a manner, minimal forces can be transferred to the undeformed section 316 of the wave structure 318 during insertion of the posts into the bearings.

FIGS. 36A and 36B show another embodiment of the wave structure 318 in the initially unassembled state (i.e., prior to insertion of the posts). In this regard, the aperture 608 is in the open position. In the open position, the radial stiffness of the wave structure 318 is reduced to allow for easier insertion of the posts into the bearings. In the preassembled state, as shown, (i.e., prior to post insertion) the aperture 608 can extend at least partially along the length of the wave structure 318. During insertion of the post 100, 102 into the bearing 300, 302, the aperture 608 can at least partially close, thereby, enhancing stiffness of the wave structure 318.

FIG. 36C shows the wave structure 318 of FIGS. 36A and 36B in the assembled state (i.e., after insertion of the posts into the bearings). It should be understood that in FIG. 36C, the aperture 608 is shown exaggerated (i.e., slightly open) in the assembled state and is not drawn to scale. In practice, the aperture 608 may fully close in the assembled state so as to reveal a continuous inner surface 614 devoid of any opening therein.

In other embodiments, the aperture 608 may substantially close in the assembled state such that a small opening remains along the inner surface 614 of the wave structure 318.

In the assembled state (e.g., FIG. 36C), a radially innermost surface 614 of the wave structure 318 can act as a parabolic arch, transferring the radial force provided by the posts along a side surface 616 of the wave structure 318 to the undeformed section 316 of the bearing. Conversely, in the preassembled state, the wave structure 318 is devoid of a continuous parabolic arch, subjecting the wave structure 318 to deflect to the closed, or partially closed, assembled state without transferring significant forces to the undeformed section 316. In such a manner, minimal forces can be transferred to the undeformed section 316 of the wave structure 318 during insertion of the posts into the bearings.

Figure 37D:
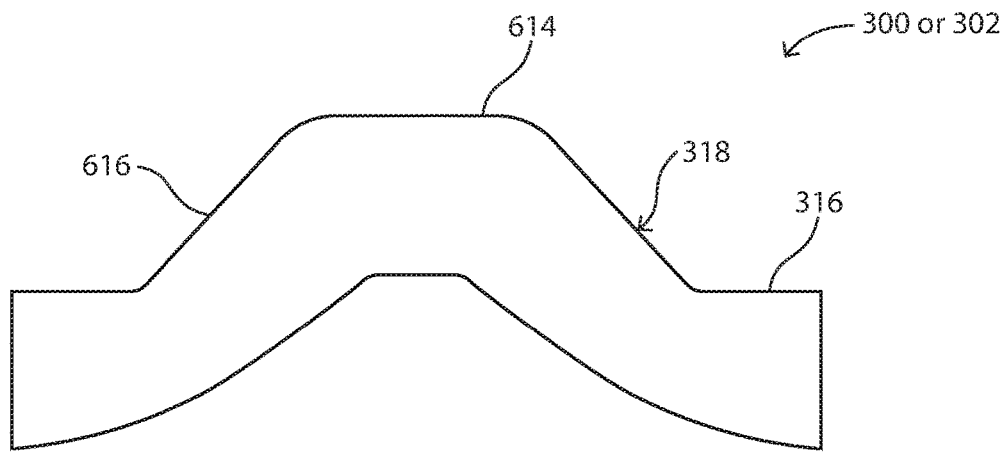
FIG. 37D includes a cross sectional view of a wave structure as seen along Line 36-36 in FIG. 36B, according to an embodiment.

FIGS. 37A, 37B, and 37D show a further embodiment of the wave structure 318 in the initially unassembled state (i.e., prior to insertion of the posts into the bearings). In this regard, the apertures 608 are in the open position. In this position the radial stiffness of the wave structure 318 is reduced to allow for easier insertion of the posts into the bearings. In the preassembled state, as shown, (i.e., prior to post insertion into the bearing) the apertures 608 can extend at least partially along the width of the wave structure 318. During insertion of the post into the bearing, the apertures 608 can at least partially close, thereby, enhancing stiffness of the wave structure 318.

Figure 37E:
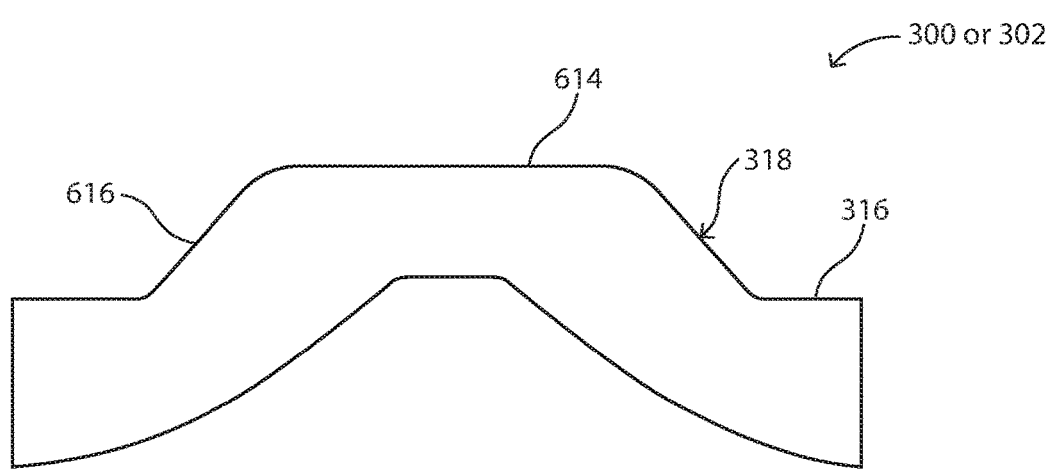
FIG. 37E includes a cross sectional view of a wave structure as seen along Line 36-36 in FIG. 36C, according to an embodiment.

FIGS. 37C and 37E show the wave structure 318 of FIGS. 37A, 37B, and 37D in the assembled state (i.e., after insertion of the posts into the bearings). It should be understood that in FIGS. 37C and 37E, the apertures 608 are shown exaggerated (i.e., slightly open) in the assembled state and are not drawn to scale. In practice, the apertures 608 may fully close in the assembled state so as to reveal a continuous inner surface 614 devoid of any opening therein.

In other embodiments, the apertures 608 may substantially close in the assembled state such that small opening remain along the inner surface 614 of the wave structure 318.

In the assembled state (e.g., FIGS. 37C and 37E), a radially innermost surface 614 of the wave structure 318 can act as an arch, transferring the radial force provided by the posts along a side surface 616 of the wave structure 318 to the undeformed section 316 of the bearing. Conversely, in the preassembled state, the wave structure 318 is devoid of a continuous parabolic arch, subjecting the wave structure 318 to deflect to the closed, or partially closed, assembled state without transferring significant forces to the undeformed section 316. In such a manner, minimal forces can be transferred to the undeformed section 316 of the wave structure 318 during insertion of the posts into the bearings.

As illustrated in FIGS. 39A through 39E, in certain embodiments, at least one wave structure 318 can include an aperture 608 positioned along at least one of the side surfaces 616. In such a manner, the wave structure 318 can be at least partially disconnected from the undeformed portion of the sidewall of the bearing. In a non-illustrated embodiment, the wave structures 318 can include an aperture along at least three sides. In such a manner, the wave structure can be disconnected from the sidewall along at least a portion of three sides thereof, e.g., a tine. In an embodiment, the tine is a narrow pointed projecting part. In an embodiment, the tine can be bent or otherwise deflected in a radial direction. This may increase or decrease radial loading of the wave structure 318 as measured on the post.

The aperture 608 can define any shape when viewed from the side surface 616 of the wave structure 318, such as, for example, a generally polygonal opening, a generally ellipsoidal opening, or a combination thereof. In particular embodiments, the aperture 608 can be ovular. In other embodiments, the aperture 608 can be pinched.

Figure 39D:
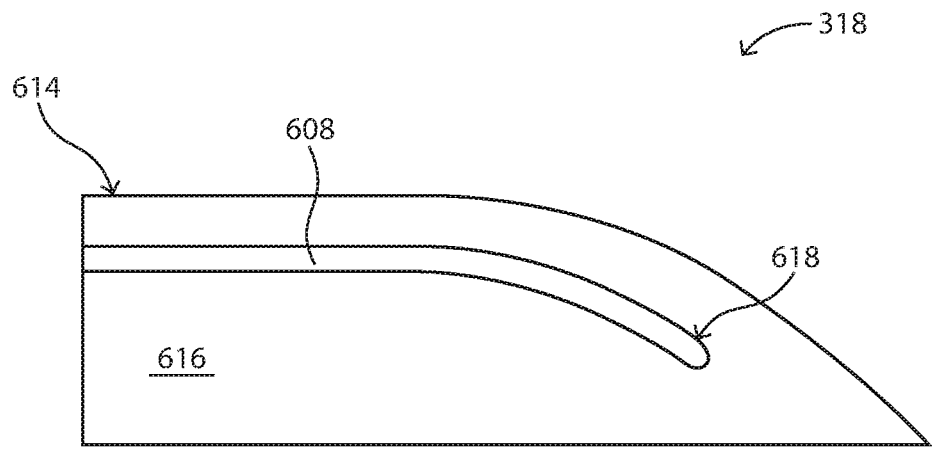
FIG. 39D includes an elevation view of a wave structure in accordance with an embodiment.

FIGS. 39A, 39B, and 39D, show yet a further embodiment of the wave structure 318 in the initially unassembled state (i.e., prior to insertion of the posts into the bearings). In this regard, the apertures 608 are in the open position. In this position the radial stiffness of the wave structure 318 is reduced to allow for easier insertion of the posts into the bearings. In the preassembled state, as shown, (i.e., prior to post insertion into the bearing) the apertures 608 can extend at least partially along the length of the wave structure 318.

During insertion of the post into the bearing, the apertures 608 can at least partially close, thereby, enhancing stiffness of the wave structure 318.

Figure 39E:
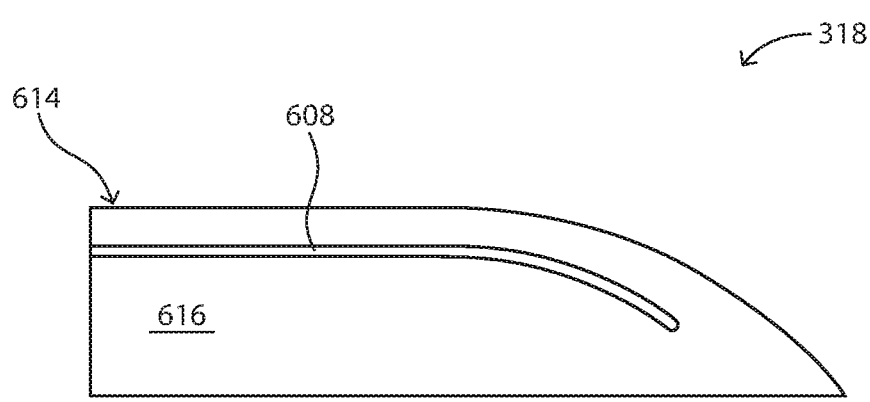
FIG. 39E includes an elevation view of a wave structure in accordance with an embodiment.

FIGS. 39C and 39E show the wave structure 318 in the assembled state (i.e., after insertion of the posts into the bearings). It should be understood that in FIGS. 39C and 39E, the apertures 608 are shown exaggerated (i.e., slightly open) in the assembled state and are not drawn to scale. In practice, the apertures 608 may fully close in the assembled state so as to reveal a continuous side surface 616 devoid of any opening therein.

In other embodiments, the apertures 608 may substantially close in the assembled state such that small gaps remain along the side surface 616 of the wave structure 318.

In the assembled state (e.g., FIGS. 39C and 39E), a radially innermost surface 614 of the wave structure 318 can act as an arch, transferring the radial force provided by the posts along a side surface 616 of the wave structure 318 to the undeformed section. Conversely, in the preassembled state, the wave structure 318 is devoid of a continuous side wall 616, subjecting the wave structure 318 to deflect to the closed, or partially closed, assembled state without transferring significant forces to the undeformed section 316. In such a manner, minimal forces can be transferred to the undeformed section 316 of the wave structure 318 during insertion of the posts into the bearings.

In particular embodiments (e.g., FIGS. 35A, 35B, and 35D), the aperture 608 can have at least one tapered end 618 when viewed in a direction perpendicular to the aperture 608. The tapered end 618 can define an acute angle, $A_A$, which can be less than about 45 degrees, such as less than about 40 degrees, less than about 35 degrees, less than about 30 degrees, less than about 25 degrees, less than about 20 degrees, less than about 15 degrees, or even less than about 10 degrees.

In further embodiments, the aperture 608 can have a maximum length, $L_A$, and a maximum width, $W_A$, as measured perpendicular to $L_A$. In particular embodiments a ratio of $L_A:W_A$ can be no less than about 1.0, such as no less than about 1.5, no less than about 2.0, no less than about 2.5, no less than about 3.0, no less than about 4.0, no less than about 5.0, no less than about 6.0, no less than about 7.0, no less than about 8.0, no less than about 9.0, no less than about 10.0, no less than about 15.0, no less than about 20.0, no less than about 25.0, or even no less than about 30.0. In further embodiments, the ratio of $L_A:W_A$ can be no greater than about 500, such as no greater than about 400, no greater than about 300, no greater than about 200, no greater than about 100, no greater than about 75, no greater than about 50, or even no greater than about 40. Moreover, the ratio of $L_A:W_A$ can be within a range of between and including any of the values described above, such as, for example, about 12.0.

In specific embodiments, a ratio of $L_W:L_A$ can be no greater than about 1.25, such as no greater than about 1.0, no greater than about 0.95, no greater than about 0.90, no greater than about 0.85, no greater than about 0.80, no greater than about 0.75, no greater than about 0.70, no greater than about 0.65, or even no greater than about 0.60. The ratio of $L_W:L_A$ can be no less than about 0.01, such as no less than about 0.10, no less than about 0.20, no less than about 0.30, or even no less than about 0.40. Moreover, the ratio of $L_W:L_A$ can be within a range of between and including any of the values described above, such as, for example, about 0.90.

In further embodiments, a ratio of $W_W:W_A$ can be no greater than about 1.25, such as no greater than about 1.0, no greater than about 0.95, no greater than about 0.90, no greater than about 0.85, no greater than about 0.80, no greater than about 0.75, no greater than about 0.70, no greater than about 0.65, or even no greater than about 0.60. In yet further embodiments, the ratio of $W_W:W_A$ can be no less than about 0.01, such as no less than about 0.10, no less than about 0.20, no less than about 0.30, or even no less than about 0.40. Moreover, the ratio of $W_W:W_A$ can be within a range of between and including any of the values described above, such as, for example, about 0.4.

Figure 38A:
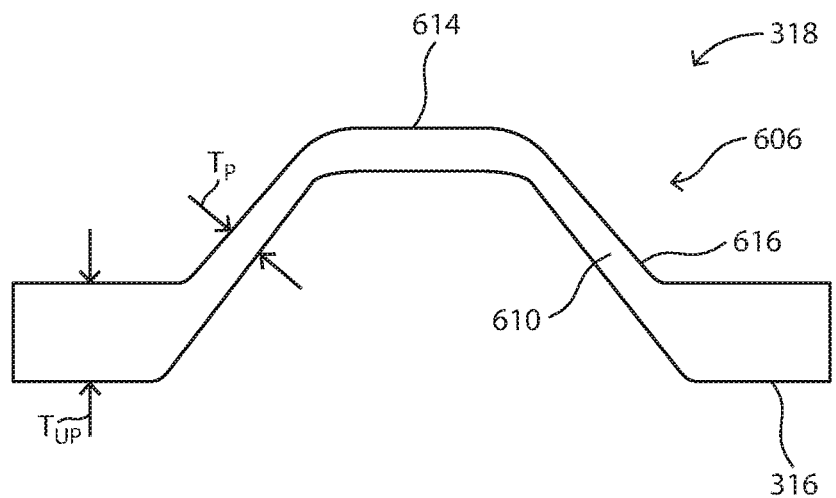
FIG. 38A includes a cross sectional view of a wave structure in accordance with an embodiment.
Figure 38B:
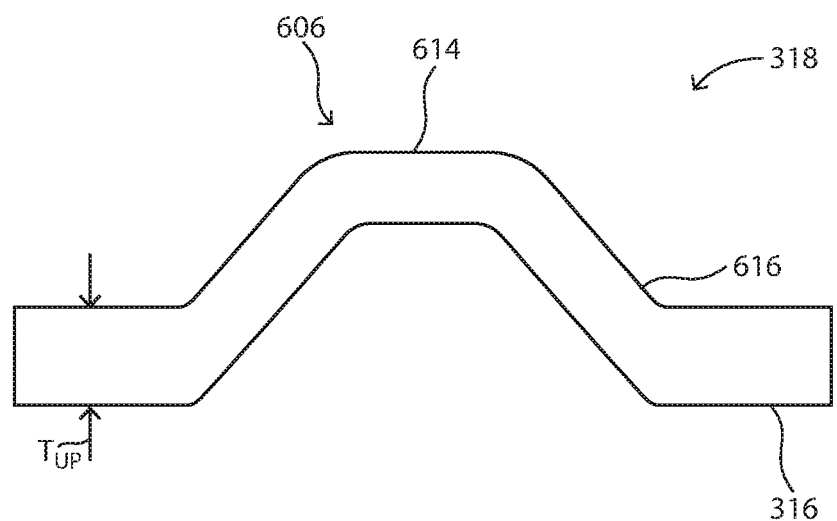
FIG. 38B includes a cross sectional view of a wave structure in accordance with an embodiment.

Referring now to FIGS. 38A and 38B, in particular embodiments, the sizing feature 606 of the at least one wave structure 318 may additionally/alternatively comprise a portion 610 of the wave structure 318 having a reduced thickness. In this regard, the undeformed portion 316 can have an average thickness, $T_{UP}$, and the wave structure 318 can have a portion 610 with a reduced radial thickness, $T_P$. A ratio of $T_P:T_{UP}$ can be no greater than about 0.99, such as no greater than about 0.95, no greater than about 0.90, no greater than about 0.85, no greater than about 0.80, no greater than about 0.75, no greater than about 0.70, no greater than about 0.65, no greater than about 0.60, no greater than about 0.55, no greater than about 0.50, no greater than about 0.40, no greater than about 0.30, or even no greater than about 0.20. In further embodiments, the ratio of $T_P:T_{UP}$ can be no less than about 0.05, such as no less than about 0.10, no less than about 0.15, or even no less than about 0.20. Moreover, the ratio of $T_P:T_{UP}$ can be within a range of between and including any of the values described above, such as, for example, about 0.85.

As the ratio of $T_P:T_{UP}$ decreases, the magnitude of difference between the initial unassembled radial stiffness and the assembled radial stiffness can increase while the required assembly force can decrease. As the posts are inserted into the bearings, the wave structure of FIG. 38A can collapse and the portion 610 of the wave structure 318 having a reduced thickness can become thicker.

In this regard, the portion 610 of the wave structure 318 having a reduced thickness can have an initial unassembled radial stiffness, $S_1$ (as shown in FIG. 38A), and an assembled radial stiffness, $S_2$ (as shown in FIG. 38B), wherein $S_2$ is greater than $S_1$. In particular embodiments, a ratio of $S_2:S_1$ can be no less than about 1.01, such as no less than about 1.05, no less than about 1.10, no less than about 1.20, no less than about 1.30, no less than about 1.40, no less than about 1.50, no less than about 1.75, or even no less than about 2.00. In further embodiments, the ratio of $S_2:S_1$ can be no greater than about 20, such as no greater than about 15, no greater than about 10, no greater than about 5, or even no greater than about 3. Moreover, the ratio of $S_2:S_1$ can be within a range of between and including any of the above described values, such as, for example, between about 2.1 and about 2.5.

In particular embodiments, the portion 610 having the reduced thickness can have a surface area, $A_P$, as measured along an outer surface of the wave structure 318 and the wave structure 318 can have a total surface area, $A_W$. In particular embodiments, a ratio of $A_P:A_W$ can be no less than about 0.05, such as no less than about 0.10, no less than about 0.15, no less than about 0.20, no less than about 0.25, no less than about 0.30, no less than about 0.35, no less than about 0.40, no less than about 0.45, no less than about 0.50, no less than about 0.60, no less than about 0.70, no less than about 0.80, or even no less than about 0.90. In further embodiments, the ratio of $A_P:A_W$ can be no greater than about 0.99, such as no greater than about 0.98, no greater than about 0.97, no greater than about 0.96, no greater than about 0.95, no greater than about 0.94, no greater than about 0.93, no greater than about 0.92, no greater than about 0.91, or even no greater than about 0.90. Moreover, the ratio of $A_P:A_W$ can be within a range of between and including any of the values described above, such as, for example, about 0.45.

Figures 40A, 40B:
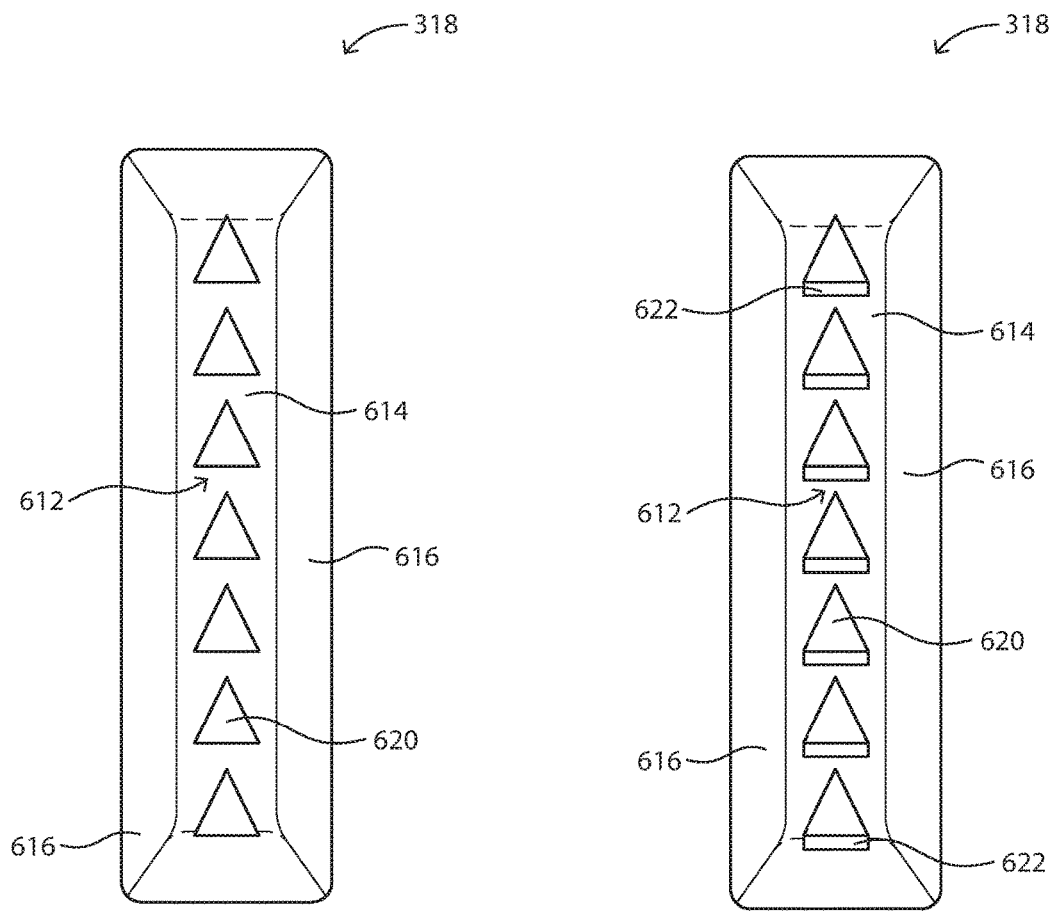
FIG. 40A includes a side plan view of a wave structure in accordance with an embodiment.
FIG. 40B includes a side plan view of a wave structure in accordance with an embodiment.

Referring to FIGS. 40A and 40B, in yet other embodiments, the sizing feature 606 of the at least one wave structure 318 may additionally/alternatively comprise a dimpled section 612. The dimpled section 612 can include corrugations, bumps, indents, or any similar structure which is adapted to deform (collapse) during insertion of the posts into the bearings. In a particular aspect, the dimpled section 612 can be adapted to have a greater radial stiffness after the post is inserted into the bearing as compared to the radial stiffness prior to insertion.

In particular embodiments, the dimpled section 612 can comprise a corrugation 620. Moreover, in more particular embodiments, the corrugation 620 can further comprise a plurality of corrugations. In certain embodiments, the corrugation(s) 620 can be positioned along the inner surface 614 of the wave structure 318 or partially there along.

In further embodiments, the dimpled section 612 can comprise a perforation 622. In more particular embodiments, the perforation 622 can further comprise a plurality of perforations. The perforation(s) 622 can cause the wave structure 318 to have an overall initial unassembled radial stiffness, $S_1$, and an assembled radial stiffness, $S_2$. In particular embodiments, a ratio of $S_2:S_1$ can be no less than about 1.01, such as no less than about 1.05, no less than about 1.10, no less than about 1.20, no less than about 1.30, no less than about 1.40, no less than about 1.50, no less than about 1.75, or even no less than about 2.00. In further embodiments, the ratio of $S_2:S_1$ can be no greater than about 20, such as no greater than about 15, no greater than about 10, no greater than about 5, or even no greater than about 3. Moreover, the ratio of $S_2:S_1$ can be within a range of between and including any of the above described values, such as, for example, between about 2.1 and about 2.5.

Referring again to FIG. 1 through FIG. 3B, the guide sleeves 200, 202 can include a locking mechanism 400. The locking mechanism 400 can be engaged with the seat back 4 so as to prevent the posts 100, 102 from translating undesirably relative thereto. The locking mechanism 400 can be formed with an internal bore 402 adapted to receive one of the posts 100, 102. In a particular embodiment, the assembly 1 can additionally comprise a component 456 having substantially the same shape and features as the locking mechanism 400, including an internal bore 402 adapted to receive the second post 102.

Figure 17:
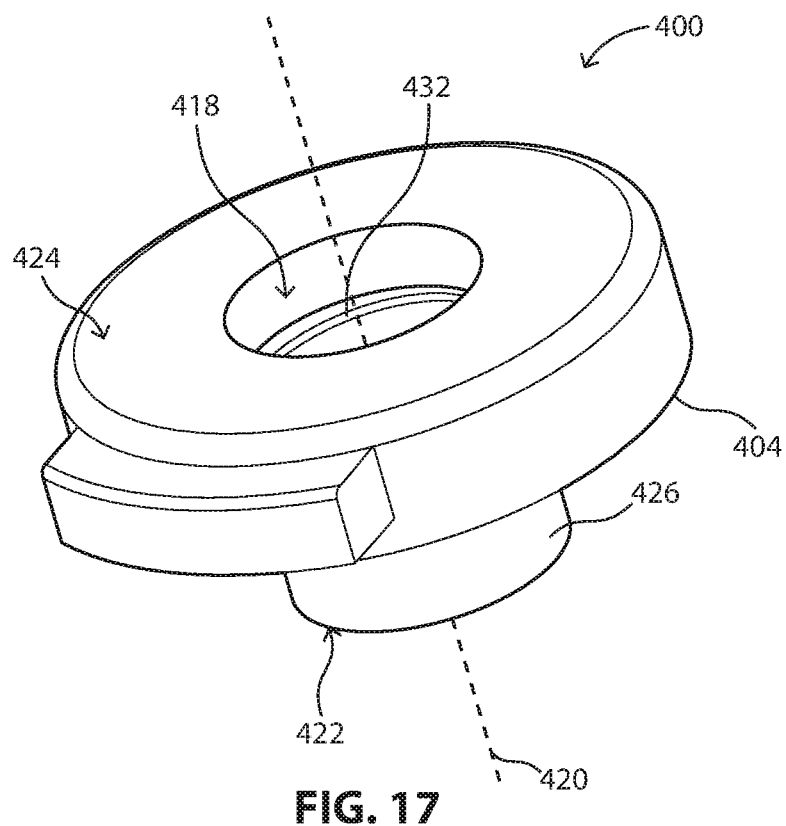
FIG. 17 includes a perspective view of a locking mechanism in accordance with an embodiment.
Figure 18:
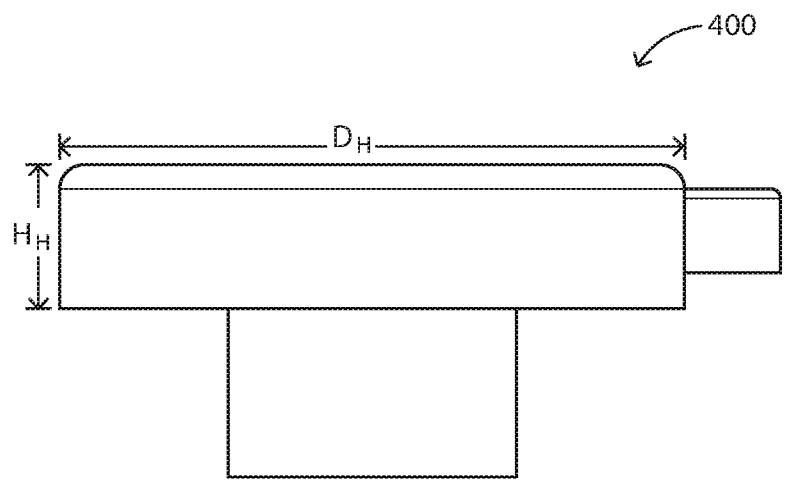
FIG. 18 includes a first side plan view of a locking mechanism in accordance with an embodiment.
Figure 19:
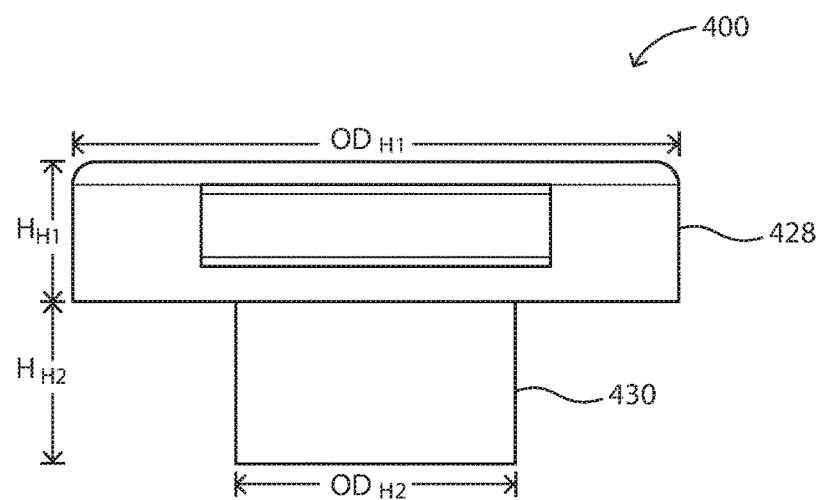
FIG. 19 includes a second side plan view of a locking mechanism in accordance with an embodiment.
Figure 20:
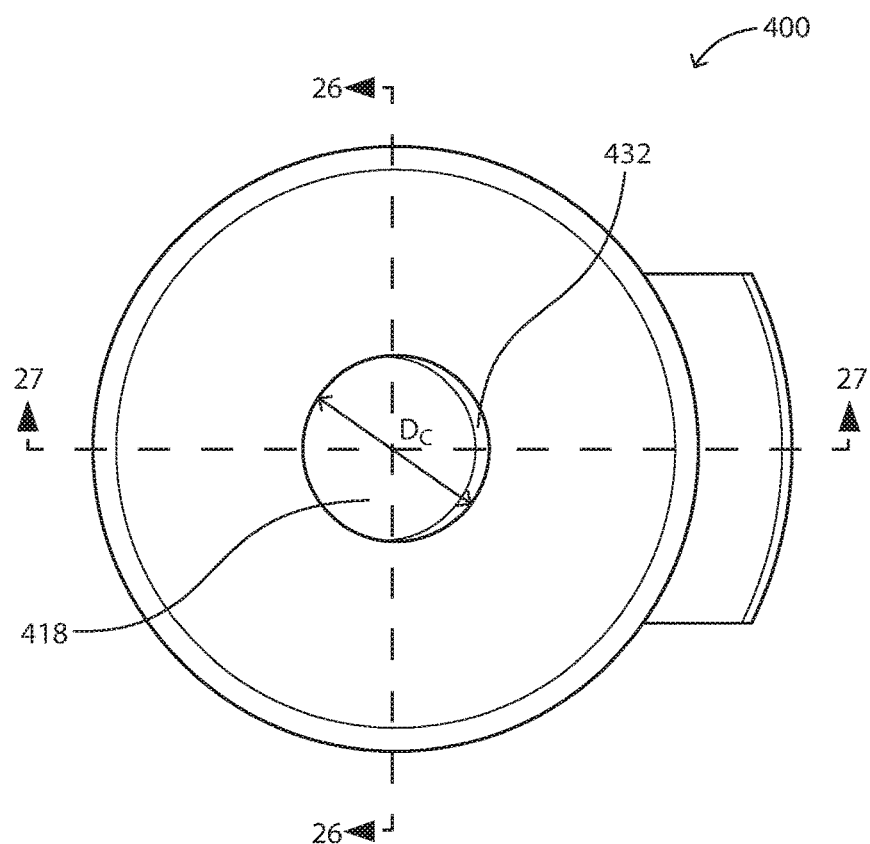
FIG. 20 includes a top view of a locking mechanism in accordance with an embodiment.

In a particular embodiment, the assembly 1 can include guide sleeves 200, 202 adapted to be engaged with one of the first and second posts 100, 102. As illustrated in FIG. 17, the first guide sleeve 200 can include a locking mechanism 400 and bearing 300. The other of the guide sleeves 200, 202 can include the bearing 302 and the component 456.

In another embodiment, each guide sleeve 200, 202 can include two substantially identical locking mechanisms 400—the first locking mechanism 400 engaged with the first bearing 300, and a second locking mechanism 400 engaged with the second bearing 302.

Referring to FIG. 17 through FIG. 20, the locking mechanism 400 includes a housing 404 having a bore defining an axial cavity 418 there through. The axial cavity 418 can have a central axis 420 extending from a bottom end 422 of the locking mechanism 400 to a top end 424 of the locking mechanism 400.

In a particular embodiment, the housing 404 can be cylindrical, having a height, $H_H$, and a main diameter, $D_H$. The central axis 420 can extend parallel with an outer surface 426 of the housing 404. The axial cavity 418 can have a diameter, $D_C$, wherein a ratio of $D_H:D_C$ can be at least 1.1, such as at least 1.2, at least 1.3, at least 1.4, at least 1.5, at least 1.6, at least 1.7, at least 1.8, at least 1.9, at least 2.0, at least 2.5, or even at least 3. The ratio of $D_H:D_C$ can be no greater than 5.0, such as no greater than 4.5, no greater than 4.0, no greater than 3.5, no greater than 3.0, no greater than 2.5, or even no greater than 2.0. The ratio of $D_H:D_C$ can also be within a range between and including any of the ratio values described above, such as between 1.1 and 5.0.

A ratio of $D_C:D_P$ can be no greater than 2.0, such as no greater than 1.5, no greater than 1.25, no greater than 1.2, no greater than 1.1, no greater than 1.05, or even no greater than 1.025. The ratio of $D_C:D_P$ can be no less than 1.001, such as no less than 1.005, no less than 1.01, no less than 1.025, no less than 1.05, or even no less than 1.75. Additionally, the ratio of $D_C:D_P$ can also be within a range between and including any of the ratio values described above. As the ratio of $D_C:D_P$ decreases beyond a particular point, the frictional resistance between the posts 100, 102 and the housing 404 of the locking mechanism 400 can increase. The increasing frictional resistance can impact the ease by which an occupant of the vehicle can adjust the head restraint assembly 1.

In a further embodiment, the housing 404 can be formed with a first cylindrical section 428 and a second cylindrical section 430 engaged there below. The first cylindrical section 428 can have an outer diameter, $OD_{H1}$, and the second cylindrical section 430 can have an outer diameter, $OD_{H2}$. A ratio of $OD_{H1}:OD_{H2}$ can be no less than 0.5, such as no less than 0.75, no less than 1.0, no less than 1.25, no less than 1.5, or even no less than 2.0. The ratio of $OD_{H1}:OD_{H2}$ can be no greater than 5.0, such as no greater than 4.5, no greater than 4.0, no greater than 3.5, no greater than 3.0, no greater than 2.5, no greater than 2.0, or even no greater than 1.5. Additionally, the ratio of $OD_{H1}:OD_{H2}$ can also be within a range between and including any of the ratio values described above. In a further embodiment, $OD_{H1}:OD_{H2}$ can be approximately 2. In this regard, the second cylindrical section 430 can have an outer diameter that is approximately one-half the outer diameter of the first cylindrical section 428.

The first cylindrical section 428 can have a height, $H_{H1}$, and the second cylindrical section 430 can have a height, $H_{H2}$, wherein a ratio of $H_{H1}:H_{H2}$ can be no less than 0.25, such as no less than 0.5, no less than 0.75, no less than 1.0, no less than 1.5, or even no less than 2.0. The ratio of $H_{H1}:H_{H2}$ can be no greater than 5.0, such as no greater than 4.5, no greater than 4.0, no greater than 3.5, no greater than 3.0, no greater than 2.5, no greater than 2.0, or even no greater than 1.5. Additionally, the ratio of $H_{H1}:H_{H2}$ can also be within a range between and including any of the ratio values described above.

The housing 404 can comprise any suitable material with sufficient rigidity to withstand axial and longitudinal forces. In a particular embodiment, the housing 404 can comprise an injection molded polymer. In another embodiment, the housing 404 can comprise a metal or alloy formed through a machining process. In yet another embodiment, the housing 404 can comprise a ceramic or any other suitable material. The housing 404 can be formed from a single piece, two pieces, or several pieces joined together by welding, adhesive, fasteners, threading, or any other suitable fastening means.

In a particular aspect, the housing 404 can be mated such that the bottom of the first cylindrical section is flush with the top surface 6 of the seat back 4. In this regard, the housing 404 can be partially visible to occupants within the vehicle. In a further aspect, the housing 404 can be mounted above the top surface 6 of the seat back 4.

Figure 21:
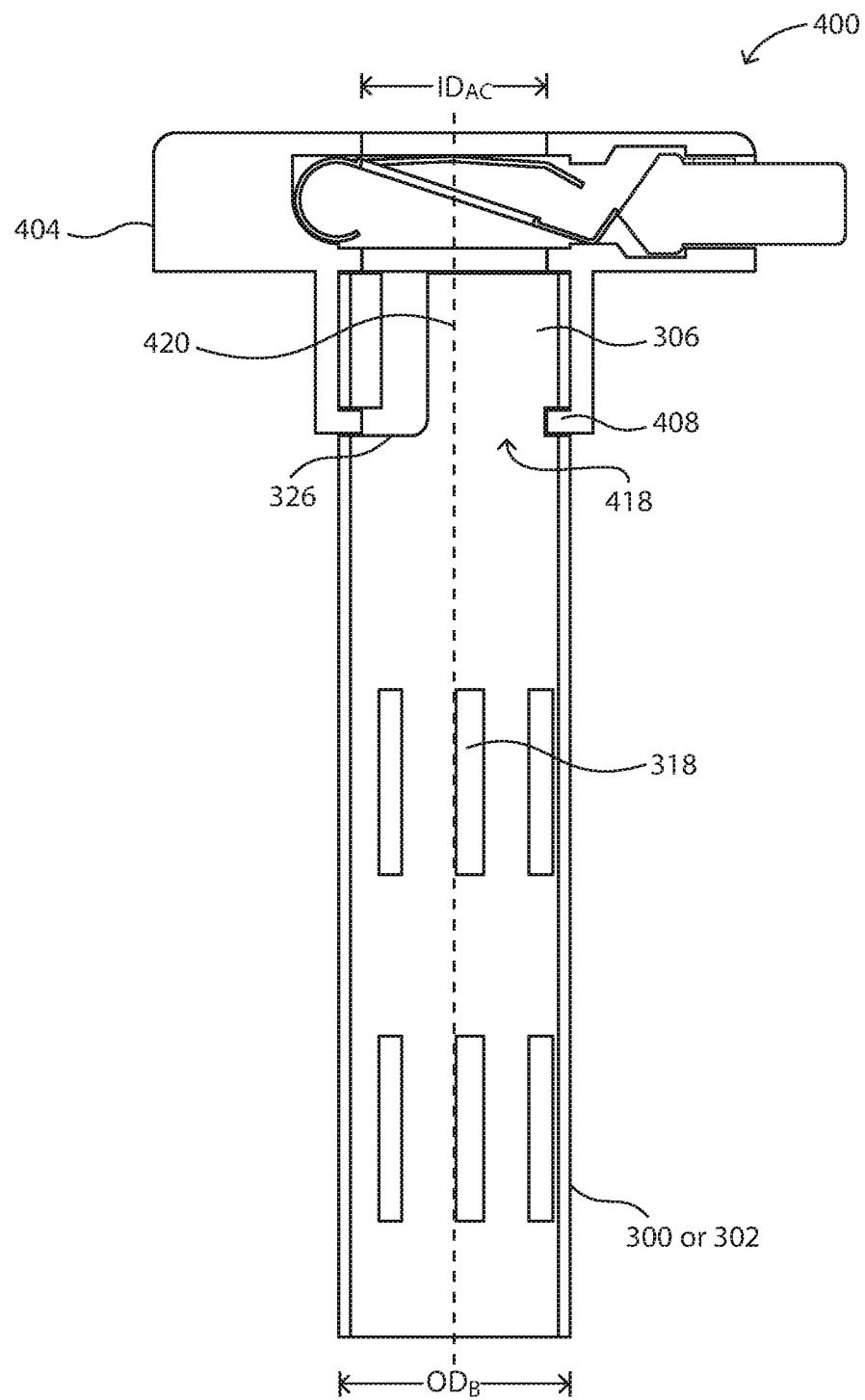
FIG. 21 includes a cross-sectional side view of a guide sleeve in accordance with an embodiment, taken along line 21-21 of FIG. 3B.

In a particular aspect, as illustrated in FIG. 21, the bearings 300, 302 can be adapted to fit within the axial cavity 418 of the housing 404. In this regard, the axial cavity 418 can have an inner diameter, $ID_{AC}$, and the bearings 300, 302 can have an outer diameter, $OD_B$. A ratio of $ID_{AC}:OD_B$ can be no greater than 1.20, such as no greater than 1.15, no greater than 1.10, no greater than 1.09, no greater than 1.08, no greater than 1.07, no greater than 1.06, no greater than 1.05, no greater than 1.04, no greater than 1.03, no greater than 1.02, or even no greater than 1.01. The ratio of $ID_{AC}:OD_B$ can be greater than 1, such as greater than 1.01, greater than 1.02, greater than 1.03, greater than 1.04, greater than 1.05, or even greater than 1.10. Additionally, the ratio of $ID_{AC}:OD_B$ can also be within a range between and including any of the ratio values described above.

To engage one of the bearings 300, 302 with the locking mechanism 400 and the other bearing 300, 302 with the component 456, the first ends 306 of the bearings 300, 302 can be inserted into the cavity 418 of the housing 404. The bearings 300, 302 can be aligned with the locking mechanism 400 and component 456 such that the central axis 420 of the cavity 418 aligns with the central axis 322 of the bearings 300, 302. In a particular aspect, the bearings 300, 302 can further include an engagement structure 326 to secure with the housing 404. The guide center axis 306 can be parallel and concomitant with the first center axis 420 of the cavity 418.

Figure 22:
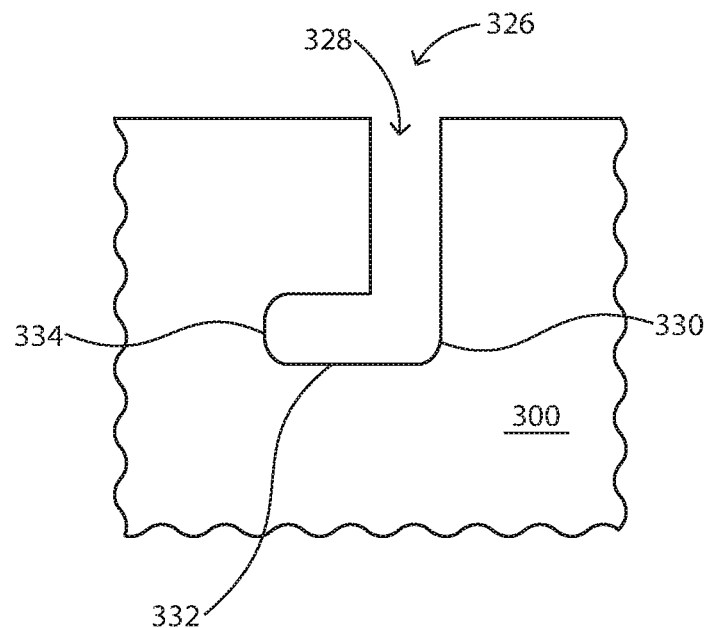
FIG. 22 includes a side plan view of a cutout in accordance with an embodiment.

In a particular embodiment, illustrated in FIG. 22, the engagement structure can comprise at least one L-shaped cutout 326 in each of the bearings 300, 302. Each of the L-shaped cutouts 326 can have an opening 328 extending axially inward from the first end 306 of the bearing 300, 302; a heel 330 at the base of the opening 328; a sliding lock surface 332 extending from the heel 330; and an end 334 at a terminal side of the sliding lock surface 332. An inner surface of the housing 404 can further include at least one tab 408 extending radially inward into the cavity 418, substantially perpendicular to the center axis 420. To install the bearings 300, 302 into the housings 404, each of the bearings 300, 302 can be aligned such that the tab 408 fits within the opening 328 of the bearings 300, 302. The bearings 300, 302 can be urged into the cavity 418 until the heel 330 of each L-shaped cutout 326 makes contact with each tab 408. After the tabs 408 come into contact with the heel 330, the bearings 300, 302 can be rotated such that the tabs 408 translates on the sliding lock surface 332 until the tabs 408 contact the end 334 of the L-shaped cutout 326.

The bearings 300, 302 can be secured to the housing 404 in any method recognizable to one having ordinary skill in the art. For example, in an alternative embodiment, the bearings 300, 302 can threadably engage to the housing 404. Each of the bearings 300, 302 can include a first thread and the housing 404 can include a complementary second thread. In another embodiment, the bearings 300, 302 can be secured to the housing 404 by an adhesive. In yet a further embodiment, the bearings 300, 302 can be secured to the housing 404 by an interference fit. In a further embodiment, the bearings 300, 302 can be secured to the housing 404 by a pin or a fastener. In yet a further embodiment, the bearings 300, 302 can be secured to the housing 404 by a bayonet connection.

Referring again to FIG. 17 to FIG. 20, the locking mechanism 400 can further include a locking member 432 positioned within the housing 404.

Figure 23:
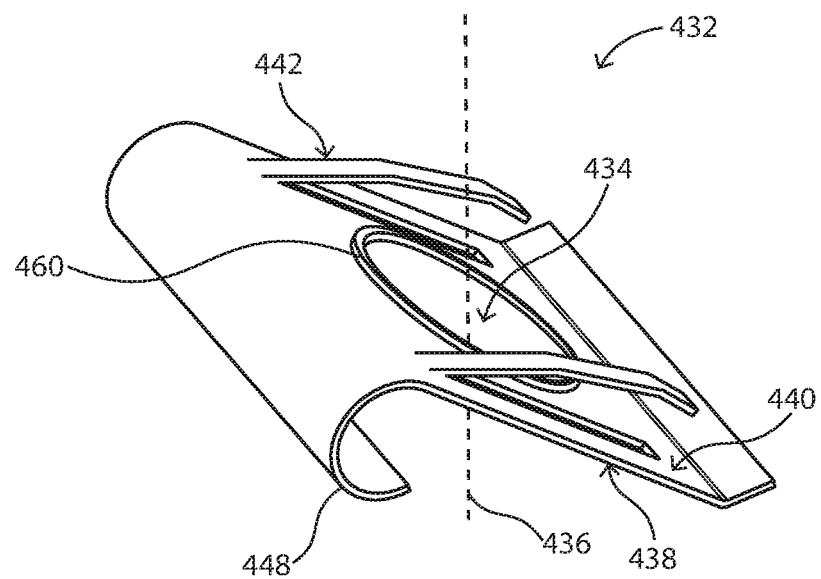
FIG. 23 includes a perspective view of a locking member in accordance with an embodiment.
Figure 24:
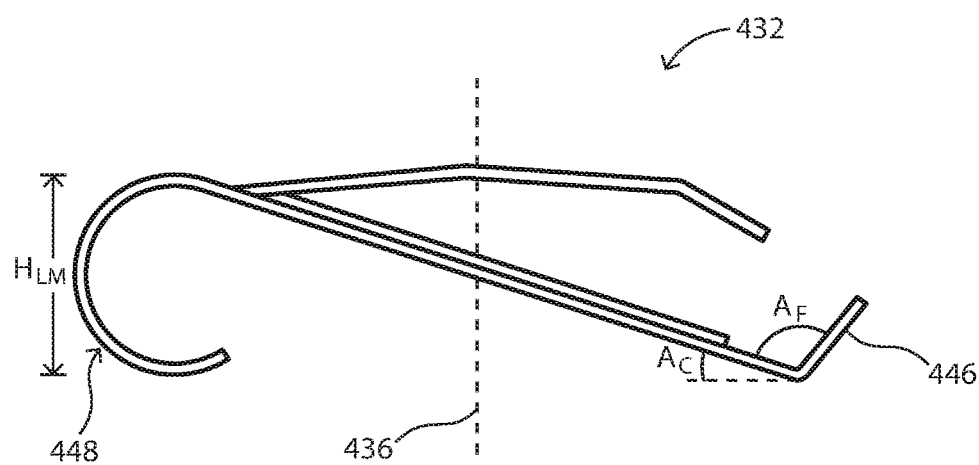
FIG. 24 includes a side plan view of a locking member in accordance with an embodiment.
Figure 25:
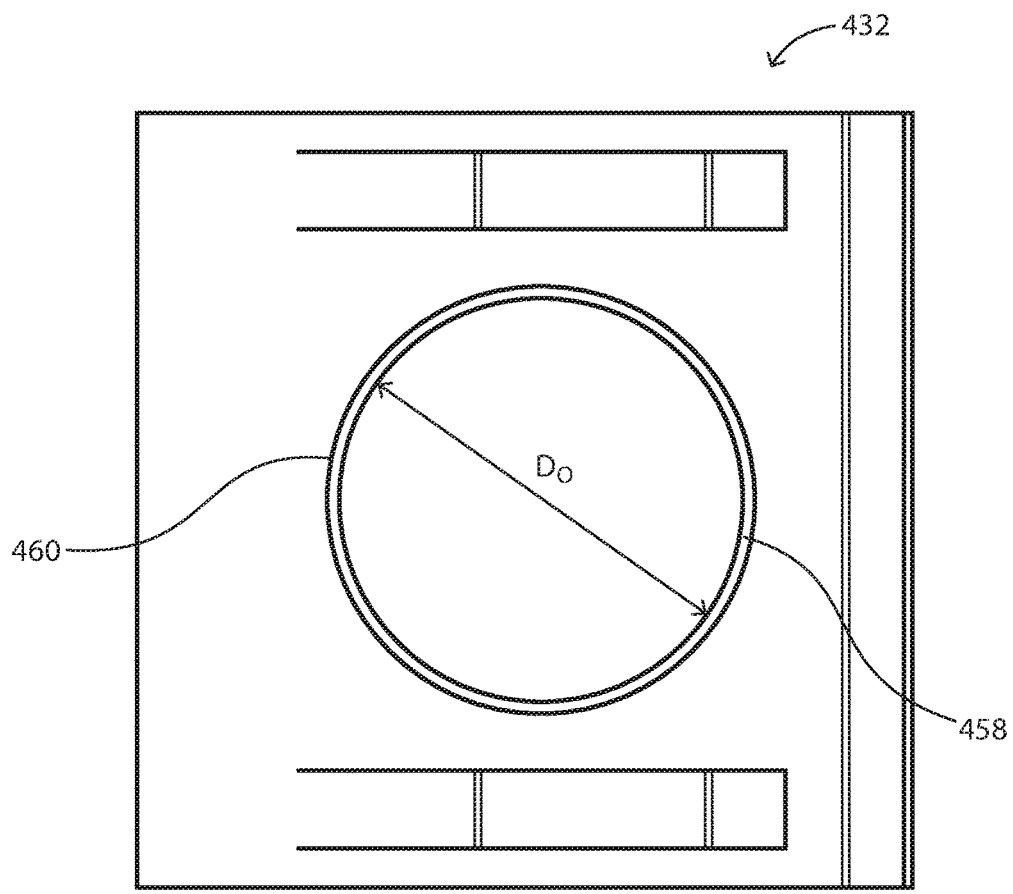
FIG. 25 includes a top view of a locking member in accordance with an embodiment.

As illustrated in FIG. 23 through FIG. 25, the locking member 432 can comprise an opening 434 having a central axis 436, and a first and second surface 438 and 440. Moreover, the locking member 432 can additionally include at least one biasing element 442 extending from the second surface 440 of the locking member 432. The biasing element 442 can be adapted to provide a biasing force relatively parallel with the central axis 436. The biasing element 442 can be a spring. In a particular embodiment, the biasing element 442 can be a leaf spring extending from the second surface 440 of the locking member 432. In a particular aspect, the leaf spring 442 can be formed integrally from the locking member 432. The leaf spring 442 can be formed from a cutout from the locking member 432. The surface can be rotated away from the second surface 440 of the locking member 432. The surface can comprise at least one bend therein to facilitate enhanced engagement between the leaf spring 442 and the housing 404.

Moreover, the locking member 432 can further include a distal flange 446 projecting from the locking member 432 at an angle, $A_F$. In a particular aspect, $A_F$ can be no less than 45 degrees, such as no less than 50 degrees, no less than 55 degrees, no less than 60 degrees, no less than 65 degrees, no less than 70 degrees, no less than 75 degrees, no less than 80 degrees, no less than 85 degrees, no less than 90 degrees, no less than 95 degrees, no less than 100 degrees, no less than 105 degrees, or even no less than 110 degrees. $A_F$ can be no greater than 170 degrees, such as no greater than 165 degrees, no greater than 160 degrees, no greater than 155 degrees, no greater than 150 degrees, no greater than 145 degrees, no greater than 140 degrees, no greater than 135 degrees, no greater than 130 degrees, no greater than 125 degrees, no greater than 120 degrees, no greater than 115 degrees, no greater than 110 degrees, no greater than 105 degrees, no greater than 100 degrees, no greater than 95 degrees, or even no greater than 90 degrees. Additionally, $A_F$ can also be within a range between and including any of the values described above.

In a further embodiment, the locking member 432 can also include a lever 448 extending from the first surface 438 of the locking member 432 opposite the flange 446. In a particular aspect, the lever 448 can be formed by rolling an edge of the locking member 432 over on itself. In this regard, the lever 448 can be integrally formed from the locking member 432, increasing strength of the lever 448 while simultaneously reducing the need for a weld or joint. In an alternate embodiment, the lever 448 can be formed from a material that is attached to the locking member by welding or adhesive. In yet another embodiment, the lever 448 can be formed similar to the flange 446. The lever 448 can be formed from the surface of the locking member 432 that is bent at a substantially right-angle. In operation, the lever 448 is adapted to cant the locking member 432 at an angle, $A_C$, when positioned there below. As will become apparent to one having ordinary skill in the art, the locking member 432, having the relative canting angle, Ac, can be adapted to facilitate an interference fit with at least one of the posts 100, 102. As the locking member 432 is canted relative to the post 100, 102 being engaged, the locking member 432 can prevent axial translation of the post 100 or 102 within the opening 434.

In a particular embodiment, $A_C$ can be no less than 1 degree, such as no less than 2 degrees, no less than 3 degrees, no less than 4 degrees, no less than 5 degrees, no less than 10 degrees, no less than 15 degrees, no less than 20 degrees, no less than 25 degrees, no less than 30 degrees, no less than 35 degrees, or even no less than 40 degrees. $A_C$ can be no greater than 60 degrees, no greater than 55 degrees, no greater than 50 degrees, no greater than 45 degrees, no greater than 40 degrees, no greater than 35 degrees, no greater than 30 degrees, no greater than 25 degrees, no greater than 20 degrees, no greater than 15 degrees, or even no greater than 10 degrees. $A_C$ can also be within a range between and including any of the values described above. While $A_C$ can be selected to be within the above described range, the value selected is directly dependent on the diameter of the opening 434 and the diameter of the posts 100, 102.

When the locking member 432 is seated on a level surface such that the lever 448 forms a point of contact between the locking member 432 and the surface there below, the locking member 432 can have a maximum height, $H_{LM}$, as defined by the distance between the surface and the top point 458 furthest therefrom.

The opening 434 of the locking member 432 can have a diameter, $D_O$, wherein $D_O$ is greater than $D_C$. In a particular aspect, a ratio of $D_O:D_C$ is at least 1.05, such as at least 1.1, at least 1.15, at least 1.2, at least 1.25, at least 1.3, at least 1.35, at least 1.4, at least 1.45, or even at least 1.5. The ratio of $D_O:D_C$ is no greater than 2.0, such as no greater than 1.9, no greater than 1.8, no greater than 1.7, no greater than 1.6, no greater than 1.5, no greater than 1.4, no greater than 1.3, no greater than 1.2, or even no greater than 1.1. Additionally, the ratio of $D_O:D_C$ can also be within a range between and including any of the values described above. The ratio of $D_O:D_C$ will be obvious to one having ordinary skill in the art in light of this disclosure.

Figure 26:
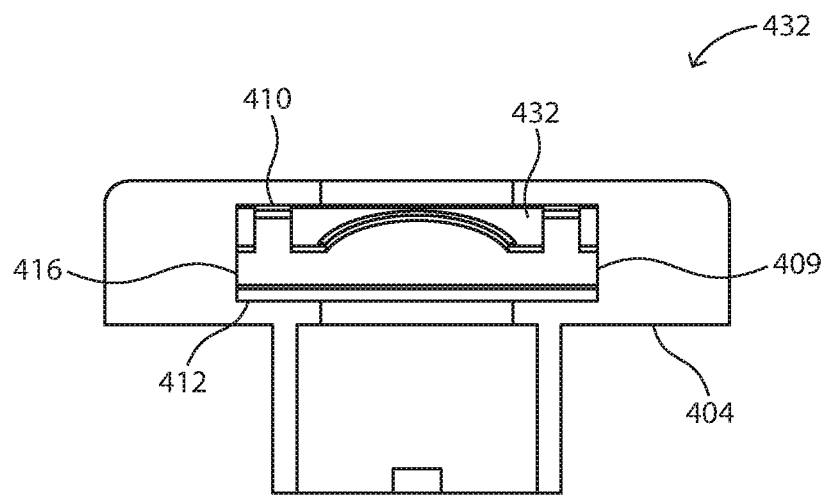
FIG. 26 includes a cross-sectional side view of a locking mechanism in accordance with an embodiment, taken along Line 26-26 in FIG. 20.
Figure 27A:
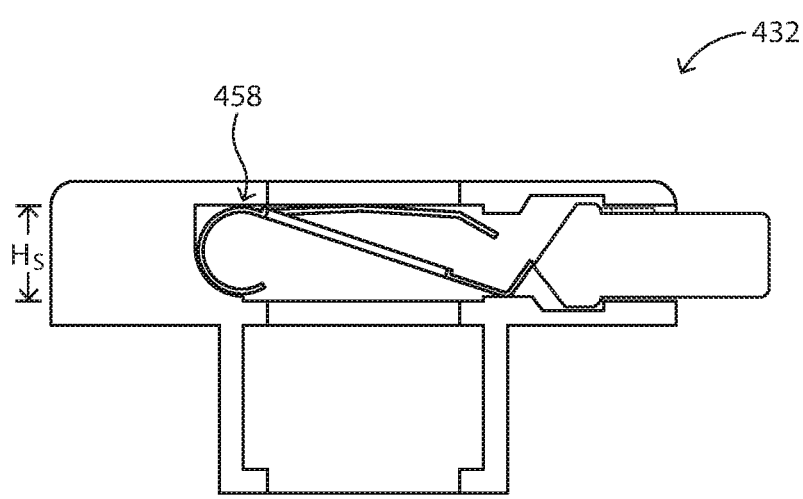
FIG. 27A includes a first cross-sectional side view of a locking mechanism in accordance with an embodiment, taken along Line 27-27 in FIG. 20.
Figure 27B:
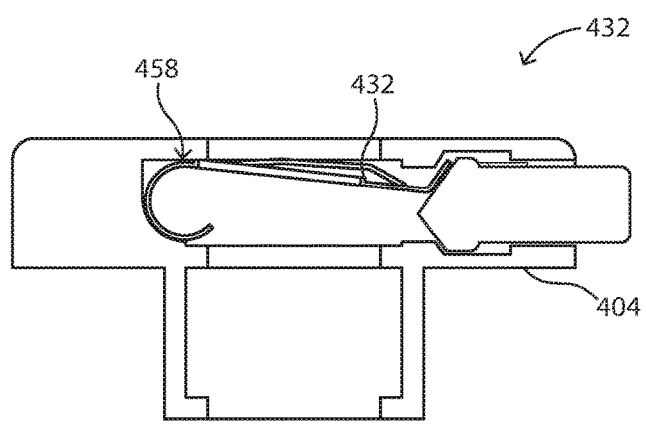
FIG. 27B includes a second cross-sectional side view of a locking mechanism in accordance with an embodiment, taken along Line 27-27 in FIG. 20.

As illustrated in FIG. 26, FIG. 27A, and FIG. 27B, the locking member 432 can be positioned within a slot 409 in the housing 404. In a particular embodiment, the slot 409 can be oriented substantially perpendicular to the central axis 420 of the cavity 418. The slot 409 can have a top wall 412 and a bottom wall 414 and can include three side walls 416. The slot 409 can form a substantially rectangular cuboid having a height, $H_S$, a length $L_S$, and a width, $W_S$.

In a particular embodiment, the slot 409 can include a top wall 410, a bottom wall 412 and can include at least two side walls 416. In this embodiment, the locking member 432 is visible through the housing 404 from the two sides of the cuboidal slot 409 not including side walls 416.

In a particular aspect, a ratio of $H_S:H_{LM}$ can be at least 0.9, such as at least 0.95, at least 1.0, at least 1.01, at least 1.02, at least 1.03, at least 1.04, at least 1.05, at least 1.06, at least 1.07, at least 1.08, at least 1.09, at least 1.10, at least 1.15, or even at least 1.2. The ratio of $H_S:H_{LM}$ can be no greater than 1.4, such as no greater than 1.35, no greater than 1.3, no greater than 1.25, no greater than 1.2, no greater than 1.15, no greater than 1.1, no greater than 1.05, no greater than 1.04, no greater than 1.03, no greater than 1.02, no greater than 1.01, or even no greater than 1.0. The ratio of $H_S:H_{LM}$ can also be within a range between and including any of the values described above. In the event the ratio of $H_S:H_{LM}$ has a value of less than 1.0, the locking member 432 can be compressed within the slot 409 by the top wall 412 of the slot 409, such that the top point 458 is urged towards the lever 448. The application of force on the top point 458 towards the lever 448 may enhance the gripping properties of the locking member 432 with the posts 100, 102. In particular, as the force applied against the top point 458 increases, the relative gripping power exhibited by the locking member 432 against the post 100 or 102 disposed of therein can increase.

As illustrated in FIG. 28, the locking member 432 can be angularly positioned relative to the central axis 420, resulting in a relative acute angle formed between the central axis 420 and the central axis 436. This acute angle, as illustrated in FIG. 29, can be equal to the canting angle, $A_C$, of the locking member 432. In a particular embodiment, as the locking member 432 is canted at a higher angle, $A_{C1}$, the angle between the central axes 420 and 436 increases an equal value. As the angle, $A_{C1}$, increases, the locking member 432 can be adapted to form an interference fit with the posts 100, 102. This interference fit can prevent the posts 100, 102 from translating along the central axis 436 of the cavity 418 in either vertical direction (i.e., upward or downward).

Figure 30:
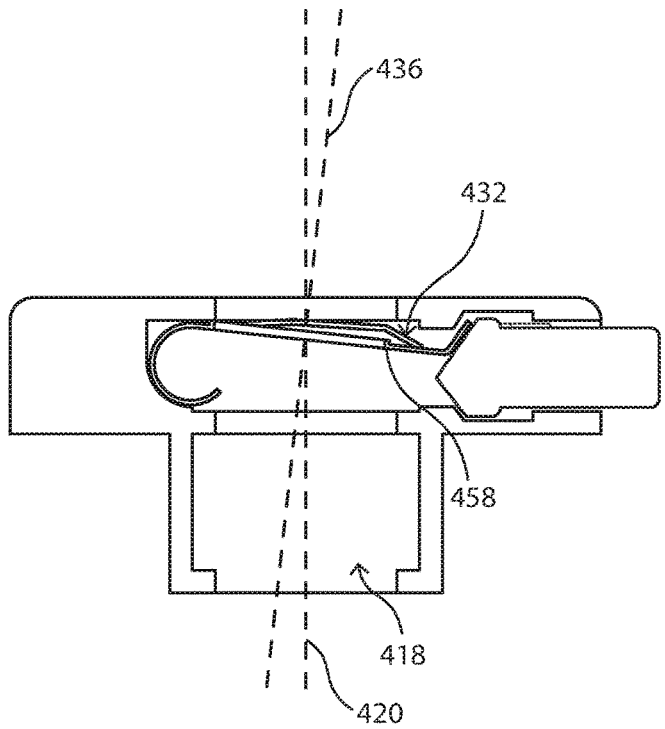
FIG. 30 includes a cross-sectional side view of a locking mechanism in accordance with an embodiment, taken along Line 27-27 in FIG. 20, including a central axis for the locking member and a central axis for the locking mechanism.
Figure 31:
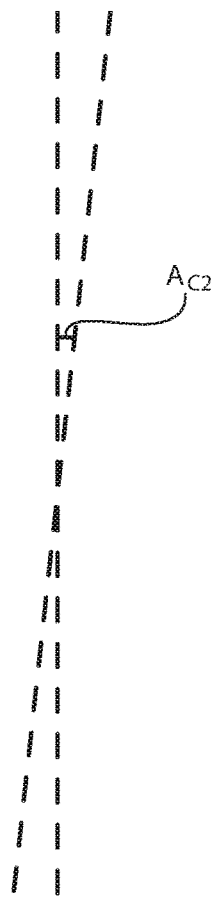
FIG. 31 includes a side plan view of the central axes of FIG. 30 according to an embodiment.

As illustrated in FIG. 30, the locking member 432 can be adapted such that the central axis 420 of the cavity 418 substantially aligns with the central axis 436 of the opening 434. At this position, the locking member 432 is canted at a lesser angle, $A_{C2}$. In this position, the locking member 432 can be adapted to permit the posts 100, 102 to translate within the cavity 418 in either vertical direction (i.e., upward or downward). Angle $A_{C2}$ is shown in FIG. 31.

Figure 32:
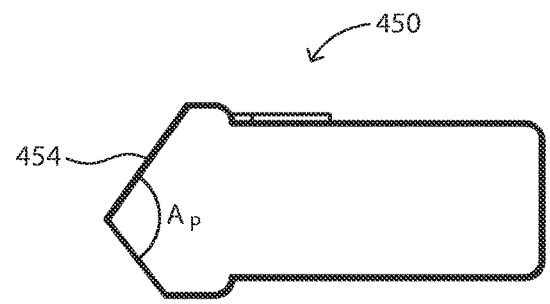
FIG. 32 includes a side plan view of an actuating member in accordance with an embodiment.
Figure 33:
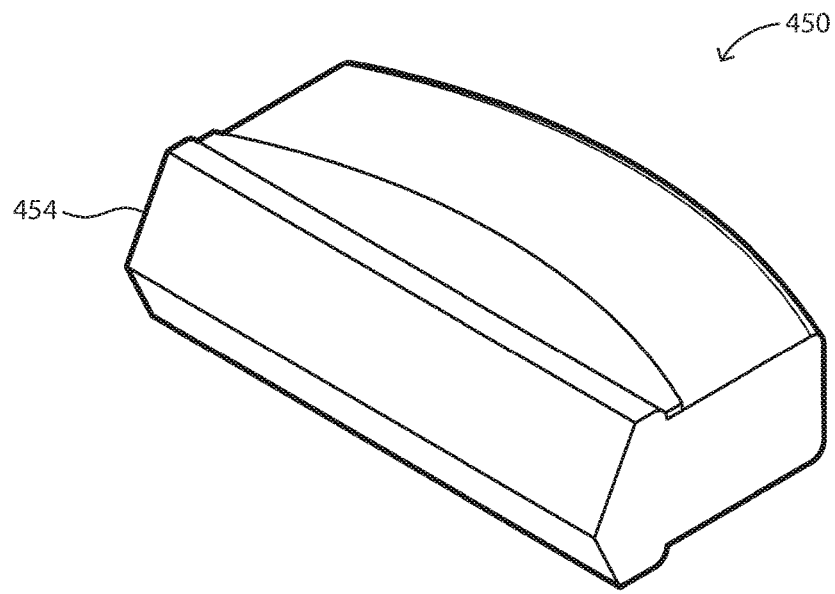
FIG. 33 includes a perspective view of an actuating member in accordance with an embodiment.

As shown in FIG. 32 and FIG. 33, the locking mechanism 400 can further comprise an actuating member 450 engaged at least partially in the slot 409 between the housing 404 and the flange 446 of the locking member 432.

In a particular embodiment, the actuating member 450 can be adapted to translate in a direction substantially perpendicular to the central axis 420. As the actuating member 450 translates radially inward towards the central axis 420 the actuating member 450 can engage the flange 446 of the locking mechanism 400, angularly rotating the locking member 432 around the lever 448 and displacing the flange 446 in a direction parallel with the central axis 420. As the locking member 432 rotates around the lever 448 the angle, $A_C$, decreases, causing the first and second axes 420 and 436 to become more closely aligned.

In a particular aspect, the actuating member 450 can comprise a plunger having an angled plunger face 454 adapted to engage with the flange 446 of the locking member 432. The plunger face 454 can have a plunger angle, $A_P$. In a particular aspect, $A_P$ can be greater than 30 degrees, such as greater than 35 degrees, greater than 40 degrees, greater than 45 degrees, greater than 50 degrees, greater than 55 degrees, greater than 60 degrees, greater than 65 degrees, greater than 70 degrees, greater than 75 degrees, greater than 80 degrees, greater than 85 degrees, greater than 90 degrees, greater than 95 degrees, or even greater than 100 degrees. $A_P$ can be less than 150 degrees, such as less than 145 degrees, less than 140 degrees, less than 135 degrees, less than 130 degrees, less than 125 degrees, less than 120 degrees, less than 115 degrees, less than 110 degrees, less than 105 degrees, less than 100 degrees, less than 95 degrees, or even less than 90 degrees. Furthermore, the $A_P$ can be in a range between and including any of the values described above.

In a particular embodiment, the plunger face 454 can mate with the flange 446 such that upon translating towards the central axis 420, the plunger face 454 displaces the flange upward. This in turn, can be understood to decrease $A_C$ and align the central axis 436 of the opening 434 of the locking member 432 with the central axis 420 of the cavity 418 of the housing 404.

Referring again to FIG. 24 through FIG. 31, it can be understood that the locking member 432 is in a first position when angle $A_{C1}$ is greatest. Conversely, it can be understood that the locking member 432 is in a second position when angle $A_{C2}$ is smallest.

In operation, one of the posts 100, 102 can be adapted to fit simultaneously within the cavity 418 of the housing 404 and the opening 434 of the locking member 432. When in the first position, the locking member 432 can prevent the posts 100, 102 from translating in a first direction, as represented in FIG. 1 by line 500. The locking mechanism 400 can prohibit the translation of the posts 100, 102 in the first direction (represented by line 500) upon the application of five seconds of applied force in the first direction of 500 Newtons (N).

The posts 100, 102 can be prohibited from translating in the first direction by an interference formed between the cavity 418 and the opening 434 of the locking member 432. More specifically, the interference can be formed between the central axes 420 and 436. As the central axis 420 of the cavity 418 cants relative to the central axis 436 of the opening 434, a biting edge 458 of the of the locking member 432 can engage the post 100, 102. It can be understood that the biting edge 458 can prevent axial translation of the posts 100, 102 through the opening 434 in the direction in which the locking member 432 is oriented. In a particular embodiment, the posts 100, 102 can be prohibited from translating axially in a direction towards the biting edge 106 upon application of a force of less than 500 N, as sustained for five seconds.

In a particular aspect, the biting edge 458 can comprise teeth extending radially inward. In another aspect, the biting edge 458 can comprise a roughened surface. In yet a further aspect, the biting edge 458 can be have a sharp lip capable of forming a groove or channel in the outer surface of the posts 100, 102. In another aspect, the biting edge 458 can comprise a rolled over surface 460 of the locking member 432.

While the locking member 432 is in oriented in the first position, the posts 100, 102 can translate in a second direction, as represented in FIG. 1 by line 502, upon an application of force of no greater than 45 N, such as no greater than 40 N, no greater than 35 N, no greater than 30 N, no greater than 25 N, no greater than 20 N, no greater than 15 N, no greater than 10 N, or even no greater than 5 N.

The locking member 432 can be adapted to prevent relative axial translation of the posts 100, 102 within the cavity 418 of the housing 404 in a first direction (represented by line 500) upon the application of force in the first direction of no greater than 500 N, while simultaneously permitting translation of the posts 100, 102 within the cavity 418 of the housing 404 upon the application of a force in the second direction (represented by line 502) of no greater than 45 N.

In a particular aspect, the posts 100, 102 can translate axially within the cavity 418 upon the application of no greater than 45 N in both the first or second directions when the locking member 432 is oriented in the second position. In the second position, the interference fit between the axes 420 and 436 is reduced, allowing for substantially free axial translation of the posts 100, 102 within the cavity 418 along the central axis 436.

Figure 41:
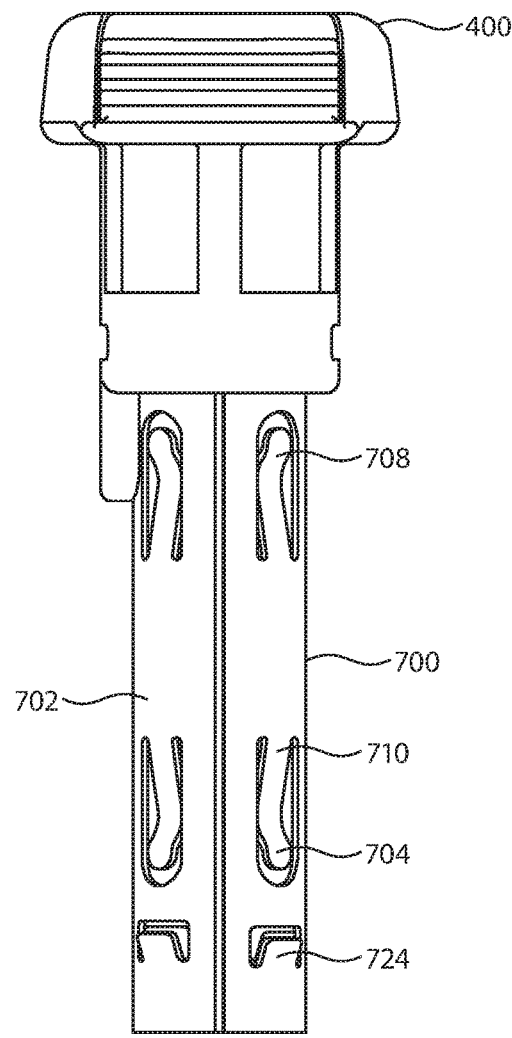
FIG. 41 includes a side plan view of a guide sleeve in accordance with an embodiment.

Referring now to FIG. 41, in another aspect, the locking mechanism 400 can be attached to a bearing 700 having a generally cylindrical sidewall 702 and one or more elongated fingers 704 each at least partially coupled to the generally cylindrical sidewall 702.

Each elongated finger 704 can define an aspect ratio as measured by a length thereof in the axial direction as compared to a width thereof, as measured in the circumferential direction. In an embodiment, at least one of the elongated fingers 704 can have an aspect ratio of at least 1.1:1, such as at least 1.5:1, at least 2:1, at least 3:1, at least 4:1, at least 5:1, or even at least 10:1. In an embodiment, the aspect ratio can be no greater than 100:1, such as no greater than 50:1, or even no greater than 25:1.

Figure 42:
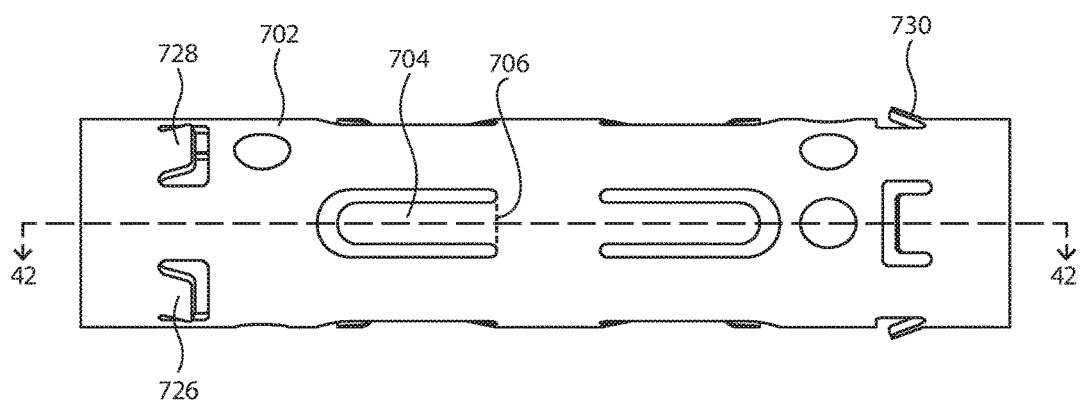
FIG. 42 includes a side plan view of a bearing in accordance with an embodiment.

Referring to FIG. 42, at least one of the elongated fingers 704 can be coupled to the generally cylindrical sidewall 702 along a first side thereof (indicated at dashed line 706). In an embodiment, the at least one elongated finger 704 can be continuously disconnected from the generally cylindrical sidewall 702 along the remaining sides. For example, the at least one elongated finger 704 can be continuously disconnected from an entire third side (opposite the first side 706) and at least a portion of opposite second and fourth sides (each extending between the first and third sides). As used herein, "continuously disconnected" refers to a single disconnection or gap between the elongated finger 704 and the generally cylindrical sidewall 702. In such a manner, the elongated fingers 704 can be attached to the generally cylindrical sidewall 702 along only one side.

In a particular embodiment, at least one elongated fingers 704 can be monolithic with the generally cylindrical sidewall 702, i.e., the elongated finger 704 has a unitary construction with the generally cylindrical sidewall 702. In another particular embodiment, at least one of the elongated fingers 704 may comprise a separate component attached to the generally cylindrical sidewall 702. For example, the separate component may be attached to the generally cylindrical sidewall 702 by an adhesive, welding, crimping, or any other suitable process recognizable in the art.

The elongated fingers 704 may be formed by a process, such as, for example, stamping, pressing, or cutting. In an embodiment, at least one of the elongated fingers 704 may be formed prior to formation of the generally cylindrical sidewall 702, e.g., prior to rolling a flat sheet to form the generally cylindrical sidewall 702. In an embodiment, at least one of the elongated fingers 704 may be formed after formation of the generally cylindrical sidewall 702, e.g., after rolling a flat sheet to form the generally cylindrical sidewall 702.

In an embodiment, at least one of the elongated fingers 704 may have an arcuate profile. The elongated finger 704 may include at least one generally arcuate edge. In another embodiment, at least one of the elongated fingers 704 may have a polygonal profile. The elongated finger 704 may include at least one polygonal angle. For example, the elongated finger 704 may include a triangle or a quadrilateral shape extending from the generally cylindrical sidewall 702. In yet another embodiment, at least one of the elongated fingers 704 may have an arcuate portion and a polygonal portion.

In an embodiment, at least two of the elongated fingers 704 have the same geometric shape or size as compared to each other. In a further embodiment, all of the elongated fingers 704 may have the same geometric shape or size as compared to each other. In another embodiment, at least two of the elongated fingers 704 may have different geometric shapes or sizes as compared to each other. In a further embodiment, all of the elongated fingers 704 may have different geometric shapes or sizes as compared to each other.

Referring again to FIG. 41, in a more particular embodiment, the bearing 700 can include a plurality of elongated fingers 704 at least partially coupled to the generally cylindrical sidewall 702. The plurality of fingers 704 can include an (first) elongated finger 708 and an (second) elongated finger 710.

In an embodiment, the plurality of elongated fingers 704 can be spaced apart in a circumferential direction around the generally cylindrical sidewall 702. In a more particular embodiment, each of the plurality of elongated fingers 704 may be spaced apart from one another an equal distance as measured around a circumference of the generally cylindrical sidewall 702.

In an embodiment, the plurality of elongated fingers 704 can be disposed in at least two circumferentially extending rows. Such an arrangement may increase stability of a post disposed within the bearing 700 by spacing apart the contact points in an axial direction. In a particular embodiment, the plurality of elongated fingers 704 may be disposed in at least 3 circumferentially extending rows, such as at least 4 circumferentially extending rows, at least 5 circumferentially extending rows, or even at least 6 circumferentially extending rows. In another embodiment, the plurality of elongated fingers 704 can be disposed in no greater than 25 circumferentially extending rows, such as no greater than 15 circumferentially extending rows, no greater than 10 circumferentially extending rows, or even no greater than 7 circumferentially extending rows.

In an embodiment, the elongated fingers 708 and 710 can extend from the generally cylindrical sidewall 702 in different directions. In a more particular embodiment, the elongated fingers 708 and 710 can extend in opposite directions. In an embodiment, the elongated fingers 708 and 710 may extend away from each other, i.e., the connected sides 706 (FIG. 42) of the elongated fingers 708 and 710 are closer together than any other portion of the elongated fingers 708 and 710.

In an embodiment, the elongated fingers 704 can each define an axial bisecting line. In an embodiment, the axial bisecting lines of at least two of the elongated fingers 704 can be oriented parallel, i.e., the at least two elongated fingers 704 are oriented parallel to each other. In a more particular embodiment, all of the elongated fingers 704 can be oriented parallel with respect to each other.

The elongated fingers 704 can each define a maximum circumferential gap distance, $G_C$, as measured with respect to the generally cylindrical sidewall 702 in a circumferential direction (perpendicular to Line 42-42), and a maximum axial gap distance, $G_A$, as measured with respect to the generally cylindrical sidewall 702 in an axial direction (along Line 42-42). In an embodiment, $G_A$ can be different than $G_C$.

In a particular embodiment, the maximum axial gap distance, $G_A$, can be greater than the maximum circumferential gap distance, $G_C$. For example, $G_A$ can be at least 105% $G_C$, such as at least 110% $G_C$, at least 120% $G_C$, at least 120% $G_C$, or even at least 145% $G_C$. In another embodiment, $G_A$ can be no greater than 500% $G_C$, such as no greater than 400% $G_C$, no greater than 300% $G_C$, or even no greater than 200% $G_C$.

Figure 43:
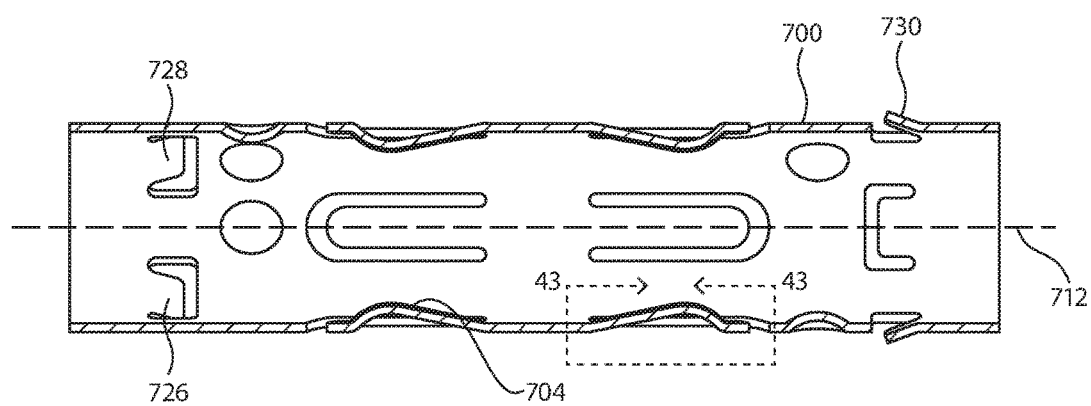
FIG. 43 includes a cross sectional view of a bearing, as seen along line 42-42 in FIG. 42 in accordance with an embodiment.
Figure 44:
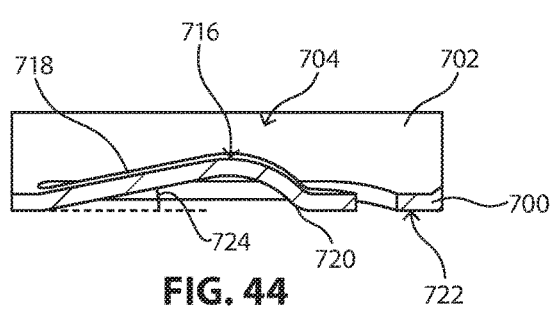
FIG. 44 includes an enlarged cross sectional view of an elongated finger of a bearing, as seen in box 43-43 in FIG. 43, in accordance with an embodiment.

Referring to FIGS. 43 and 44, at least one of the elongated fingers 704 can cant relative to a central axis 712 of the bearing 700 prior to installation of a post into the bearing 700. In certain embodiments, $G_C$ and $G_A$ may be equal prior to canting the elongated finger 704 relative to the central axis.

Each elongated finger 704 can define a radially innermost surface 716 and a bridge portion 718 connecting the radially innermost surface 716 to the generally cylindrical sidewall 702. A best fit line of the bridge portion 718 can cant relative to the central axis 712. The bridge portion 718 can form an angle 724 with respect to the generally cylindrical sidewall 702, as measured in the unassembled or unloaded state, e.g., prior to installation of a post into the bearing 700. By way of a non-limiting embodiment, the angle 724 between the bridge portion 718 and the generally cylindrical sidewall 702 in the unloaded state can be at least 2°, such as at least 3°, at least 4°, at least 5°, or even at least 10°. In another embodiment, the angle 724 can be no greater than 45°, such as no greater than 40°, no greater than 35°, no greater than 30°, no greater than 25°, or even no greater than 20°.

A best fit circle formed by the innermost surfaces 716 of a circumferentially extending row of elongated fingers 704 can have a diameter that is less than an inner diameter of the generally cylindrical sidewall 702, as measured prior to installation of a post into the bearing 700. Upon installation of the post, the diameter of the best fit circle of the innermost surfaces 716 of the circumferentially extending row of elongated fingers 704 can increase.

After installation of the post into the bearing 700, the angle 724 of the bridge portion 718 can decrease with respect to the generally cylindrical sidewall 702. The post-installation angle 724 may be dependent on the relative diameter of the post with respect to the bearing 700. Therefore, the bearing 700 can couple with posts having outer diameters that are less than the inner diameter of the generally cylindrical sidewall 702 and greater than the best fit circle formed by the innermost surfaces 716 of the circumferentially extending rows of elongated fingers 704.

In a particular embodiment, each elongated finger 704 can further include an end portion 720 extending radially outward from the innermost surface 716. The end portion 720 can extend from the innermost surface 716 opposite the bridge portion 718. In an embodiment, a portion of the end portion 720 of the elongated finger 704 can extend radially outward beyond an outer surface 722 of the generally cylindrical sidewall 702. In another embodiment, an outer surface of the end portion 720 can lie along the same plane as the outer surface 722 of the generally cylindrical sidewall 702. In yet a further embodiment, the outer surface of the end portion 720 can terminate radially inside of the outer surface 722 of the generally cylindrical sidewall 702. Termination of the end portion 720 radially inside of the outer surface 722 may be particularly suitable when the bearing 700 is encased in an outer member (discussed below) that limits radially outward deflection of the end portion 720 beyond the outer surface 722.

In an embodiment, the elongated finger 704 may have a radius of curvature as measured in a circumferential direction of the bearing 700 that is different than a radius of curvature of the generally cylindrical sidewall 702. In a more particular embodiment, the elongated finger 704 may have a larger radius of curvature as compared to the generally cylindrical sidewall 702. In this regard, the elongated finger 704 may appear more planar than the generally cylindrical sidewall 702.

In an embodiment, the bearing 700 can include a composite material. For example, the bearing 700 can include a substrate and a low friction material. The low friction material can be coupled to at least a portion of the substrate, most notably the portion of the substrate along the elongated fingers 704. In a further embodiment, the low friction material can be coupled to an entire major surface of the generally cylindrical sidewall, e.g., the radially inner or radially outer surface of the generally cylindrical sidewall. In a particular embodiment, the low friction material can be coupled to the radially inner surface of the substrate so as to form a low friction interface with an inserted post.

In a particular embodiment, the substrate can at least partially include a metal. More particularly, the substrate can at least partially include a steel, such as a stainless steel. For example, the substrate can at least partially include a 301 stainless steel. The 301 stainless steel may be annealed, ¼ hard, ½ hard, ¾ hard, or full hard.

In an embodiment, the low friction material can comprise materials including, for example, a polymer, such as a polyketone, a polyaramid, a polyimide, a polytherimide, a polyphenylene sulfide, a polyetherslfone, a polysulfone, a polypheylene sulfone, a polyamideimide, ultra high molecular weight polyethylene, a fluoropolymer, a polyamide, a polybenzimidazole, or any combination thereof.

In an example, the low friction material includes a polyketone, a polyaramid, a polyimide, a polyetherimide, a polyamideimide, a polyphenylene sulfide, a polyphenylene sulfone, a fluoropolymer, a polybenzimidazole, a derivation thereof, or a combination thereof. In a particular example, the low friction material includes a polymer, such as a polyketone, a thermoplastic polyimide, a polyetherimide, a polyphenylene sulfide, a polyether sulfone, a polysulfone, a polyamideimide, a derivative thereof, or a combination thereof. In a further example, the low friction material includes polyketone, such as polyether ether ketone (PEEK), polyether ketone, polyether ketone ketone, polyether ketone ether ketone, a derivative thereof, or a combination thereof. In an additional example, the low friction material may be an ultra high molecular weight polyethylene.

An example fluoropolymer includes fluorinated ethylene propylene (FEP), PTFE, polyvinylidene fluoride (PVDF), perfluoroalkoxy (PFA), a terpolymer of tetrafluoroethylene, hexafluoropropylene, and vinylidene fluoride (THV), polychlorotrifluoroethylene (PCTFE), ethylene tetrafluoroethylene copolymer (ETFE), ethylene chlorotrifluoroethylene copolymer (ECTFE), or any combination thereof. Fluoropolymers are used according to particular embodiments In an embodiment, the generally cylindrical sidewall 702 can have a thickness in a range of 0.2 mm and 25 mm. In a more particular embodiment, the generally cylindrical sidewall 702 can have a thickness in a range of 0.2 mm and 1 mm, such as in a range of 0.25 mm and 1 mm, in a range of 0.3 mm and 1 mm, in a range of 0.35 mm and 1 mm, in a range of 0.4 mm and 1 mm, in a range of 0.45 mm and 1 mm, in a range of 0.5 mm and 1 mm, in a range of 0.55 mm and 1 mm, in a range of 0.6 mm and 1 mm, in a range of 0.65 mm and 1 mm, in a range of 0.7 mm and 1 mm, in a range of 0.75 mm and 1 mm, in a range of 0.8 mm and 1 mm, in a range of 0.85 mm and 1 mm, in a range of 0.9 mm and 1 mm, or even in a range of 0.95 mm and 1 mm. In another embodiment, the thickness can be in a range of 0.2 mm and 0.95 mm, such as in a range of 0.2 mm and 0.9 mm, in a range of 0.2 mm and 0.85 mm, in a range of 0.2 mm and 0.8 mm, in a range of 0.2 mm and 0.75 mm, in a range of 0.2 mm and 0.7 mm, in a range of 0.2 mm and 0.65 mm, in a range of 0.2 mm and 0.6 mm, in a range of 0.2 mm and 0.6 mm, in a range of 0.2 mm and 0.55 mm, in a range of 0.2 mm and 0.5 mm, in a range of 0.2 mm and 0.45 mm, in a range of 0.2 mm and 0.4 mm, in a range of 0.2 mm and 0.35 mm, in a range of 0.2 mm and 0.3 mm, or even in a range of 0.2 mm and 0.25 mm. In a more particular embodiment, the generally cylindrical sidewall 702 can have a thickness between 0.35 mm and 0.65 mm.

In an embodiment, the low friction layer can have a thickness in a range of 0.1 mm and 0.4 mm, such as in a range of 0.15 mm and 0.35 mm, or even in a range of 0.2 mm and 0.3 mm. In this embodiment, the substrate can form all, or nearly all, of the remaining thickness of the generally cylindrical sidewall 702.

In an embodiment, the thickness of the generally cylindrical sidewall 702 may be uniform, i.e., a thickness at a first location of the generally cylindrical sidewall 702 can be equal to a thickness at a second location therealong. In another embodiment, the thickness of the generally cylindrical sidewall 702 may vary, i.e., a thickness at a first location of the generally cylindrical sidewall 702 is different than a thickness at a second location therealong.

In an embodiment, an average thickness of at least one of the elongated fingers 704 can be approximately equal to the thickness of the generally cylindrical sidewall 704. For example, the average thickness of the at least one elongated finger 704 may be within 10% of the thickness of the generally cylindrical sidewall 702. In another embodiment, the average thickness of at least one of the elongated fingers 704 may be different than the thickness of the generally cylindrical sidewall 704, i.e., the average thickness of the elongated finger 704 may be greater than 10% different than the thickness of the generally cylindrical sidewall.

In an embodiment, the bearing 700 can be at least partially encased by a support member (not illustrated). The support member can circumscribe at least a portion of the outer surface 722 of the bearing 700. The support member may provide support to the bearing 700. In a particular embodiment, the support member can include a resilient material. In a further embodiment, the support member can include a polymer. In a particular embodiment, a radially outer surface of the end portion 720 of at least one elongated finger 704 can contact an interior surface of the support member. More particularly, the support member can support the end portion 720. Upon insertion of a post into the bearing 700, the elongated finger 704 may dynamically deflect. Moreover, the end portion 720 may slide along the interior surface of the support member.

Figure 45:
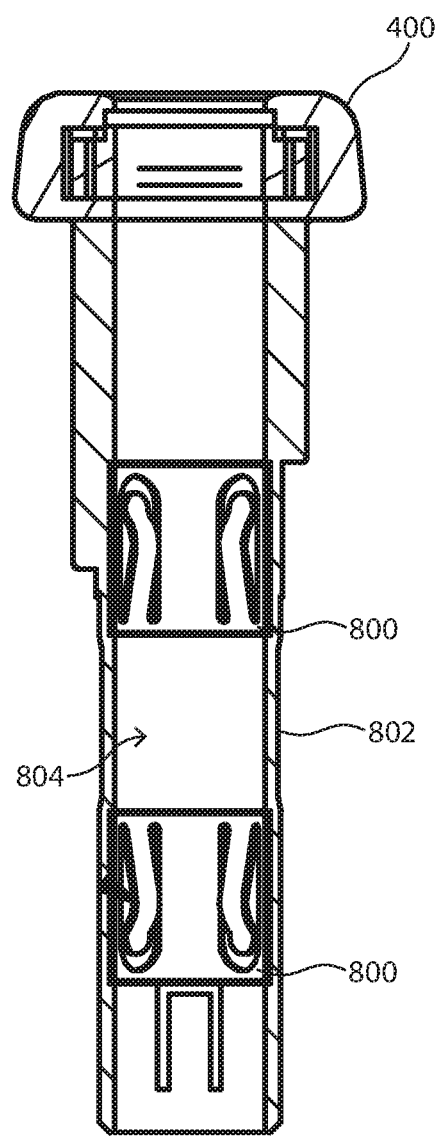
FIG. 45 includes a cross-sectional side plan view of a guide sleeve in accordance with an embodiment.

As illustrated in FIG. 45, in another aspect, the locking mechanism 400 can be attached to one or more bearings 800 through a support member 802. The support member 802 can include a body defining a central aperture 804. The body can be formed from a resilient material such as a polymer. At least one bearing 800 can be disposed within the aperture 804. In an embodiment, at least two bearings 800 can be disposed within the aperture 804, such as at least three bearings, at least four bearings, or even at least five bearings.

Figure 46:
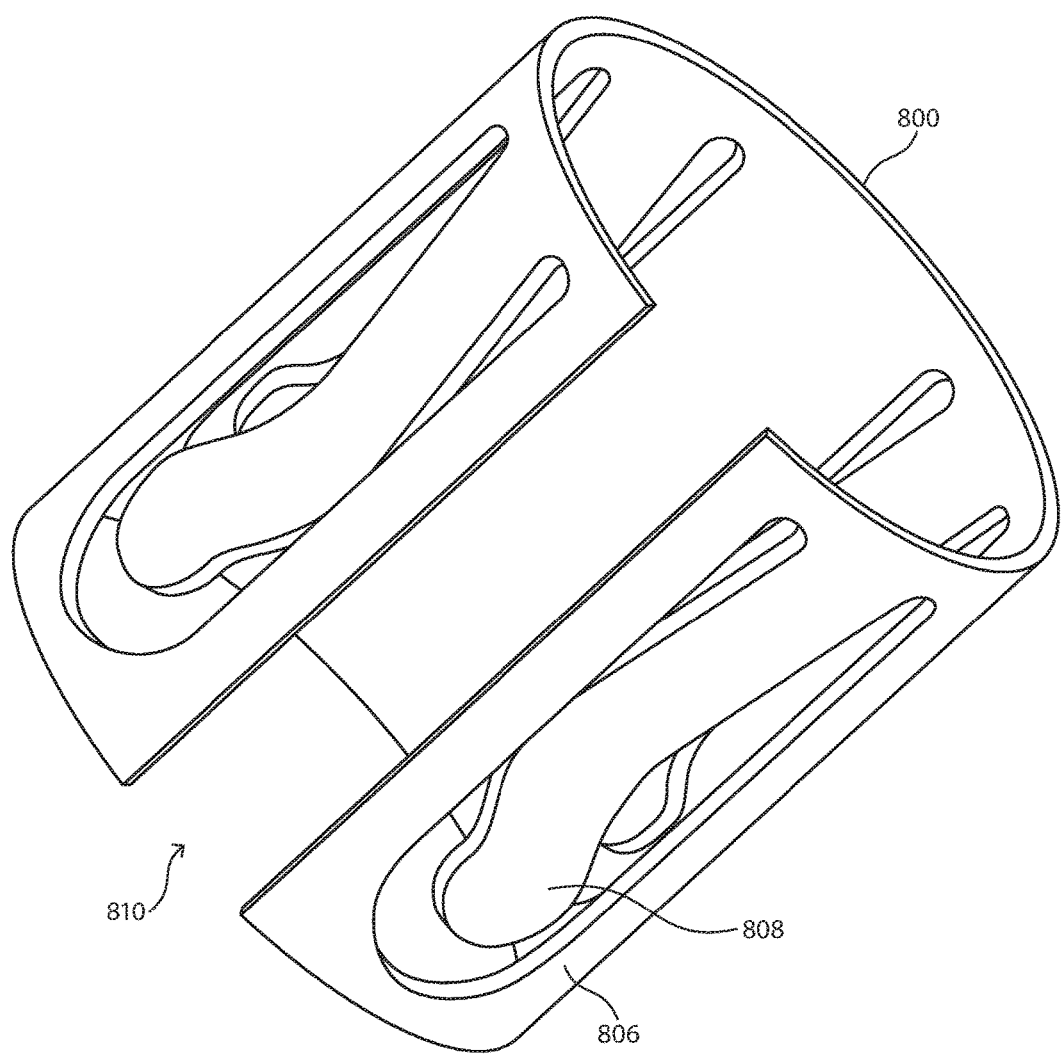
FIG. 46 includes a perspective view of a bearing in accordance with an embodiment.

Referring now to FIG. 46, each bearing 800 can include a generally cylindrical sidewall 806 and at least one elongated finger 808 at least partially coupled to the generally cylindrical sidewall 806. The elongated finger 808 can have any similar properties as compared to the elongated finger 704 illustrated in FIGS. 41 to 44. For example, each elongated finger 808 can define a radially innermost surface and a bridge portion connecting the radially innermost surface to the generally cylindrical sidewall 806.

In an embodiment, the bearing 800 can include a plurality of elongated fingers 808 spaced apart in a circumferential direction around the generally cylindrical sidewall 806. More particularly, the plurality of elongated fingers 808 can be spaced apart an equal distance as measured around a circumference of the generally cylindrical sidewall 806.

In an embodiment, the plurality of elongated fingers 808 can be disposed in at least one circumferentially extending row. In a further embodiment, the plurality of elongated fingers 808 can be disposed in at least two circumferentially extending rows, such as at least three circumferentially extending rows, at least four circumferentially extending rows, at least five circumferentially extending rows, or even at least six circumferentially extending rows. In another embodiment, the plurality of elongated fingers 808 can be disposed in no greater than 25 circumferentially extending rows, such as no greater than 15 circumferentially extending rows, no greater than 10 circumferentially extending rows, or even no greater than 7 circumferentially extending rows.

In an embodiment, the bearing 800 can further include a gap 810 extending between opposite axial ends thereof.

Referring again to FIG. 45, in an embodiment, the bearings 800 can be oriented such that the elongated fingers of a first bearing extend in a first direction and the elongated fingers of a second bearing extend in a second direction opposite the first direction. In such a manner, the elongated fingers can axially spread the loading conditions. This may improve axial stability of a post disposed within the bearings and may prevent canting of the post.

Referring again to FIGS. 41 to 43, the bearings 700 may further include one or more extending features 726 projecting from the generally cylindrical sidewall 702. The extending features 726 can project radially inward or radially outward. In an embodiment, the extending features 726 can be formed from bent portions of the generally cylindrical sidewall 702. In a particular embodiment, at least two of the extending features 726 can be disposed in a circumferentially extending row. The extending features 726 can engage with a complementary portion of the locking mechanism 400 (FIG. 41). In a particular embodiment, the extending features 726 can interlock with the complementary portion of the locking mechanism 400 upon circumferential rotation of the bearing 700 with respect to the locking mechanism 400. In another particular embodiment, the extending features 726 can interlock with the complementary portion of the locking mechanism 400 upon being inserted a distance into the locking mechanism 400. For example, the extending features 726 may be radially compressed during a portion of the axial translation of the bearing 700 into the locking mechanism 400 and splay open upon reaching a wider portion therein. The extending features 726 may then seat against a surface of the locking mechanism 400 to prevent disengagement of the bearing 700 therefrom.

In an embodiment, the bearing 700 may include a first plurality of extending features 728 disposed along a first axial end of the generally cylindrical sidewall 702 and a second plurality of extending features 730 disposed along a second axial end of the generally cylindrical sidewall 702. In this regard, the bearing 700 may be reversible in orientation, e.g., the bearing is, or generally is, reflectively symmetrical. Alternatively, if the first plurality of extending features 728 is engaged with the locking mechanism 400, the second plurality of extending features 730 may permit attachment of additional components to the bearing 700.

As illustrated in FIGS. 42 and 43, the first and second plurality of extending features 728 and 730 can be circumferentially offset from one another. In this regard, an axial line bisecting one of the extending features of the first plurality of extending features 728 may not overlie one of the extending features of the second plurality of extending features 730. Similarly, an axial line bisecting one of the extending features of the second plurality of extending features 730 may not overlie one of the extending features of the first plurality of extending features 728.

Alternatively, in another embodiment, the first and second plurality of extending features 728 and 730 can be in axial alignment such that an axial line bisecting one of the extending features of the first plurality of extending features 728 axially bisects one of the extending features of the second plurality of extending features 730.

In a particular aspect, it is possible to minimize variance between head restraint assemblies 1 in accordance with embodiments herein. Previous adjustable head restraint assemblies have been manufactured such that the head restraint posts are intentionally misaligned and not oriented parallel with one another. This misalignment allows the posts to form an interference fit with the seat back. This misalignment has several unintended consequences. Particularly, these previous assemblies can exhibit a high standard deviation in tolerance and slidability. As a result, the forces to slide the assembly vertically in the upward and downward directions can vary substantially between assemblies. Additionally, previous adjustable head restraint assemblies can rattle and even squeak during vehicular operation as the post can move radially relative to the seat back, rattling against the seat back.

Embodiments can minimize the standard deviation between commercial lots of assemblies. Specifically, because various embodiments do not rely on post misalignment to form an interference fit between the posts and the seat back, the force required to translate each of a lot of headrest assemblies vertically in the upward and downward directions can have a standard deviation of no greater than 5 Newtons (N), such as no greater than 4 N, no greater than 3 N, no greater than 2, or even no greater than 1 N. As a result, the variance between assemblies can be reduced.

Moreover, reaction to radial deflection can be such that deflection of the internal framework 10 of the cushion 8 upon the application of 20 N of force perpendicular to the central axis 420 can be no greater than 5 mm. The deflection of the framework 10 of the headrest cushion 8 can vary by no greater than 4 mm, no greater than 3 mm, or even no greater than 2 mm. Accordingly, the standard deviation of deflection can be no greater than 1.8 mm, such as no greater than 1.6 mm, no greater than 1.5 mm, no greater than 1.4 mm, no greater than 1.3 mm, no greater than 1.2 mm, no greater than 1.1 mm, no greater than 1 mm, no greater than 0.9 mm, no greater than 0.8 mm, no greater than 0.7 mm, no greater than 0.6 mm, no greater than 0.5 mm, no greater than 0.4 mm, no greater than 0.3 mm, no greater than 0.2 mm, or even no greater than 0.1 mm. Additionally, the standard deviation can be within a range between and including any of the ratio values described above.

In a particular aspect, the commercial lot being test for variance can include at least 30 assemblies, such as at least 50 assemblies, at least 100 assemblies, at least 200 assemblies, at least 500 assemblies, at even at least 1,000 assemblies.

Many different aspects and embodiments are possible. Some of those aspects and embodiments are described below. After reading this specification, skilled artisans will appreciate that those aspects and embodiments are only illustrative and do not limit the scope of the present invention. Embodiments may be in accordance with any one or more of the items as listed below.

Category 1

Item 1. A guide sleeve, comprising: a bearing comprising a generally cylindrical body having a sidewall, wherein the sidewall includes an undeformed portion, a plurality of wave structures protruding radially inward from the undeformed portion; and a locking mechanism coupled to the bearing, wherein the locking mechanism is adapted to engage a post.

Item 2. An adjustable head restraint assembly, comprising: a head restraint comprising a member and a first and second post extending from the member; a frame for receiving the head restraint, the frame including a first and second mounting fixture for the first and second posts; a first guide sleeve according to claim 1, the first guide sleeve affixed to the first mounting fixture and slidably engaged to the first post; and a second guide sleeve, the second guide sleeve affixed to the second mounting fixture and slidably engaged to the second post.

Item 3. The guide sleeve according to any one of the preceding items, wherein the body has an axial length, and wherein the body further comprises a gap extending along the entire axial length of the body, wherein the gap establishes a split in the body.

Item 4. The guide sleeve according to item 4, wherein the gap establishes a split in the body defining a first end and a second end.

Item 5. The guide sleeve according to any one of the preceding items, wherein at least three wave structures extend circumferentially around the body as seen in a cross-section perpendicular to the central axis of the bearing.

Item 6. The guide sleeve according to any one of the preceding items, wherein each wave structure has a length, $L_{WS}$, wherein the bearing has an axial length, $L_B$, and wherein $L_{WS}$ is at least 0.3 $L_B$.

Item 7. The guide sleeve according to item 6, wherein there are at least two rows of wave structures, wherein the rows of wave structures are separated by at least 0.1 $L_B$.

Item 8. The guide sleeve according to any one of the preceding items, wherein the wave structures are axially staggered on the sidewall.

Item 9. The guide sleeve according to any one of the preceding items, wherein the bearing comprises a composite structure.

Item 10. The guide sleeve according to any one of the preceding items, wherein the bearing comprises a backing and a low friction layer.

Item 11. The guide sleeve according to item 10, wherein the backing is a metal substrate.

Item 12. The guide sleeve according to any one of items 10-11, wherein the low friction layer comprises a polymer.

Item 13. The guide sleeve according to any one of items 10-12, wherein the low friction layer comprises a fluoropolymer.

Item 14. The guide sleeve according to any one of items 10-13, wherein the low friction layer comprises PTFE.

Item 15. The guide sleeve according to any one of items 10-14, wherein the low friction layer is positioned radially inside of the backing.

Item 16. The guide sleeve according to any one of the preceding items, wherein the locking mechanism further comprises at least one tab extending radially inward, wherein the bearing comprises a groove, and wherein the tab of the locking mechanism is adapted to engage with the groove of the bearing.

Item 17. The guide sleeve according to item 16, wherein the groove comprises an L-shape.

Item 18. The assembly according to any one of items 2-17, wherein each of the guide sleeves is welded, adhered, or mechanically interlocked to each of the mounting fixtures.

Item 19. The assembly according to any one of the preceding items, wherein the first and second posts are substantially parallel to each other.

Category 2

Item 1. A commercial lot of head restraint assemblies, including at least 20 assemblies, each assembly comprising: a head restraint comprising a body and a first and a second post extending from the body; a frame for receiving the head restraint, the frame including a first and s second mounting fixture for the first and second posts, respectively; a first bearing fitted between the first post and the first mounting fixture; and a second bearing fitted between the second post and the second mounting fixture, wherein a force required to translate each of the head restraints in the vertically upward direction is not greater than 45 Newtons (N), and the force varies in the commercial lot by a standard deviation of no greater than 5N.

Item 2. The commercial lot of head restraint assemblies according to the preceding item, wherein each of the head restraints deflects no greater than 2.5 mm upon an application of force of 20 N perpendicular to the planar axis.

Item 3. The commercial lot of head restraint assemblies according to any one of the preceding items, wherein the standard deviation is no greater than 4.5 N, no greater than 4 N, no greater than 3.5 N, no greater than 3 N, no greater than 2.5 N, no greater than 2 N, no greater than 1.5 N, or even no greater than 1 N.

Item 4. The commercial lot of head restraint assemblies according to any one of the preceding items, wherein the commercial lot includes at least 30 assemblies, such as at least 50 assemblies, at least 100 assemblies, at least 200 assemblies, at least 500 assemblies, or even at least 1,000 assemblies.

Item 5. The commercial lot of head restraint assemblies according to any one of the preceding items, wherein the first and second bearings comprise metal.

Item 6. The commercial lot of head restraint assemblies according to any one of the preceding items, wherein the first and second bearings further comprise a low friction layer engaged with the bearing, and wherein the low friction layer forms an inner surface of the bearing.

Item 7. The commercial lot of head restraint assemblies according to item 6, wherein the low friction layer comprises a polymer.

Item 8. The commercial lot of head restraint assemblies according to any one of items 1-7, wherein the low friction layer comprises a fluoropolymer, such as PTFE.

Item 9. The commercial lot of head restraint assemblies according to any one of the preceding items, further comprising a locking member, the locking member coupled to one of the first and second bearings, wherein the locking member is adapted to prevent axial translation of the posts relative to the first and second bearings in at least one axial direction.

Item 10. The commercial lot of head restraint assemblies according to any one of the preceding items, further comprising a locking member having an opening including a central axis, wherein the locking member is adapted to receive the post, the post having a central axis, the locking member being adapted to be movable between a first position and a second position, wherein in the first position the central axis of the locking member and the central axis of the post are non-parallel and intersect at an acute angle, $A_I$, and wherein in the second position $A_I$ is lesser than $A_I$ in the first position.

Item 11. The commercial lot of head restraint assemblies according to any one of the preceding items, wherein the bearings further comprise a plurality of wave structures.

Item 12. The commercial lot of head restraint assemblies according to item 11, wherein the wave structures project radially inward.

Item 13. The commercial lot of head restraint assemblies according to any one of the preceding items, wherein the first bearing forms a zero-clearance fit with the first post, and wherein the second bearing forms a zero-clearance fit with the second post.

Category 3

Item 1. A head restraint height adjustment apparatus, comprising: a housing including a bore defining an axial cavity having a central axis; a locking member positioned within the housing, wherein the locking member is biased to cant relative to the central axis of the cavity.

Item 2. A head restraint height adjustment apparatus, comprising: a housing comprising a bore defining an axial cavity having a central axis; and a locking member positioned within the housing, the locking member having an opening including a central axis, the opening being in open communication with the bore, the locking member being adapted to be movable between a first position and a second position, wherein in the first position the central axes are non-parallel and intersect at an acute angle, $A_{I1}$, wherein in the second position the central axes intersect at an angle, $A_{I2}$, and wherein $A_{I2}$ is less than $A_{I1}$.

Item 3. A head restraint height adjustment apparatus, comprising: a housing comprising a bore defining an axial cavity having a central axis; a locking member positioned within the housing, the locking member having an opening including a central axis, the opening being in open communication with the bore, the locking member being adapted to be movable between a first position and a second position, wherein in the first position the central axes are non-parallel and intersect at an acute angle, $A_{I1}$, wherein in the second position the central axes intersect at an angle, $A_{I2}$, and wherein $A_{I2}$ is less than $A_{I1}$; and wherein the locking member is adapted to receive a post, and wherein the locking member is adapted to prevent the post from translating in a vertically downward direction upon application of a force of 500 Newtons sustained for 5 seconds when the locking member is in the first position.

Item 4. The apparatus according to any one of items 2 or 3, further comprising an actuation member adapted to move the locking member between the first and second positions.

Item 5. The apparatus according to any one of the items 3-4, wherein at least one of the first and second posts are devoid of external notches.

Item 6. The apparatus according to any one of items 3-5, wherein each post has an adjustment length, as defined by a length of the post that is visible when the apparatus is at a maximum height, and wherein the locking member is adapted to engage the post at any position along the adjustment length.

Item 7. The apparatus according to any one of items 2-6, wherein $A_{I1}$ is at least 1 degree, such as at least 2 degrees, at least 3 degrees, at least 4 degrees, at least 5 degrees, at least 10 degrees, at least 15 degrees, at least 20 degrees, at least 25 degrees, at least 30 degrees, at least 35 degrees, at least 40 degrees, or even at least 45 degrees.

Item 8. The apparatus according to any one of items 2-7, wherein $A_{I2}$ is at least 1 degree less than $A_{I2}$, such as at least 2 degrees less, at least 3 degrees less, at least 4 degrees less, at least 5 degrees less, at least 6 degrees less, at least 7 degrees less, at least 8 degrees less, at least 9 degrees less, at least 10 degrees less, at least 15 degrees less, or even at least 20 degrees less.

Item 9. The apparatus according to any one of items 2-8, wherein $A_{I2}$ is less than 10 degrees, such as less than 5 degrees, less than 4 degrees, less than 3 degrees, less than 2 degrees, or even less than 1 degree.

Item 10. The apparatus according to any one of items 2-9, wherein $A_{I2}$ is approximately 0 degrees.

Item 11. The apparatus according to any one of the preceding items wherein the bore has an inner diameter, $ID_B$, wherein the bore is adapted to receive a post having an outer diameter, $OD_P$, and wherein $ID_B$ is greater than $OD_P$.

Item 12. The apparatus according to item 11, wherein a ratio of $ID_B$:$OD_P$ is at least 1.01, such as at least 1.1, at least 1.15, at least 1.2, at least 1.25, or even at least 1.3.

Item 13. The apparatus according to any one of items 11-12, wherein a ratio of $ID_B$:$OD_P$ is no greater than 1.5, such as no greater than 1.4, no greater than 1.3, no greater than 1.2, or even no greater than 1.1.

Item 14. The apparatus according to any one of items 2-13, wherein the area of the opening of the locking ring as viewed along the central axis of the cavity is greater when the locking member is in the second position than when the locking member is in the first position.

Item 15. The apparatus according to any one of items 2-14, wherein as viewed along the central axis of the cavity, the opening of the locking member has a first perceptible area, $A_{LM1}$, wherein as viewed along the central axis of the cavity the opening of the locking member has a second perceptible area, $A_{LM2}$, and wherein $A_{LM1}$ is less than $A_{LM2}$.

Item 16. The apparatus according to item 15, wherein a ratio of $A_{LM1}$:$A_{LM2}$ is less than 0.99, such as less than 0.95, less than 0.90, less than 0.85, less than 0.80, less than 0.75, less than 0.70, less than 0.65, or even less than 0.60.

Item 17. The apparatus according to any one of items 15-16 wherein a ratio of $A_{LM1}$:$A_{LM2}$ is greater than 0.45, such as greater than 0.50, greater than 0.55, greater than 0.60, greater than 0.65, greater than 0.70, greater than 0.75, or even greater than 0.80.

Item 18. The apparatus according to any one of items 2-17, wherein the locking member is biased to the first position by a biasing element.

Item 19. The apparatus according to item 18, wherein the biasing element is a leaf spring.

Item 20. A head restraint height adjustment apparatus, comprising: a head restraint comprising a body and a first and second post extending from the body, at least the first post being devoid of external notches; and a locking member adapted to engage the first post along an adjustment length, wherein in a locked position the locking member prevents downward axial translation of the first post, and wherein in an unlocked position the locking member permits both upward and downward axial translation of the first post.

Item 21. The head restraint height adjustment apparatus according to item 20, wherein the locking member is adapted to engage the first post such that in the unlocked position the post can translate freely upward and downward by application of a force not greater than 45 Newtons, and in the locked position the post is prevented from downward translation by application of a force of 500 Newtons sustained for 5 seconds.

Item 22. An automotive seat back assembly, comprising: a seat back, the seat back having the head restraint height adjustment apparatus according to any one of the preceding claims; a first post engaged within the bore of the head restraint apparatus; a second post; and a head cushion engaged to and connecting the first and second posts.

Category 4

Item 1. A head restraint guide sleeve adapted to receive a post, wherein the guide sleeve has a radial stiffness of no less than about 2000 N/mm, and wherein the guide sleeve is adapted such that the post interference fit within the guide sleeve can translate axially therein upon an axial sliding force of no greater than about 30 N.

Item 2. The head restraint guide sleeve according to item 1, wherein the guide sleeve is adapted to provide a radial stiffness of no less than about 2,250 N/mm, no less than about 2,500 N/mm, no less than about 2,750 N/mm, no less than about 3,000 N/mm, no less than about 3,500 N/mm, no less than about 4,000 N/mm.

Item 3. The head restraint guide sleeve according to any one of the preceding items, wherein the guide sleeve is adapted such that the post can translate axially therein upon an axial sliding force of no greater than 29 N, no greater than 28 N, no greater than 27 N, no greater than about 26 N, no greater than about 25 N, no greater than about 24 N, no greater than about 23 N, no greater than about 22 N, no greater than about 21 N, no greater than about 20 N, no greater than about 19 N, no greater than about 18 N, no greater than about 17 N, no greater than about 16 N, no greater than about 15 N, no greater than about 14 N, no greater than about 13 N.

Item 4. The head restraint guide sleeve according to any one of the preceding items, wherein the guide sleeve comprises a metal substrate and a low friction layer.

Item 5. The head restraint guide sleeve according to item 4, wherein the low friction layer comprises a polymer, such as a fluoropolymer, such as PTFE.

Item 6. The head restraint guide sleeve according to any one of items 4 or 5, wherein the low friction layer is welded, adhered, or mechanically interlocked with the metal substrate.

Item 7. The head restraint guide sleeve according to any one of items 1-6, wherein the guide sleeve further comprises a plurality of wave structures.

Item 8. The head restraint guide sleeve according to item 7, wherein each of the plurality of wave structures extend radially inward.

Item 9. The head restraint guide sleeve according to any one of the preceding items, wherein the guide sleeve comprises a central axis, and wherein a portion of the guide sleeve comprises at least three wave structures when viewed in a cross-section with respect to the central axis of the guide sleeve.

Item 10. The head restraint guide sleeve according to any one of items 7-9, wherein the guide sleeve has an axial length, $L_{GS}$, and wherein the guide sleeve has at least one feature selected from the following features:
  (i) each wave structure has an axial length, $L_{WS}$, wherein $L_{WS}$ is no less than about 0.25 $L_{GS}$; or
  (ii) wherein there are at least two rows of wave structures.

Item 11. The head restraint guide sleeve according to any one of items 7-10, wherein each of the plurality of wave structures has a generally arcuate shape defining an apex.

Item 12. The head restraint guide sleeve according to item 11, wherein each apex is adapted to provide a point contact location.

Item 13. The head restraint guide sleeve according to item 11, wherein each apex has a planar portion adapted to provide an area contact location.

Item 14. The head restraint guide sleeve according to any one of the preceding items, wherein the guide sleeve has an initial diameter, $D_I$, wherein the guide sleeve has an operational diameter, $D_O$, and wherein $D_O$ is less than $D_I$.

Item 15. The head restraint guide sleeve according to item 14, wherein a ratio of $D_I:D_O$ is no less than 0.4, no less than 0.5, no less than 0.6, no less than 0.7, no less than 0.8, no less than 0.9, no less than 0.95, no less than 0.96, no less than 0.97, no less than 0.98, no less than 0.99.

Item 16. The head restraint guide sleeve according to any one of items 14-15, wherein a ratio of $D_I:D_O$ is no greater than 0.999, no greater than 0.995, no greater than 0.990, no greater than 0.985, no greater than 0.980, no greater than 0.975, no greater than 0.970, no greater than 0.950, no greater than 0.925, no greater than 0.900.

Item 17. The head restraint guide sleeve according to any one of items 14-16, wherein the post has an outer diameter, $D_P$, and wherein a ratio of $D_P:D_I$ is no less than 1.005, no less than 1.006, no less than 1.007, no less than 1.008, no less than 1.009, no less than 1.010, no less than 1.011, no less than 1.012, no less than 1.013, no less than 1.014, no less than 1.015, no less than 1.020, not less than 1.025, not less than 1.030.

Item 18. The head restraint guide sleeve according to item 17, wherein the ratio of $D_P:D_I$ is no greater than 1.30, no greater than 1.25, no greater than 1.20, no greater than 1.15, no greater than 1.10.

Item 19. A head restraint preassembly, comprising:
  a head restraint comprising a body and a first and second post extending from the body;
  a first guide sleeve engaged to the first post; and
  a second guide sleeve engaged to the second post,
  wherein the first guide sleeve has a radial stiffness of no less than about 2000 N/mm, and wherein the first sleeve is slidable along the first post upon application of a force of no greater than about 30 N.

Item 20. The head restraint preassembly according to item 19, wherein the first and second guide sleeves comprise a metal substrate and a low friction layer.

Item 21. The head restraint preassembly according to item 20, wherein the low friction layer comprises a polymer, such as a fluoropolymer, such as PTFE.

Item 22. The head restraint preassembly according to any one of items 20 or 21, wherein the low friction layer is welded, adhered, or mechanically interlocked with the metal substrate.

Item 23. The head restraint preassembly according to any one of items 20-22, wherein the guide sleeves further comprise a plurality of wave structures.

Item 24. The head restraint preassembly according to item 23, wherein each of the plurality of wave structures extend radially inward.

Item 25. The head restraint preassembly according to any one of items 19-24, wherein the guide sleeves comprise a central axis, and wherein a portion of the guide sleeves comprise at least three wave structures when viewed in a cross-section with respect to the central axis of the guide sleeve.

Item 26. The head restraint preassembly according to any one of items 19-25, wherein the guide sleeves have an axial length, $L_{GS}$, and wherein the guide sleeves have at least one feature selected from the following features:
  (i) each wave structure has an axial length, $L_{WS}$, wherein $L_{WS}$ is no less than about 0.25 $L_{GS}$; or
  (ii) wherein there are at least two rows of wave structures.

Item 27. The head restraint preassembly according to any one of items 19-26, wherein each of the plurality of wave structures has a generally arcuate shape defining an apex.

Item 28. The head restraint preassembly according to item 27, wherein each apex is adapted to provide a point contact location.

Item 29. The head restraint preassembly according to item 27, wherein each apex has a planar portion adapted to provide an area contact location.

Item 30. The head restraint preassembly according to any one of items 19-29, wherein the guide sleeves have an initial diameter, $D_I$, wherein the guide sleeves have an operational diameter, $D_O$, and wherein $D_O$ is less than $D_I$.

Item 31. The head restraint preassembly according to item 30, wherein a ratio of $D_I:D_O$ is no less than 0.4, no less than 0.5, no less than 0.6, no less than 0.7, no less than 0.8, no less than 0.9, no less than 0.95, no less than 0.96, no less than 0.97, no less than 0.98, no less than 0.99.

Item 32. The head restraint preassembly according to any one of items 30-31, wherein a ratio of $D_I:D_O$ is no greater than 0.999, no greater than 0.995, no greater than 0.990, no greater than 0.985, no greater than 0.980, no greater than 0.975, no greater than 0.970, no greater than 0.950, no greater than 0.925, no greater than 0.900.

Item 33. The head restraint guide sleeve according to any one of items 30-32, wherein the post has an outer diameter, $D_P$, and wherein a ratio of $D_P:D_I$ is no less than 1.005, no less than 1.006, no less than 1.007, no less than 1.008, no less than 1.009, no less than 1.010, no less than 1.011, no less than 1.012, no less than 1.013, no less than 1.014, no less than 1.015, no less than 1.020, not less than 1.025, not less than 1.030.

Item 34. The head restraint guide sleeve according to item 33, wherein the ratio of $D_P:D_I$ is no greater than 1.30, no greater than 1.25, no greater than 1.20, no greater than 1.15, no greater than 1.10.

Category 5

Item 1. A head restraint guide sleeve adapted to receive a post, wherein the guide sleeve is adapted to have an assembled radial stiffness of no less than about 1000 N/mm, and wherein the post is adapted to be initially installed within the guide sleeve upon application of a force of no greater than about 100 N.

Item 2. The head restraint guide sleeve according to item 1, wherein the head restraint guide sleeve comprises: a generally cylindrical sidewall; and a plurality of wave structures extending from the generally cylindrical sidewall.

Item 3. The head restraint guide sleeve according to item 2, wherein each wave structure of the plurality of wave structures extends inward from the generally cylindrical sidewall.

Item 4. A head restraint guide sleeve, comprising: a generally cylindrical sidewall; and a plurality of wave structures extending inward from the sidewall, wherein the guide sleeve has an initial unassembled radial stiffness of less than about 1000 N/mm, and wherein the guide sleeve is adapted to have an assembled radial stiffness, as measured after a post is inserted into the guide sleeve, of no less than about 1000 N/mm.

Item 5. A head restraint preassembly, comprising: a head restraint including a body and a first and second post extending from the body; a first guide sleeve adapted to engage with the first post; and a second guide sleeve adapted to engage with the second post; wherein the first guide sleeve includes a generally cylindrical sidewall and a plurality of wave structures extending inward from the generally cylindrical sidewall, wherein the guide sleeve has an initial unassembled radial stiffness of less than about 1000 N/mm, and wherein the guide sleeve is adapted to have an assembled radial stiffness, as measured after the post is inserted into the first guide sleeve, of no less than about 1000 N/mm.

Item 6. A head restraint preassembly, comprising: a head restraint including a body and a first and second post extending from the body; a first guide sleeve adapted to engage with the first post; and a second guide sleeve adapted to engage with the second post, wherein the first guide sleeve includes a generally cylindrical sidewall and a plurality of wave structures extending inward from the generally cylindrical sidewall, and wherein the at least one wave structure of the plurality of wave structures includes at least one feature prior to the post being inserted into the guide sleeve, the feature selected from the group consisting of: (i) an aperture extending through at least a portion of the at least one wave structure; or (ii) a portion having a reduced thickness; or (iii) a dimpled section.

Item 7. The head restraint guide sleeve or preassembly according to any one of the preceding items, wherein the post is adapted to be installed within the guide sleeve upon application of a force of no greater than about 95 N, no greater than about 90 N, no greater than about 85 N, no greater than about 80 N, no greater than about 75 N.

Item 8. The head restraint guide sleeve or preassembly according to any one of the preceding items, wherein the guide sleeve has an assembled radial stiffness of no less than about 1100 N/mm, no less than about 1200 N/mm, no less than about 1300 N/mm, no less than about 1500 N/mm, no less than about 1700 N/mm, no less than about 2000 N/mm, no less than about 2100 N/mm, no less than about 2200 N/mm, no less than about 2300 N/mm, no less than about 2400 N/mm, no less than about 2500 N/mm, no less than about 3000 N/mm, no less than about 3500 N/mm, no less than about 4000 N/mm.

Item 9. The head restraint guide sleeve or preassembly according to any one of the preceding items, wherein the guide sleeve has an initial inner diameter, $D_I$, as measured along a best fit circle tangent to an innermost surface of the guide sleeve before the post is inserted into the guide sleeve, wherein the guide sleeve has an operational diameter, $D_O$, as measured along a best fit circle tangent to an innermost surface of the guide sleeve after the post is inserted into the guide sleeve, and wherein $D_I$ is greater than $D_O$.

Item 10. The head restraint guide sleeve or preassembly according to item 9, wherein a ratio of $D_O:D_I$ is no less than about 1.0, no less than about 1.01, no less than about 1.02, no less than about 1.03, no less than about 1.04, no less than about 1.05, no less than about 1.10.

Item 11. The head restraint guide sleeve or preassembly according to any one of the preceding items, wherein the guide sleeve is adapted to absorb an angular misalignment with the post while maintaining the assembled radial stiffness, the angular misalignment defined by a misalignment angle, $A_M$, as measured by the angle between the post and a central axis of the guide sleeve, and wherein the guide sleeve is adapted to absorb an $A_M$ up to about 10°, up to about 9°, up to about 8°, up to about 7°, up to about 6°, up to about 5°, up to about 4°, up to about 3°, up to about 2°, up to about 1°.

Item 12. The head restraint guide sleeve or preassembly according to any one of items 2-5 or 7-10, wherein at least one wave structure of the plurality of wave structures includes at least one feature prior to the post being inserted into the guide sleeve, the feature selected from the group consisting of: (i) an aperture extending through at least a portion of the at least one wave structure; or (ii) a portion having a reduced thickness; or (iii) a dimpled section.

Item 13. The head restraint guide sleeve or preassembly according to any one of items 6-11, wherein the aperture is adapted to at least partially close after the post is inserted into the first guide sleeve.

Item 14. The head restraint guide sleeve or preassembly according to any one of items 6-12, wherein the aperture is at least partially on an innermost surface of the at least one wave structure of the plurality of wave structures.

Item 15. The head restraint guide sleeve or preassembly according to any one of items 6-12, wherein the aperture is not on an innermost surface of the at least one wave structure of the plurality of wave structures.

Item 16. The head restraint guide sleeve or preassembly according to any one of items 6-12 or 14, wherein the aperture extends along a side surface of at least one wave structure of the plurality of wave structures.

Item 17. The head restraint guide sleeve or preassembly according to any one of items 6-15, wherein the aperture is generally polygonal.

Item 18. The head restraint guide sleeve or preassembly according to any one of items 6-15, wherein the aperture is generally ellipsoidal.

Item 19. The head restraint guide sleeve or preassembly according to any one of items 6-17, wherein the aperture comprises a first tapered end and a second tapered end opposite the first tapered end, wherein the first and second tapered ends each comprise an acute angle, $A_A$, as viewed perpendicular to the aperture, and wherein $A_A$ is less than about 45 degrees, less than about 30 degrees, less than about 25 degrees, less than about 20 degrees, less than about 15 degrees, less than about 10 degrees.

Item 20. The head restraint guide sleeve or preassembly according to any one of items 6-18, wherein the aperture has a maximum length, $L_A$, and a maximum width, $W_A$, as measured perpendicular to $L_A$.

Item 21. The head restraint guide sleeve or preassembly according to item 20, wherein a ratio of $L_A:W_A$ is no less than about 1.0, no less than about 1.5, no less than about 2.0, no less than about 2.5, no less than about 3.0, no less than about 4.0, no less than about 5.0, no less than about 6.0, no less than about 7.0, no less than about 8.0, no less than about 9.0, no less than about 10.0, no less than about 15.0, no less than about 20.0, no less than about 25.0, no less than about 30.0.

Item 22. The head restraint guide sleeve or preassembly according to any one of items 20 or 21, wherein the ratio of $L_A:W_A$ is no greater than about 500, no greater than about 400, no greater than about 300, no greater than about 200, no greater than about 100, no greater than about 75, no greater than about 50, no greater than about 40.

Item 23. The head restraint guide sleeve or preassembly according to any one of items 20-22, wherein each wave structure of the plurality of wave structures comprises a maximum length, $L_W$, and wherein a ratio of $L_W:L_A$ is no greater than about 1.25, no greater than about 1.0, no greater than about 0.95, no greater than about 0.90, no greater than about 0.85, no greater than about 0.80, no greater than about 0.75, no greater than about 0.70, no greater than about 0.65, no greater than about 0.60.

Item 24. The head restraint guide sleeve or preassembly according to item 23, wherein the ratio of $L_W:L_A$ is no less than about 0.01, no less than about 0.10, no less than about 0.20, no less than about 0.30, no less than about 0.40.

Item 25. The head restraint guide sleeve or preassembly according to any one of items 20-24, wherein each wave structure of the plurality of wave structures comprises a maximum width, $W_W$, and wherein a ratio of $W_W:W_A$ is no greater than about 1.25, no greater than about 1.0, no greater than about 0.95, no greater than about 0.90, no greater than about 0.85, no greater than about 0.80, no greater than about 0.75, no greater than about 0.70, no greater than about 0.65, no greater than about 0.60.

Item 26. The head restraint guide sleeve or preassembly according to item 25, wherein the ratio of $W_W:W_A$ is no less than about 0.01, no less than about 0.10, no less than about 0.20, no less than about 0.30, no less than about 0.40.

Item 27. The head restraint guide sleeve or preassembly according to any one of items 6-26, wherein each wave structure of the plurality of wave structures has a total surface area, $A_W$, wherein the portion having a reduced thickness has a surface area, $A_P$, and wherein a ratio of $A_P:A_W$ is no less than about 0.05, no less than about 0.10, no less than about 0.15, no less than about 0.20, no less than about 0.25, no less than about 0.30, no less than about 0.35, no less than about 0.40, no less than about 0.45, no less than about 0.50, no less than about 0.60, no less than about 0.70, no less than about 0.80, no less than about 0.90

Item 28. The head restraint guide sleeve or preassembly according to any one of items 6-27, wherein the generally cylindrical sidewall has a thickness, $T_{SW}$, wherein the portion having a reduced thickness has a thickness, $T_P$, and wherein a ratio of $T_P:T_{SW}$ is no greater than about 0.99, no greater than about 0.95, no greater than about 0.90, no greater than about 0.85, no greater than about 0.80, no greater than about 0.75, no greater than about 0.70, no greater than about 0.65, no greater than about 0.60, no greater than about 0.55, no greater than about 0.50, no greater than about 0.40, no greater than about 0.30, no greater than about 0.20.

Item 29. The head restraint guide sleeve or preassembly according to item 28, wherein the ratio of $T_P:T_{SW}$ is no less than about 0.05, no less than about 0.10, no less than about 0.15, no less than about 0.20.

Item 30. The head restraint guide sleeve or preassembly according to any one of items 6-29, wherein the portion having a reduced thickness is adapted to have a greater radial stiffness after the post is inserted into the guide sleeve.

Item 31. The head restraint guide sleeve or preassembly according to any one of items 6-30, wherein the portion having a reduced thickness has an initially unassembled radial stiffness, $S_1$, wherein the portion having a reduced thickness has an assembled stiffness after the post is inserted into the guide sleeve, $S_2$, and wherein a ratio of $S_2:S_1$ is no less than about 1.01, no less than about 1.05, no less than about 1.10, no less than about 1.20, no less than about 1.30, no less than about 1.40, no less than about 1.50, no less than about 1.75, no less than about 2.00.

Item 32. The head restraint guide sleeve or preassembly according to any one of items 6-31, wherein the dimpled section is adapted to have a greater radial stiffness after the post is inserted into the guide sleeve.

Item 33. The head restraint guide sleeve or preassembly according to any one of items 6-32, wherein the dimpled section comprises a corrugation.

Item 34. The head restraint guide sleeve or preassembly according to any one of items 6-33, wherein the dimpled section comprises a plurality of corrugations.

Item 35. The head restraint guide sleeve or preassembly according to any one of items 6-34, wherein the dimpled section comprises a perforation.

Item 36. The head restraint guide sleeve or preassembly according to any one of items 6-35, wherein the dimpled section comprises a plurality of perforations.

Item 37. The head restraint guide sleeve or preassembly according to any one of items 6-36, wherein the dimpled section extends inward from an innermost surface of the at least one wave structure.

Category 6

Item 1. A head restraint guide sleeve comprising:
a generally cylindrical sidewall; and
an elongated finger at least partially coupled to the generally cylindrical sidewall along a first side and continuously disconnected from the generally cylindrical sidewall along the remaining sides,
wherein at least a portion of the elongated finger is canted towards a central axis of the generally cylindrical sidewall.

Item 2. A head restraint guide sleeve comprising:
a support member;
a generally cylindrical sidewall disposed radially inside of the support member; and
an elongated finger at least partially coupled to the generally cylindrical sidewall along a first side and continuously disconnected from the generally cylindrical sidewall along the remaining sides.

Item 3. The head restraint guide sleeve according to item 1, further comprising a support member disposed radially outside of the generally cylindrical sidewall.

Item 4. The head restraint guide sleeve according to any one of the preceding items, wherein the generally cylindrical sidewall comprises a composite construction.

Item 5. The head restraint guide sleeve according to any one of the preceding items, wherein the generally cylindrical sidewall comprises a substrate and a low friction material.

Item 6. The head restraint guide sleeve according to any one of the preceding items, wherein the elongated finger is canted towards a central axis of the generally cylindrical sidewall prior to installation of a post into the guide sleeve.

Item 7. The head restraint guide sleeve according to any one of the preceding items, wherein the elongated finger has an initial angle, as measured prior to installation of a post, and a final angle, as measured after installation of the post, and wherein the initial angle is different than the final angle.

Item 8. The head restraint guide sleeve according to any one of the preceding items, wherein the elongated finger defines a maximum axial gap distance, as measured in an axial direction between the elongated finger and the generally cylindrical sidewall, and a maximum circumferential gap distance, as measured in a circumferential direction between the elongated finger and the generally cylindrical sidewall, and wherein the maximum axial gap distance is different from the maximum circumferential gap distance.

Item 9. The head restraint guide sleeve according to item 8, wherein the maximum axial gap distance is greater than the maximum circumferential gap distance.

Item 10. The head restraint guide sleeve according to any one of the preceding items, wherein the elongated finger comprises:
a radially innermost surface;
a bridge portion extending between the generally cylindrical sidewall and the radially innermost surface; and
an end portion extending from the radially innermost surface opposite the bridge portion.

Item 11. The head restraint guide sleeve according to any one of the preceding items, wherein the elongated finger comprises a plurality of elongated fingers spaced apart around the generally cylindrical sidewall in a circumferential direction.

Item 12. The head restraint guide sleeve according to any one of the preceding items, wherein the elongated finger comprises a plurality of elongated fingers, and wherein the plurality of elongated fingers are disposed in at least two circumferentially extending rows.

Item 13. The head restraint guide sleeve according to any one of the preceding items, wherein the elongated finger comprises a plurality of elongated fingers, wherein a first elongated finger of the plurality of elongated fingers extends from the generally cylindrical sidewall in a first direction, and wherein a second elongated finger of the plurality of elongated fingers extends from the generally cylindrical sidewall in a second direction different from the first direction.

Item 14. The head restraint guide sleeve according to any one of the preceding items, wherein at least two of the elongated fingers are oriented parallel with respect to each other.

Item 15. The head restraint guide sleeve according to any one of the preceding items, wherein the elongated finger comprises a plurality of elongated fingers, wherein the elongated fingers each have an innermost surface, the innermost surfaces defining a best fit circle, and wherein a diameter of the best fit circle is less than an inner diameter of the generally cylindrical sidewall prior to installation of a post into the guide sleeve.

Category 7

Item 1. A head restraint preassembly comprising:
a first guide sleeve comprising:
a generally cylindrical sidewall; and
a tine extending from the generally cylindrical sidewall and partially disconnected from the generally cylindrical sidewall.

Item 2. The head restraint preassembly according to item 1, wherein the tine comprises an elongated finger.

Item 3. The head restraint preassembly according to item 2, wherein the elongated finger has a first and second opposite sides, and wherein the elongated finger is at least partially disconnected from the generally cylindrical sidewall along the first and second opposite sides.

Item 4. The head restraint preassembly according to item 3, wherein the elongated finger comprises a third side disposed between the first and second sides, and wherein the elongated finger is disconnected from the generally cylindrical sidewall along the third side.

Item 5. The head restraint preassembly according to item 4, wherein the disconnection formed on the first, second and third sides of the elongated finger is continuous.

Item 6. The head restraint preassembly according to item 2, wherein the elongated finger is canted relative to a central axis of the first guide sleeve.

Item 7. The head restraint preassembly according to item 2, wherein the first guide sleeve comprises a plurality of elongated fingers, each elongated finger having an innermost surface, the innermost surfaces of the elongated fingers defining a best fit circle, and wherein a diameter of the best fit circle is less than an inner diameter of the generally cylindrical sidewall.

Item 8. The head restraint guide preassembly according to item 1, further comprising a support member disposed radially outside of the generally cylindrical sidewall.

Item 9. The head restraint guide preassembly according to item 2, wherein the first guide sleeve comprises a plurality of elongated fingers, wherein a first elongated finger of the plurality of elongated fingers extends from the generally cylindrical sidewall in a first direction, and wherein a second elongated finger of the plurality of elongated fingers extends from the generally cylindrical sidewall in a direction different from the first direction.

Item 10. The head restraint preassembly according to item 2, wherein the elongated finger has an initial angle, as measured prior to installation of a post, and a final angle, as measured after installation of the post, and wherein the initial angle is different than the final angle.

Item 11. The head restraint preassembly according to item 1, wherein the first guide sleeve comprises a composite material including a substrate and a low friction material.

Item 12. A head restraint preassembly, comprising:

a first guide sleeve comprising a generally cylindrical sidewall and an elongated finger extending from the generally cylindrical sidewall, wherein the elongated finger is adjustable between a first position defining a first angle, $A_1$, with respect to a central axis of the generally cylindrical sidewall, and a second position defining a second angle, $A_2$, with respect to the central axis of the generally cylindrical sidewall, and wherein $A_2$ is different than $A_1$.

Item 13. The head restraint preassembly of item 12, wherein the first guide sleeve comprises a plurality of elongated fingers.

Item 14. The head restraint preassembly of item 13, wherein each elongated finger has an innermost surface, the innermost surfaces of the elongated fingers defining a best fit circle, and wherein a diameter of the best fit circle is less than an inner diameter of the generally cylindrical sidewall.

Item 15. The head restraint preassembly of item 12, wherein the elongated finger defines a maximum axial gap distance, as measured in an axial direction between the elongated finger and the generally cylindrical sidewall, and a maximum circumferential gap distance, as measured in a circumferential direction between the elongated finger and the generally cylindrical sidewall, and wherein the maximum axial gap distance is different from the maximum circumferential gap distance.

Item 16. The head restraint preassembly of item 12, wherein the elongated finger has a first and second opposite sides and a third side disposed between the first and second sides, and wherein the elongated finger is disconnected from the undeformed portion along at least a portion of the first and second opposite sides and the entire third side.

Item 17. The head restraint preassembly of item 12, wherein the first guide sleeve comprises a composite material including a substrate and a low friction material.

Item 18. A head restraint preassembly comprising:
a head restraint comprising a body and a first and second posts extending from the body;
a first guide sleeve adapted to engage the first post; and
a second guide sleeve adapted to engage the second post, wherein first guide sleeve comprises a generally cylindrical sidewall and an elongated finger extending from the generally cylindrical sidewall, wherein the elongated finger is partially disconnected from the generally cylindrical sidewall.

Item 19. The head restraint preassembly of item 18, wherein the elongated finger is adjustable between a first position defining a first angle, $A_1$, with respect to a central axis of the generally cylindrical sidewall, and a second position defining a second angle, $A_2$, with respect to the central axis of the generally cylindrical sidewall, and wherein $A_2$ is different than $A_1$.

Item 20. The head restraint preassembly of item 18, wherein the elongated finger has a first and second opposite sides and a third side disposed between the first and second sides, and wherein the elongated finger is disconnected from the undeformed portion along at least a portion of the first and second opposite sides and the entire third side.

EXAMPLES

The radial stiffness of a head restraint assembly is tested by first inserting a post into a bearing. The post is held stationary at a first longitudinal position while a perpendicular normal force is applied against an outer surface of the bearing at a second longitudinal position. The normal force is gradually increased (e.g., 100 N, 200 N, 300 N, 400 N, etc.) to 1000 N and the resulting radial displacement of the bearing relative to the post is measured.

Sample 1 comprises a bearing and post in accordance with the present invention. In particular, the bearing is formed from a multilayer composite (i.e. 3 layers) comprising an outer fluoropolymer sliding layer comprising PTFE, a steel substrate and a thin inner sliding layer to prevent metal to metal contact between the bearing and the post. The bearing further comprises four wave structures extending radially inward. The projections have a radial length of 1.0 mm, as measured from the inner surface of the bearing, and engage the posts at four contact locations. The initial diameter of the bearing, as measured by a best fit circle tangent to the inner contact surface of the wave structures is approximately 13.78 mm. The post is formed from steel and has a diameter of 14 mm. The normal force is applied against the bearing at a rate of 0.3 mm/min.

Sample 2 comprises a bearing formed from plastic having a cylindrical body with cutout tines extending radially inward. The tines comprise a plastic material contiguous with the cylindrical body. The initial inner diameter of the bearing is approximately 20.60 mm with each of the tines initially projecting radially inward a maximum radial distance of approximately 0.93 mm. A post is inserted into the bearing. The post is formed from steel and has a diameter of 19.60 mm. The normal force is applied against the bearing at a rate of 0.3 mm/min. The results are shown in Table 1.

TABLE 1

| Radial Stiffness | |
| --- | --- |
| Sample | Radial Stiffness |
| 1 | 4421 N/mm |
| 2 | 943 N/mm |

As illustrated in Table 1, Sample 1 has a radial stiffness of 4421 N/mm, whereas Sample 2 has a radial stiffness of 943 N/mm. Thus, the assembly of Sample 1 can provide at least a 468% increase in radial stiffness as compared to the assembly of Sample 2.

The axial sliding force (i.e., the force necessary to axially translate the posts within the bearing) is tested by first inserting a post at least partially into a bearing (i.e. such that the post engages with the projections of the bearing). The bearing is held stationary while a force directed axially along the length of the post is applied against the axial end of the post. The force is increased until the post begins to translate longitudinally within the bearing, and the resulting force required throughout the translation is measured. The results are shown in Table 2. It is noted that the maximum axial force was found during the initial stages of movement when the assemblies were required to overcome the effects associated with static friction.

TABLE 2

| Sliding Forces | | |
| --- | --- | --- |
| Sample | Average Axial Force (N) | Maximum Axial Force (N) |
| 1 | 12.8 | 27.50 |
| 2 | 39.62 | 53.63 |

As illustrated in Table 2, Sample 1 requires a maximum axial force to exhibit movement of 27.50 N, whereas Sample 2 requires a maximum axial force of 53.63 N. Thus, Sample 1 can translate within the bearing upon a maximum axial force that is less than 52% the maximum axial force required to translate the post of Sample 2

As illustrated in Table 2, Sample 1 required an average axial force throughout sliding of 12.8 N, whereas Sample 2 required an average axial force throughout sliding of 39.62 N. Thus, Sample 1 can freely translate within the bearing upon an average axial force that is less than 33% the average axial force required to translate the post of Sample 2. Many different aspects and embodiments are possible. Some of those aspects and embodiments are described below. After reading this specification, skilled artisans will appreciate that those aspects and embodiments are only illustrative and do not limit the scope of the present invention. Embodiments may be in accordance with any one or more of the items as listed below.

Note that not all of the activities described above in the general description or the examples are required, that a portion of a specific activity may not be required, and that one or more further activities may be performed in addition to those described. Still further, the order in which activities are listed is not necessarily the order in which they are performed.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

What is claimed is:

1. A head restraint preassembly comprising:
a first guide sleeve comprising:
a generally cylindrical sidewall; and a tine extending from the generally cylindrical sidewall and partially disconnected therefrom, wherein the tine comprises an elongated finger comprising: a radially innermost surface; a bridged portion extending between the generally cylindrical sidewall and the radially innermost surface; and an end portion extending from the radially innermost surface opposite the bridge portion.

2. The head restraint preassembly according to claim 1, wherein the elongated finger comprises a first and second opposite sides, and wherein the elongated finger is at least partially disconnected from the generally cylindrical sidewall along the first and second opposite sides.

3. The head restraint preassembly according to claim 2, wherein the elongated finger further comprises a third side disposed between the first and second sides, and wherein the elongated finger is disconnected from the generally cylindrical sidewall along the third side.

4. The head restraint preassembly according to claim 3, wherein the disconnection formed on the first, second and third sides of the elongated finger is continuous.

5. The head restraint preassembly according to claim 1, wherein the elongated finger is canted relative to a central axis of the first guide sleeve.

6. The head restraint preassembly according to claim 1, wherein the first guide sleeve comprises a plurality of elongated fingers, each elongated finger having an innermost surface, the innermost surfaces of the elongated fingers defining a best fit circle, and wherein a diameter of the best fit circle is less than an inner diameter of the generally cylindrical sidewall.

7. The head restraint guide preassembly according to claim 1, further comprising a support member disposed radially outside of the generally cylindrical sidewall.

8. The head restraint guide preassembly according to claim 1, wherein the first guide sleeve comprises a plurality of elongated fingers, wherein a first elongated finger of the plurality of elongated fingers extends from the generally cylindrical sidewall in a first direction, and wherein a second elongated finger of the plurality of elongated fingers extends from the generally cylindrical sidewall in a direction different from the first direction.

9. The head restraint preassembly according to claim 1, further comprising a post, wherein the elongated finger has an initial angle, as measured with respect to the generally cylindrical sidewall prior to installation of a post into the first guide sleeve, and a final angle, as measured with respect to the generally cylindrical sidewall after installation of the post, and wherein the initial angle is different than the final angle.

10. The head restraint preassembly according to claim 1, wherein the first guide sleeve comprises a composite material including a friction material coupled to a substrate.

11. A head restraint guide sleeve comprising:
a generally cylindrical sidewall; and
an elongated finger at least partially coupled to the generally cylindrical sidewall along a first side and continuously disconnected from the generally cylindrical sidewall along the remaining sides,
wherein at least a portion of the elongated finger is canted towards a central axis of the generally cylindrical sidewall, wherein the elongated finger comprises: a radially innermost surface; a bridge portion extending between the generally cylindrical sidewall and the radially innermost surface; and an end portion extending from the radially innermost surface opposite the bridge portion.

12. The head restraint guide sleeve according to claim 11, further comprising a support member disposed radially outside of the generally cylindrical sidewall.

13. The head restraint guide sleeve according to claim 11, wherein the generally cylindrical sidewall comprises a substrate and a friction material.

14. The head restraint guide sleeve according to claim 11, wherein the elongated finger is canted towards a central axis of the generally cylindrical sidewall prior to installation of a post into the guide sleeve.

15. The head restraint guide sleeve according to claim 11, further comprising a post, wherein the elongated finger has an initial angle, as measured prior to installation of a post, and a final angle, as measured after installation of the post, and wherein the initial angle is different than the final angle.

16. The head restraint guide sleeve according to claim 11, wherein the elongated finger defines a maximum axial gap distance, as measured in an axial direction between the elongated finger and the generally cylindrical sidewall, and a maximum circumferential gap distance, as measured in a circumferential direction between the elongated finger and the generally cylindrical sidewall, and wherein the maximum axial gap distance is different from the maximum circumferential gap distance.

17. The head restraint guide sleeve according to claim 16, wherein the maximum axial gap distance is greater than the maximum circumferential gap distance.

18. The head restraint guide sleeve according to claim 11, wherein the elongated finger comprises a plurality of elongated fingers spaced apart around the generally cylindrical sidewall in a circumferential direction.

\* \* \* \* \*